United States Patent
Rodriguez et al.

(10) Patent No.: US 12,461,640 B2
(45) Date of Patent: Nov. 4, 2025

(54) DEVICES, METHODS, AND GRAPHICAL USER INTERFACES FOR DISPLAYING SHADOW AND LIGHT EFFECTS IN THREE-DIMENSIONAL ENVIRONMENTS

(71) Applicant: Apple Inc., Cupertino, CA (US)

(72) Inventors: Miquel Estany Rodriguez, San Francisco, CA (US); James M. Dessero, Morgan Hill, CA (US); Benjamin Hylak, San Francisco, CA (US); James J. Owen, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 31 days.

(21) Appl. No.: 17/950,795

(22) Filed: Sep. 22, 2022

(65) Prior Publication Data

US 2024/0094862 A1 Mar. 21, 2024

Related U.S. Application Data

(60) Provisional application No. 63/408,810, filed on Sep. 21, 2022.

(51) Int. Cl.
*G06F 3/04815* (2022.01)
*G06F 3/01* (2006.01)
(Continued)

(52) U.S. Cl.
CPC .......... *G06F 3/04815* (2013.01); *G06F 3/013* (2013.01); *G06F 3/04842* (2013.01);
(Continued)

(58) Field of Classification Search
None
See application file for complete search history.

(56) References Cited

U.S. PATENT DOCUMENTS

| 10,559,121 B1 | 2/2020 | Moudgil et al. |
| 2002/0022515 A1 | 2/2002 | Boku et al. |

(Continued)

FOREIGN PATENT DOCUMENTS

| EP | 3 118 722 A1 | 1/2017 |
| JP | 2007-018173 A | 1/2007 |

(Continued)

OTHER PUBLICATIONS

Office Action, dated Jun. 6, 2022, received in U.S. Appl. No. 17/030,219, 30 pages.
(Continued)

*Primary Examiner* — Linda Huynh
(74) *Attorney, Agent, or Firm* — Morgan, Lewis & Bockius LLP

(57) ABSTRACT

A computer system displays, in a three-dimensional environment, a computer-generated object; detects that a user's attention is directed to the object; and in response, displays a virtual shadow for the object with a first appearance, including displaying the shadow with a first value for a first visual property, while maintaining a pose of the object relative to the three-dimensional environment. While continuing to display the object in the three-dimensional environment, the computer system detects that the user's attention has ceased to be directed to the object; and in response, displays the shadow for the object with a second appearance that is different from the first appearance, while maintaining the pose of the object relative to the three-dimensional environment. Displaying the shadow for the object with the second appearance includes displaying the shadow with a second value for the first visual property. The second value is different from the first value.

54 Claims, 26 Drawing Sheets

(51) Int. Cl.
  *G06F 3/04842* (2022.01)
  *G06F 3/04845* (2022.01)
  *G06T 15/60* (2006.01)
  *G06T 19/20* (2011.01)

(52) U.S. Cl.
  CPC .......... *G06F 3/04845* (2013.01); *G06T 15/60* (2013.01); *G06T 19/20* (2013.01)

(56) References Cited

U.S. PATENT DOCUMENTS

| | | | |
|---|---|---|---|
| 2007/0236485 A1 | 10/2007 | Trepte | |
| 2009/0115784 A1 | 5/2009 | Tomite et al. | |
| 2009/0251460 A1 | 10/2009 | Dunnigan | |
| 2010/0315413 A1* | 12/2010 | Izadi ................... | G06F 3/0425 345/419 |
| 2013/0246954 A1* | 9/2013 | Gray ................... | G06F 3/04895 715/767 |
| 2014/0043321 A1 | 2/2014 | Matjasko et al. | |
| 2015/0091903 A1* | 4/2015 | Costello ................ | G06T 15/60 345/426 |
| 2015/0116354 A1 | 4/2015 | Tomlin et al. | |
| 2016/0012642 A1 | 1/2016 | Lee et al. | |
| 2016/0078057 A1 | 3/2016 | Perez de la Cobra | |
| 2016/0364914 A1 | 12/2016 | Todeschini | |
| 2018/0107269 A1 | 4/2018 | Benzies | |
| 2018/0330515 A1 | 11/2018 | Stall et al. | |
| 2018/0357780 A1* | 12/2018 | Young ..................... | G06T 11/20 |
| 2019/0122441 A1 | 4/2019 | Agrawal et al. | |
| 2019/0139307 A1 | 5/2019 | Min | |
| 2019/0228568 A1 | 7/2019 | Wu et al. | |
| 2019/0235729 A1* | 8/2019 | Day ....................... | G06F 3/0485 |
| 2019/0258320 A1 | 8/2019 | Yang et al. | |
| 2019/0318534 A1 | 10/2019 | Mory et al. | |
| 2019/0332400 A1 | 10/2019 | Spoor et al. | |
| 2020/0151958 A1 | 5/2020 | Livneh | |
| 2021/0096726 A1 | 4/2021 | Faulkner et al. | |
| 2021/0097768 A1* | 4/2021 | Malia ................... | G06F 3/04845 |
| 2021/0097776 A1* | 4/2021 | Faulkner ............... | G06F 3/0482 |
| 2022/0083197 A1 | 3/2022 | Rockel et al. | |
| 2022/0092862 A1 | 3/2022 | Faulkner et al. | |
| 2022/0229524 A1 | 7/2022 | McKenzie et al. | |
| 2023/0092874 A1 | 3/2023 | Krivoruchko et al. | |
| 2023/0114043 A1 | 4/2023 | Wan et al. | |
| 2025/0173979 A1 | 5/2025 | Rodriguez et al. | |

FOREIGN PATENT DOCUMENTS

| | | |
|---|---|---|
| JP | 2013/250897 A | 12/2013 |
| JP | 2015-212946 A | 11/2015 |
| JP | 2017-004457 A | 1/2017 |
| KR | 2016-0006087 A | 1/2016 |
| KR | 10-1919077 B | 11/2018 |
| WO | WO 2018200337 A1 | 11/2018 |
| WO | WO 2018227100 A1 | 12/2018 |
| WO | WO 2019079826 A1 | 4/2019 |

OTHER PUBLICATIONS

Final Office Action, dated Nov. 2022, received in U.S. Appl. No. 17/030,219, 30 pages.
Invitation to Pay Additional Fees, dated Dec. 23, 2021, received in International Patent Application No. PCT/US2020/052709, which corresponds with U.S. Appl. No. 17/030,219, 23 pages.
International Search Report and Written Opinion, dated Feb. 15, 2021, received in International Patent Application No. PCT/US2020/052709, which corresponds with U.S. Appl. No. 17/030,219, 24 pages.
Invitation to Pay Additional Fees, dated Jan. 20, 2023, received in International Patent Application No. PCT/US2022/044577), which corresponds with U.S. Appl. No. 17/950,035, 22 pages.
Levin et al., "Passive Light and Viewpoint Sensitive Display of 3D Content", 2016 IEEE International Conference on Computational Photography (ICCP), May 2016, 16 pages.
Office Action, dated Jun. 30, 2023, received in U.S. Appl. No. 17/030,219, 40 pages.
Final Office Action, dated Oct. 12, 2023, received in U.S. Appl. No. 17/030,219, 44 pages.
Office Action, dated Jun. 6, 2023, received in European Patent Application No. 20789388.4, which corresponds with U.S. Appl. No. 17/030,219, 16 pages.
Office Action, dated Apr. 25, 2023, received in Japanese Patent Application No. 2022-515137, which corresponds with U.S. Appl. No. 17/030,219, 7 pages.
International Search Report and Written Opinion, dated Jun. 20, 2023, received in International Patent Application No. PCT/US2022/044579, which corresponds with U.S. Appl. No. 17/950,795, 16 pages.
Office Action, dated Jan. 19, 2023, received in Australian Patent Application No. 2020356572, 3 pages.
Office Action, dated Oct. 13, 2023, received in Australian Patent Application No. 2020356572, 3 pages.
Final Office Action, dated Jan. 29, 2024, received in Japanese Patent Application No. 2022-515137, which corresponds with U.S. Appl. No. 17/030,219, 6 pages.
Bimber et al., "Consistent Illumination Within Optical See-Through Augmented Environments", Published in The Second IEEE and ACM International Symposium on Mixed and Augmented Reality, 2003 Proceedings, Oct. 2003, 11 pages.
Notice of Allowance, dated Apr. 23, 2024, received in U.S. Appl. No. 17/030,219, 29 pages.
Certificate of Grant, dated May 9, 2024, received in Australian Patent Application No. 2020356572, 3 pages.
Office Action, dated Apr. 19, 2024, received in Korean Patent Application No. 2022-7007795, which corresponds with U.S. Appl. No. 17/030,219, 13 pages.
Office Action, dated May 31, 2024, received in U.S. Appl. No. 17/950,035, 7 pages.
Hanging, "The Application of Interface Design and User Experience in Virtual Reality", Highlights in Science, Engineering and Technology, vol. 44, Apr. 13, 2023, 8 pages.
Office Action, dated Apr. 6, 2025, received in Chinese Patent Application No. 2022104017449, which corresponds with U.S. Appl. No. 17/030,219, 2 pages.
Written Opinion, dated May 21, 2025, received in PCT/U.S. Pat. No. 2024031448, which corresponds with U.S. Patent Application No.
Office Action, dated Aug. 29, 2025, received in Japanese Patent Application No. 2024-145780, 6 pages.

* cited by examiner

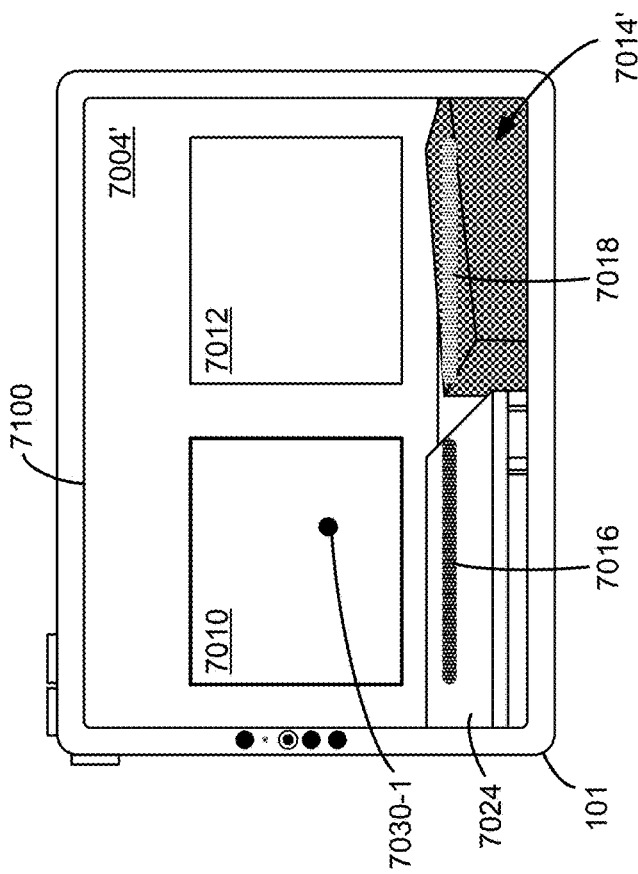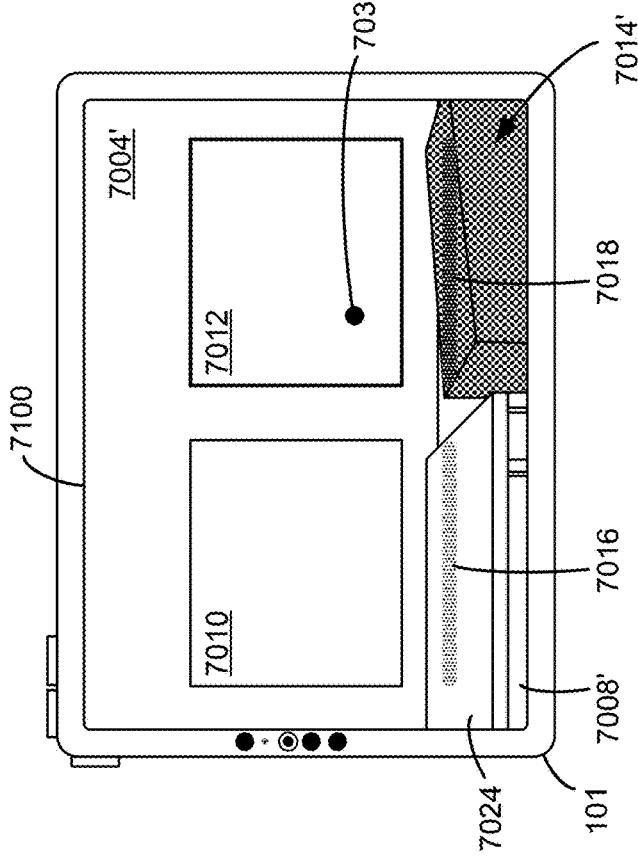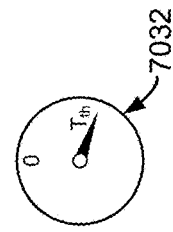
Figure 7E
Figure 7D

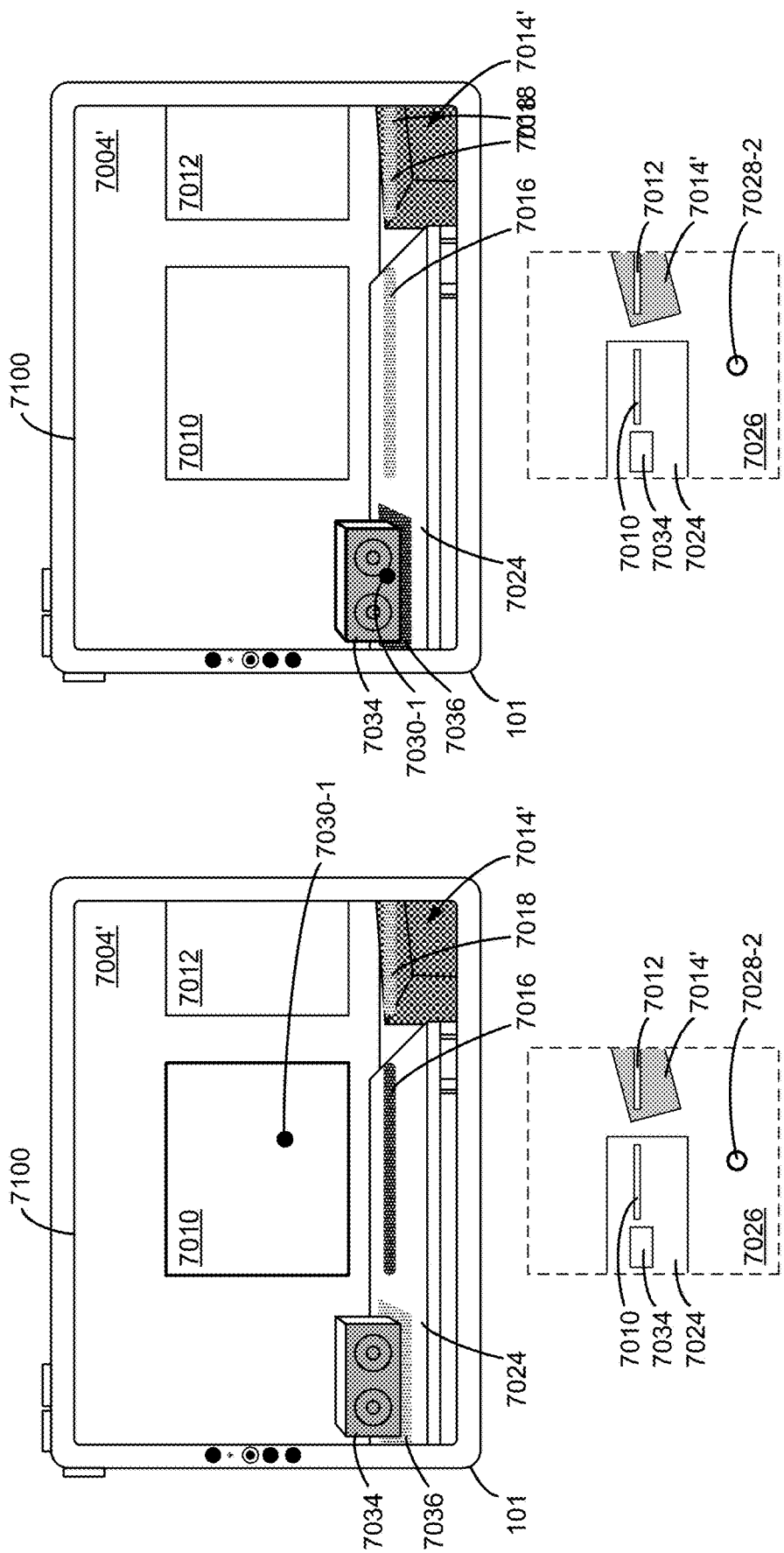

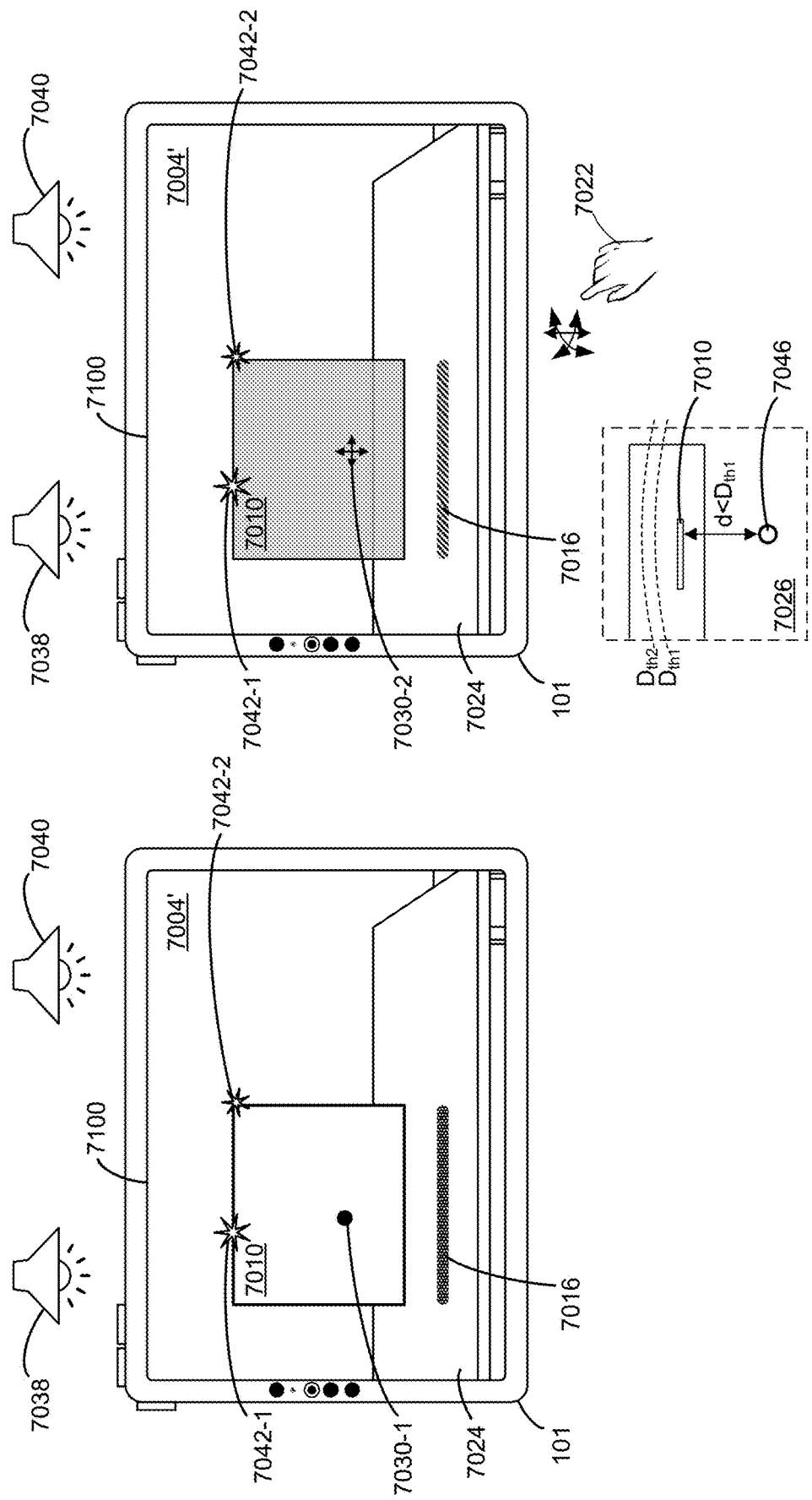

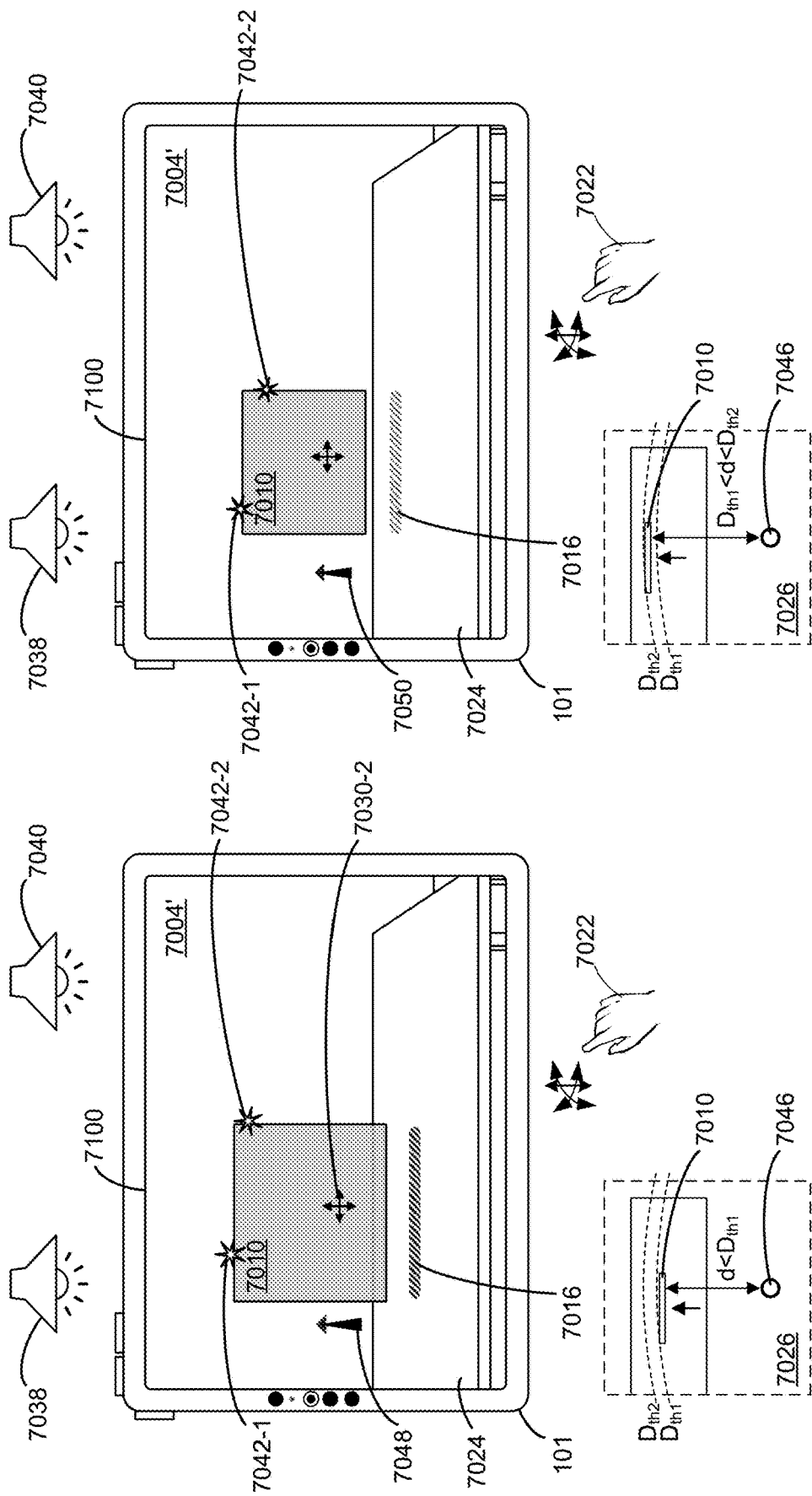

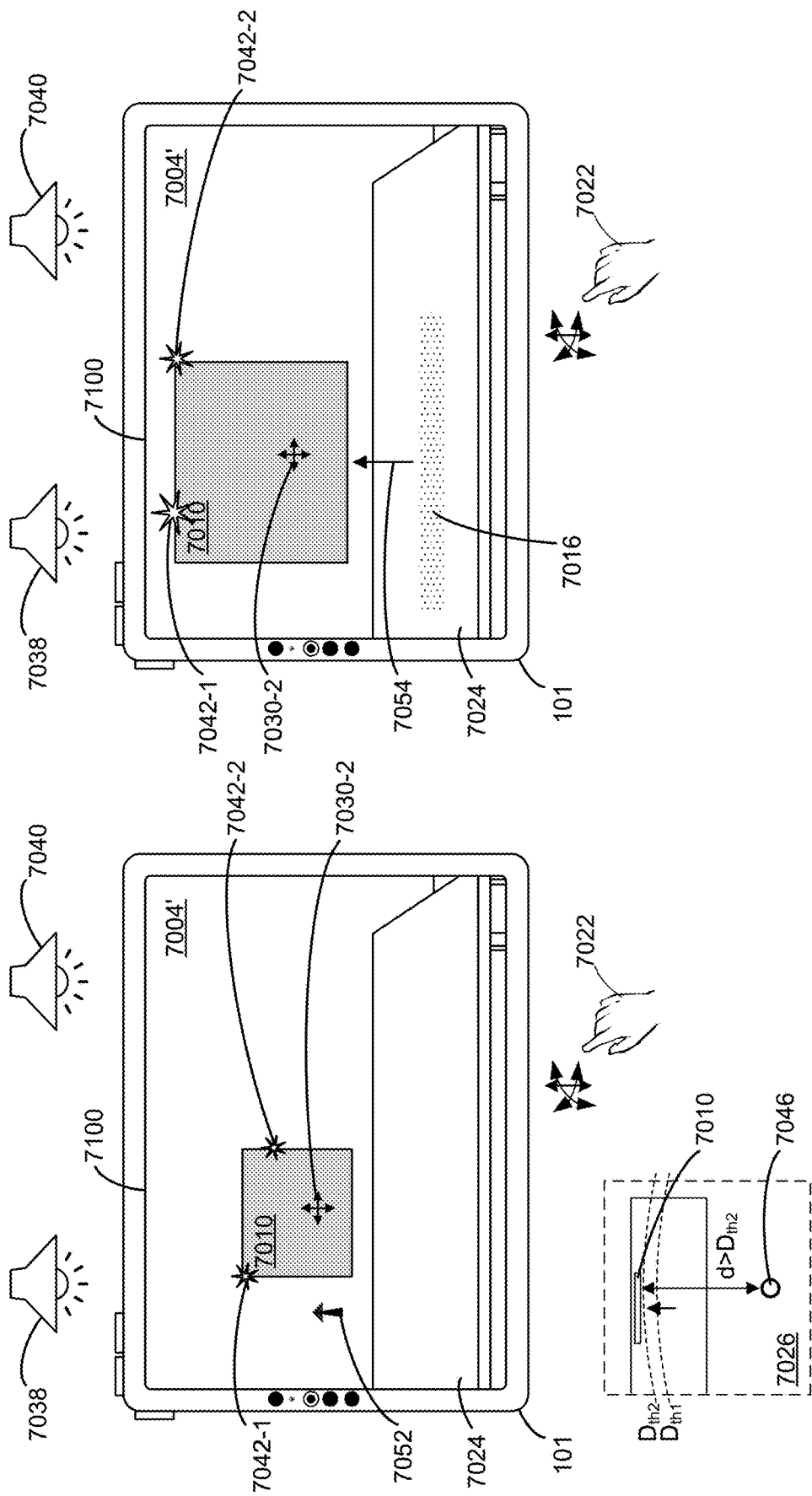

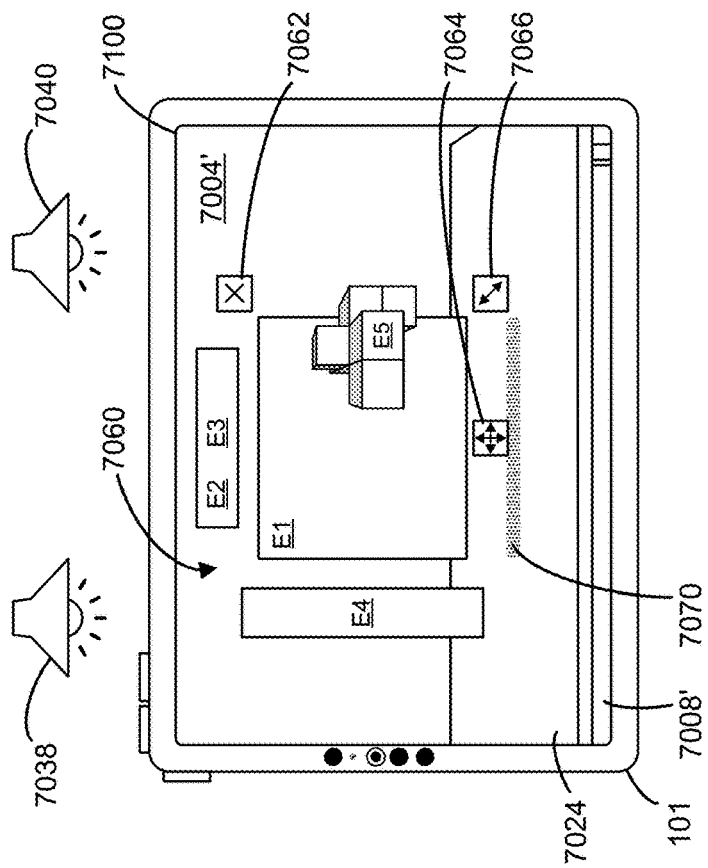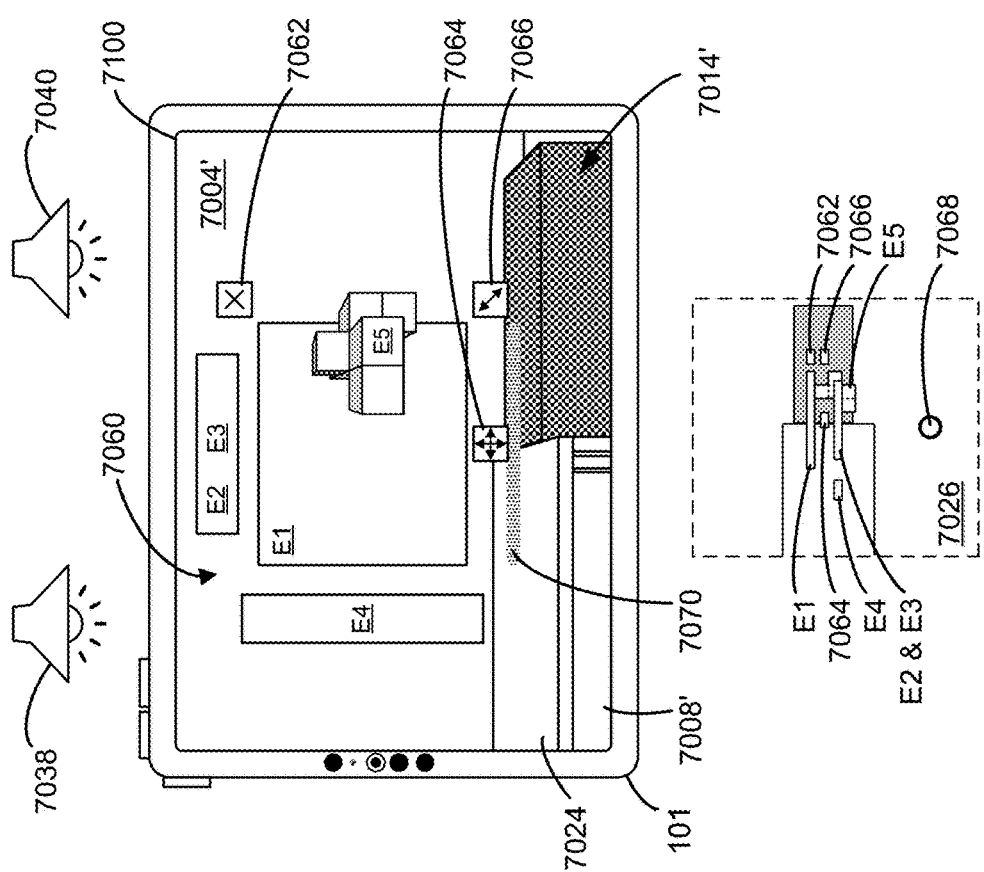
Figure 9B
Figure 9A

DEVICES, METHODS, AND GRAPHICAL USER INTERFACES FOR DISPLAYING SHADOW AND LIGHT EFFECTS IN THREE-DIMENSIONAL ENVIRONMENTS

RELATED APPLICATIONS

This application claims priority to U.S. Provisional Application Ser. No. 63/408,810, file Sep. 21, 2022, which is hereby incorporated by reference in its entirety.

TECHNICAL FIELD

The present disclosure relates generally to computer systems that are in communication with a display generation component and one or more input devices that provide computer-generated experiences, including, but not limited to, electronic devices that provide virtual reality and mixed reality experiences via a display.

BACKGROUND

The development of computer systems for augmented reality has increased significantly in recent years. Example augmented reality environments include at least some virtual elements that replace or augment the physical world. Input devices, such as cameras, controllers, joysticks, touch-sensitive surfaces, and touch-screen displays for computer systems and other electronic computing devices are used to interact with virtual/augmented reality environments. Example virtual elements include virtual objects, such as digital images, video, text, icons, and control elements such as buttons and other graphics.

SUMMARY

Some methods and interfaces for interacting with environments that include at least some virtual elements (e.g., applications, augmented reality environments, mixed reality environments, and virtual reality environments) are cumbersome, inefficient, and limited. For example, systems that provide insufficient or overly complex feedback about where objects are located in a three-dimensional environment and about spatial relationships between objects, systems that provide insufficient feedback about which object(s) have focus for interaction or are currently a target of an interaction or about which type of interaction is occurring, and systems in which the complexity of visual effects and corresponding computational burden incurred are inconsistent with the type of environment being displayed are complex, tedious, and error-prone, create a significant cognitive burden on a user, and detract from the experience with the virtual/augmented reality environment. In addition, these methods take longer than necessary, thereby wasting energy of the computer system. This latter consideration is particularly important in battery-operated devices.

Accordingly, there is a need for computer systems with improved methods and interfaces for conveying spatial relationships between objects in a three-dimensional environment and indicating the status of user interaction with objects, to make interaction with the computer systems more efficient and intuitive for a user. Such methods and interfaces optionally complement or replace conventional methods for providing extended reality experiences to users. Such methods and interfaces reduce the number, extent, and/or nature of the inputs from a user by helping the user to understand the connection between provided inputs and device responses to the inputs, thereby creating a more efficient human-machine interface.

The above deficiencies and other problems associated with user interfaces for computer systems are reduced or eliminated by the disclosed systems. In some embodiments, the computer system is a desktop computer with an associated display. In some embodiments, the computer system is portable device (e.g., a notebook computer, tablet computer, or handheld device). In some embodiments, the computer system is a personal electronic device (e.g., a wearable electronic device, such as a watch, or a head-mounted device). In some embodiments, the computer system has a touchpad. In some embodiments, the computer system has one or more cameras. In some embodiments, the computer system has a touch-sensitive display (also known as a "touch screen" or "touch-screen display"). In some embodiments, the computer system has one or more eye-tracking components. In some embodiments, the computer system has one or more hand-tracking components. In some embodiments, the computer system has one or more output devices in addition to the display generation component, the output devices including one or more tactile output generators and/or one or more audio output devices. In some embodiments, the computer system has a graphical user interface (GUI), one or more processors, memory and one or more modules, programs or sets of instructions stored in the memory for performing multiple functions. In some embodiments, the user interacts with the GUI through a stylus and/or finger contacts and gestures on the touch-sensitive surface, movement of the user's eyes and hand in space relative to the GUI (and/or computer system) or the user's body as captured by cameras and other movement sensors, and/or voice inputs as captured by one or more audio input devices. In some embodiments, the functions performed through the interactions optionally include image editing, drawing, presenting, word processing, spreadsheet making, game playing, telephoning, video conferencing, e-mailing, instant messaging, workout support, digital photographing, digital videoing, web browsing, digital music playing, note taking, and/or digital video playing. Executable instructions for performing these functions are, optionally, included in a transitory and/or non-transitory computer readable storage medium or other computer program product configured for execution by one or more processors.

There is a need for electronic devices with improved methods and interfaces for conveying spatial relationships between objects in a three-dimensional environment and indicating the status of user interaction with objects. Such methods and interfaces may complement or replace conventional methods for conveying spatial relationships between objects in a three-dimensional environment and indicating the status of user interaction with objects. Such methods and interfaces reduce the number, extent, and/or the nature of the inputs from a user and produce a more efficient human-machine interface. For battery-operated computing devices, such methods and interfaces conserve power and increase the time between battery charges.

In accordance with some embodiments, a method is performed at a computer system that is in communication with a display generation component and one or more input devices. The method includes, while a view of a three-dimensional environment is visible via the display generation component, displaying, in the three-dimensional environment, a first computer-generated user interface object. The method includes detecting that a user's attention is directed to the first user interface object. The method includes, in response to detecting that the user's attention is directed to the first user interface object, displaying a first virtual shadow for the first user interface object with a first appearance, while maintaining a pose of the first user interface object relative to the three-dimensional environment. Displaying the first virtual shadow for the first user interface object with the first appearance includes displaying the first virtual shadow with a first value for a first visual property. The method includes, while continuing to display the first user interface object in the three-dimensional environment, detecting that the user's attention has ceased to be directed to the first user interface object. The method includes, in response to detecting that the user's attention has ceased to be directed to the first user interface object, displaying the first virtual shadow for the first user interface object with a second appearance that is different from the first appearance, while maintaining the pose of the first user interface object relative to the three-dimensional environment. Displaying the first virtual shadow for the first user interface object with the second appearance includes displaying the first virtual shadow with a second value for the first visual property. The second value is different from the first value.

In accordance with some embodiments, a method is performed at a computer system that is in communication with a display generation component and one or more input devices. The method includes, while a view of an environment is visible via the display generation component, displaying, in the environment, a first user interface object at a first location in the environment and a virtual shadow corresponding to the first user interface object, including displaying the virtual shadow with a first value for a first visual property. The method includes detecting an input corresponding to a request to reposition the first user interface object from the first location in the environment to a second location in the environment that is different from the first location; and, in response to detecting the input: repositioning the first user interface object from the first location in the environment to the second location in the environment in accordance with movement of the input relative to the environment; and while repositioning the first user interface object from the first location in the environment to the second location in the environment, displaying the virtual shadow corresponding to the first user interface object with a second value for the first visual property.

In accordance with some embodiments, a method is performed at a computer system that is in communication with a display generation component and one or more input devices. The method includes, while a view of an environment is visible via the display generation component, displaying, in the environment: a group of user interface objects that are separated from one another in the environment, the group including a first user interface object at a first location in the environment and a second user interface object at a second location in the environment in accordance with a respective spatial relationship between the first user interface object and the second user interface object; and a virtual shadow corresponding to the group of user interface objects. Displaying the virtual shadow corresponding to the group of user interface objects includes displaying a first virtual shadow portion corresponding to the first user interface object at the first location in the environment without displaying a virtual shadow portion corresponding to the second user interface object in the environment. The method includes detecting a first input corresponding to a request to reposition the group of user interface objects in the environment; and, in response to detecting the first input: repositioning the group of user interface objects in the environment, including repositioning the first user interface object from the first location to a third location in the environment and repositioning the second user interface object from the second location to a fourth location in the environment, while maintaining the respective spatial relationship between the first user interface object and the second user interface object; and repositioning the virtual shadow corresponding to the group of user interface objects, including displaying the first virtual shadow portion corresponding to the first user interface object at the third location in the environment without displaying a virtual shadow portion corresponding to the second user interface object in the environment.

In accordance with some embodiments, a method is performed at a computer system that is in communication with a display generation component and one or more input devices. The method includes, while a view of an environment is visible via the display generation component, detecting an input corresponding to a request to display content in the environment. The method includes, in response to detecting the input: displaying the content in a user interface object in the environment; and displaying, in one or more portions of the environment outside of the user interface object, a visual effect corresponding to simulated light emanating from the content. Displaying the visual effect includes: in accordance with a determination that the environment is a first type of environment, displaying the visual effect with a first degree of fidelity to the content; and in accordance with a determination that the environment is a second type of environment that is different from the first type of environment, displaying the visual effect with a second degree of fidelity to the content. The second degree of fidelity is different from the first degree of fidelity.

Note that the various embodiments described above can be combined with any other embodiments described herein. The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the inventive subject matter.

BRIEF DESCRIPTION OF THE DRAWINGS

For a better understanding of the various described embodiments, reference should be made to the Description of Embodiments below, in conjunction with the following drawings in which like reference numerals refer to corresponding parts throughout the figures.

FIGS. 7A-7H illustrate example techniques for displaying attention-based shadows for user interface objects in an environment, in accordance with some embodiments.

FIGS. 8A-8J illustrate example techniques for displaying movement-based shadows for user interface objects in an environment, in accordance with some embodiments.

FIGS. 9A-9E illustrate example techniques for displaying simplified shadows for user interface objects in an environment, in accordance with some embodiments.

DESCRIPTION OF EMBODIMENTS

Figure 1:
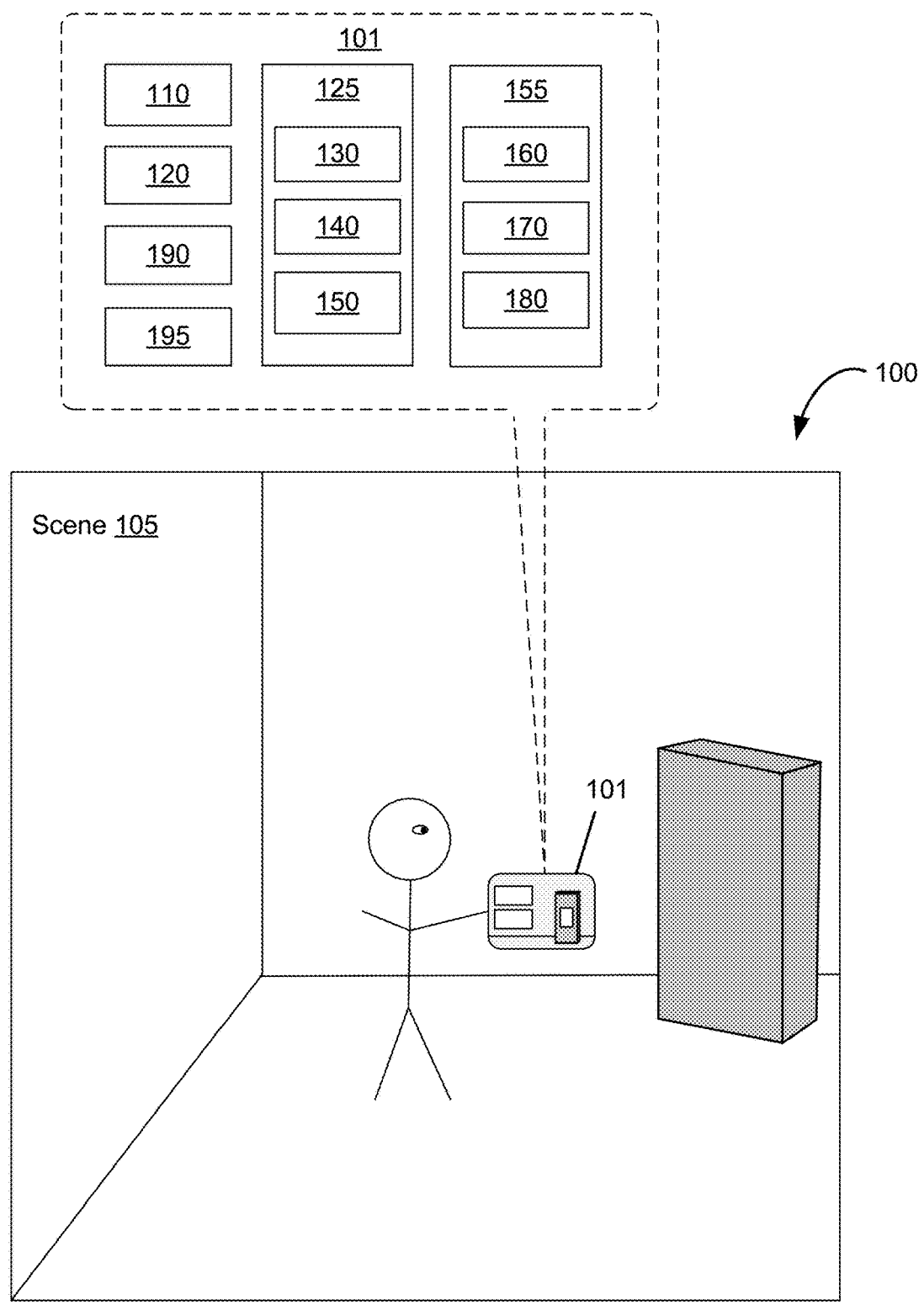
FIG. 1 is a block diagram illustrating an operating environment of a computer system for providing extended reality (XR) experiences in accordance with some embodiments.

The present disclosure relates to user interfaces for providing an extended reality (XR) experience to a user, in accordance with some embodiments.

The systems, methods, and GUIs described herein improve user interface interactions with virtual/augmented reality environments in multiple ways.

In some embodiments, a computer system displays virtual shadows for computer-generated user interface objects in a three-dimensional environment (e.g., a virtual or mixed reality environment). While detecting that a user is not directing their attention to an object, the computer system displays the shadow for the object with a first appearance, such as with a first opacity. In response to, and while, detecting that the user is directing their attention to the object, the computer system changes the appearance of the shadow for the object to a different, second appearance, such as with a different, second opacity. Displaying virtual shadows for computer-generated user interface objects helps the user understand where the objects are located in the three-dimensional environment, and changing the appearance of the corresponding shadows helps the user understand which object has focus for interaction.

In some embodiments, a computer system displays virtual shadows for computer-generated user interface objects in a three-dimensional environment (e.g., a virtual or mixed reality environment). While not detecting an input to move the object in the three-dimensional environment (e.g., before or after detecting such an input), the computer system displays the shadow for the object with a first appearance, such as with a first opacity. While detecting an input to move the object in the three-dimensional environment, the computer system displays the shadow for the object with a different, second appearance, such as with a different, second opacity, even before the object is in fact moved. Displaying virtual shadows for computer-generated user interface objects helps the user understand where the objects are located in the three-dimensional environment, and changing the appearance of the corresponding shadows during inputs to move the objects helps the user understand which object is the current target of interaction and in the process of being moved.

In some embodiments, a computer system displays a virtual shadow for a computer-generated user interface object that is a group of a plurality of constituent objects that are separated from each other in space in a three-dimensional environment (e.g., a virtual or mixed reality environment). The virtual shadow for the group of objects is a simplified shadow that includes a shadow for at least one of the constituent objects and does not include a shadow for at least one other of the constituent objects. As the group of constituent objects is moved in the three-dimensional environment, the spatial relationships of the constituent objects with each other are maintained, and the virtual shadow follows the group of constituent objects and continues to include the shadow for at least one of the constituent objects without including a shadow for at least one other of the constituent objects. Displaying simplified virtual shadows for computer-generated user interface objects helps the user understand where the objects are located in the three-dimensional environment while reducing visual clutter and reducing the computational load imposed on the computer system by task of generating shadows.

In some embodiments, a computer system ceases to display virtual shadows for computer-generated user interface objects in a three-dimensional environment (e.g., a virtual or mixed reality environment) when content in the three-dimensional environment, such as content displayed in a particular user interface object, begins playing. While the content is playing, the computer system displays a light spill visual effect that simulates light emanating from the content into surrounding portions of the three-dimensional environment. The light spill visual effect has different degrees of fidelity to the content based on the type of surrounding environment, which provides a more or less immersive experience based on the type of surrounding environment. For example, the light spill visual effect optionally has a higher degree of fidelity to content playing in a computer-generated virtual environment (e.g., by including display of light cast from the content onto other objects in the environment, and thus providing a more immersive experience) than to content playing in a mixed reality environment (e.g., by merely displaying a glow extending from the content, and thus providing a less immersive experience). Displaying light spill visual effects from content displayed in objects in a three-dimensional environment with different degrees of fidelity to the content based on the type of surrounding environment helps the user understand where the content and objects are located in the three-dimensional environment while enabling different levels of immersion and different corresponding computational burdens on the computer system.

Figure 11:
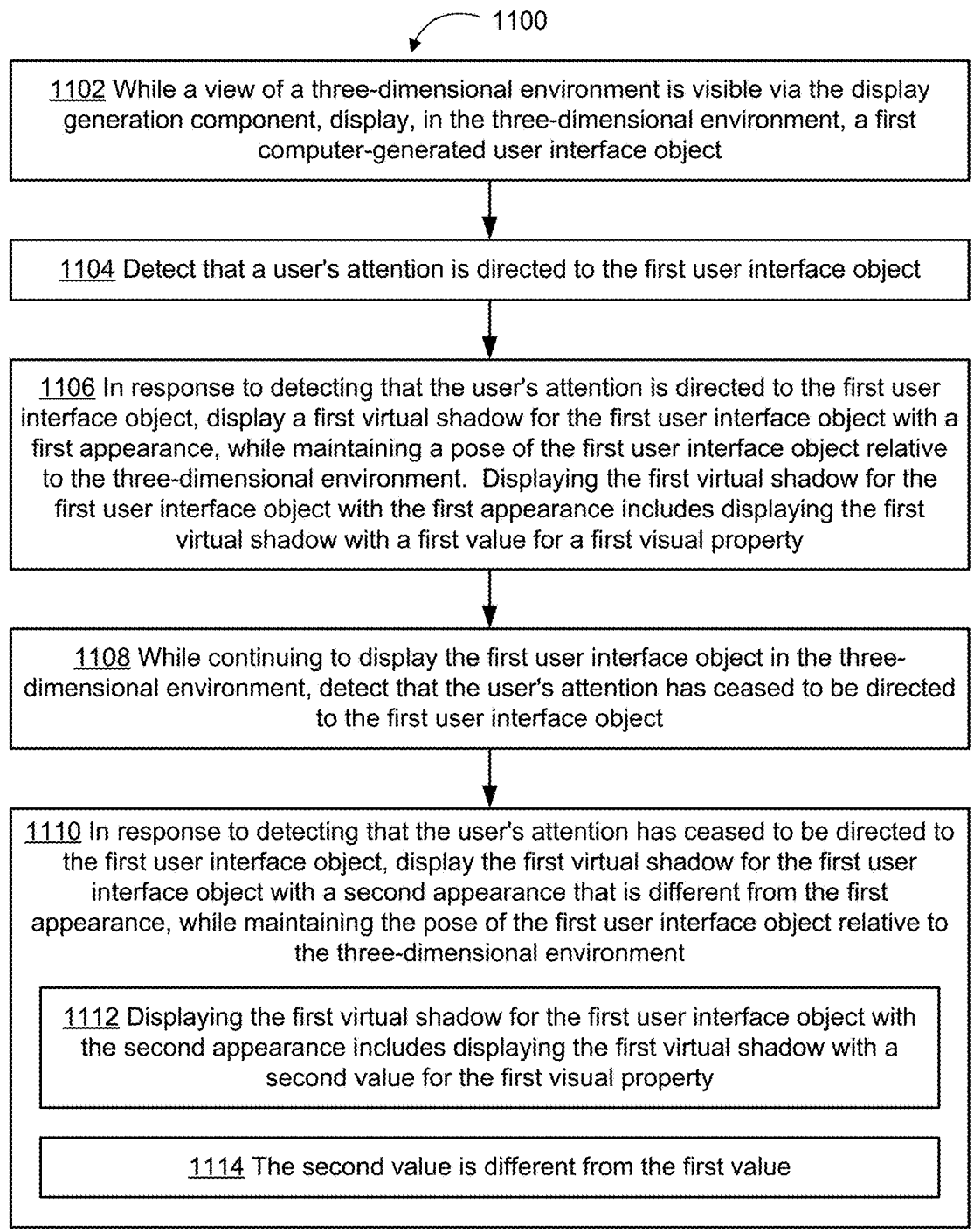
FIG. 11 is a flow diagram of methods of displaying attention-based shadows for user interface objects in an environment, in accordance with various embodiments.
Figure 12:
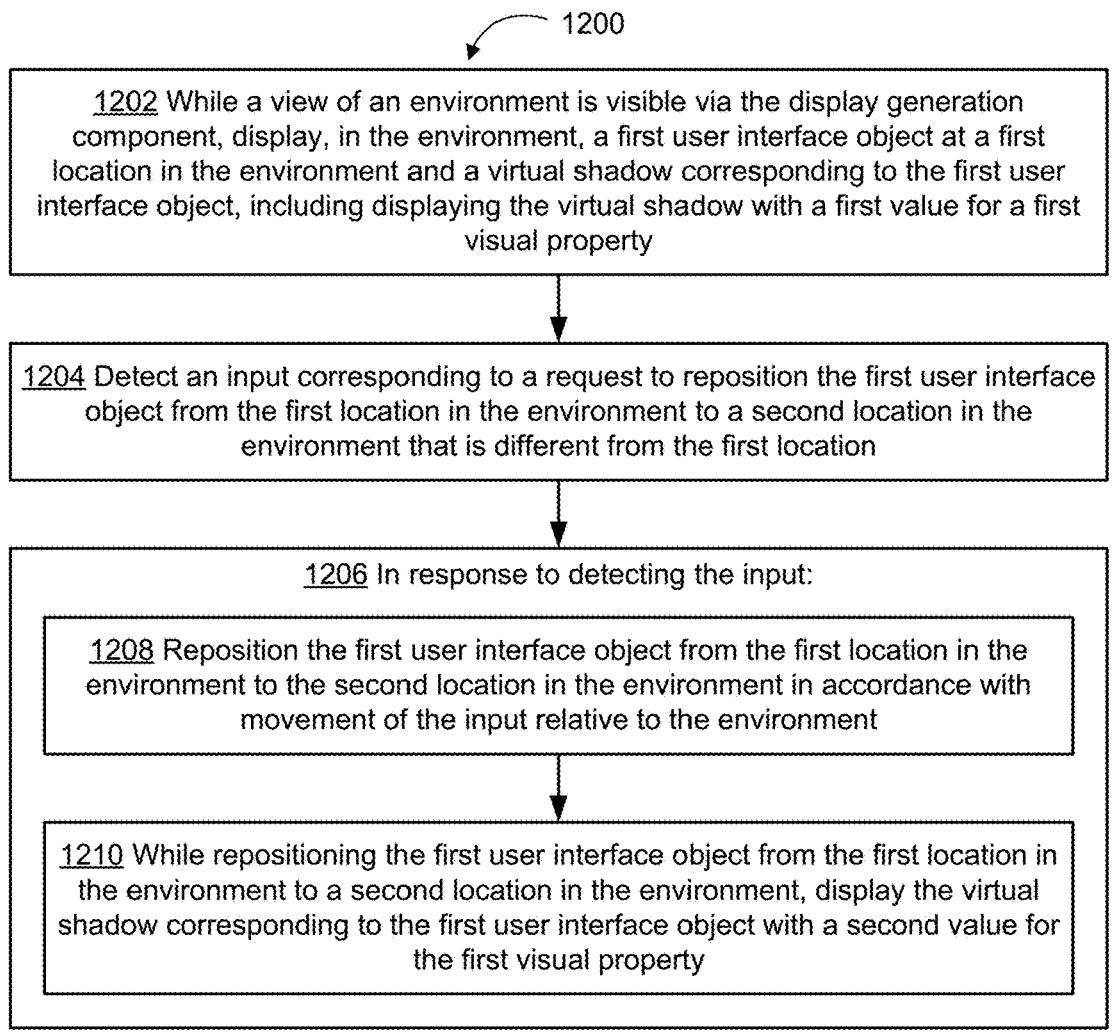
FIG. 12 is a flow diagram of methods of displaying movement-based shadows for user interface objects in an environment, in accordance with various embodiments.
Figure 13:
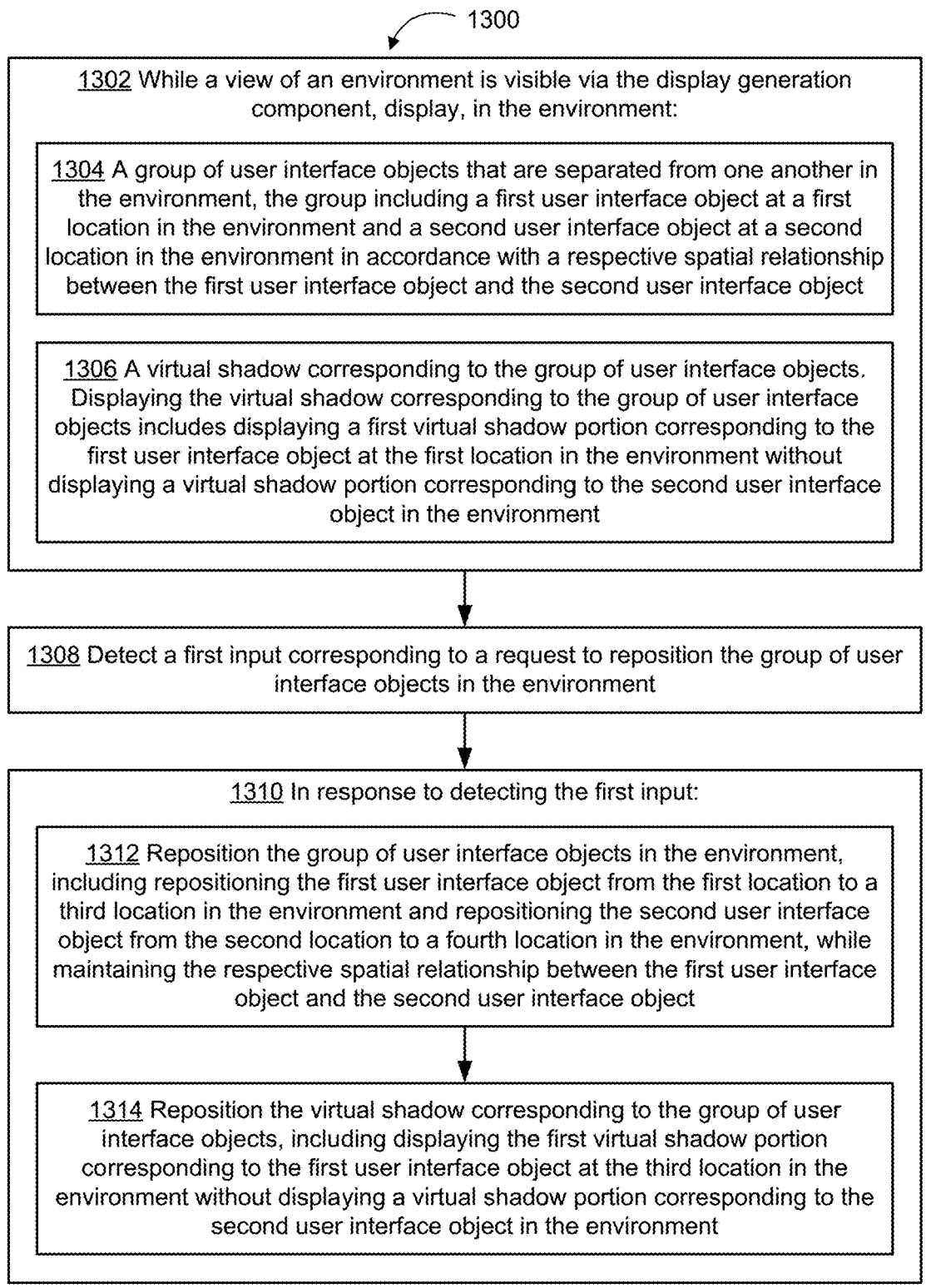
FIG. 13 is a flow diagram of methods of displaying simplified shadows for user interface objects in an environment, in accordance with various embodiments.
Figure 14:
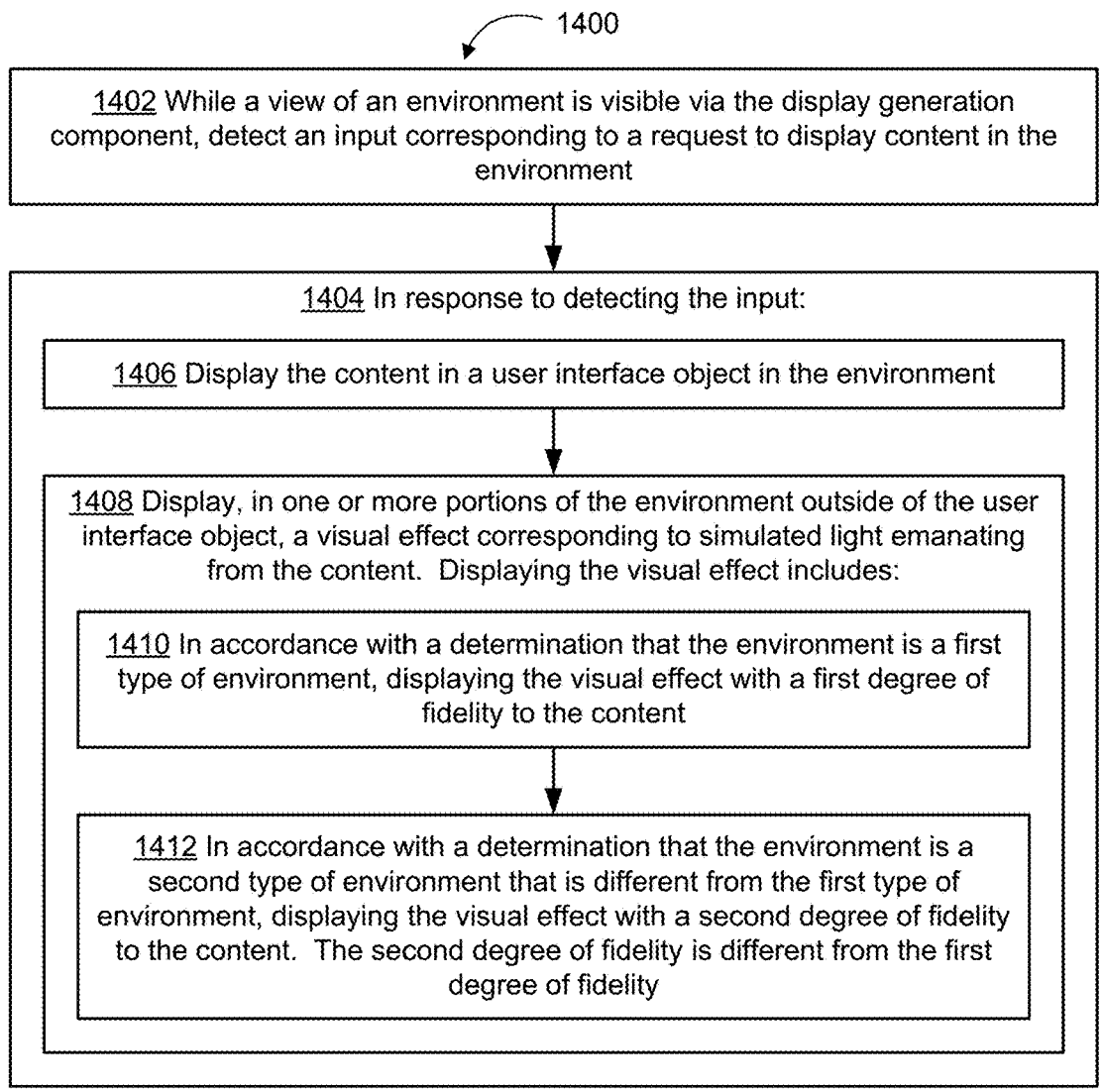
FIG. 14 is a flow diagram of methods of simulating light emanating from user interface objects displayed in an environment, in accordance with various embodiments.

FIGS. 1-6 provide a description of example computer systems for providing XR experiences to users. FIGS. 7A-7H illustrate example techniques for displaying attention-based shadows for user interface objects in an environment, in accordance with some embodiments. FIGS. 8A-8J illustrate example techniques for displaying movement-based shadows for user interface objects in an environment, in accordance with some embodiments. FIGS. 9A-9E illustrate example techniques for displaying simplified shadows for user interface objects in an environment, in accordance with some embodiments. FIGS. 10A-10E illustrate example techniques for simulating light emanating from user interface objects displayed in an environment, in accordance with some embodiments. FIG. 11 is a flow diagram of methods of displaying attention-based shadows for user interface objects in an environment, in accordance with various embodiments. FIG. 12 is a flow diagram of methods of displaying movement-based shadows for user interface objects in an environment, in accordance with various embodiments. FIG. 13 is a flow diagram of methods of displaying simplified shadows for user interface objects in an environment, in accordance with various embodiments. FIG. 14 is a flow diagram of methods of simulating light emanating from user interface objects displayed in an environment, in accordance with various embodiments. The user interfaces in FIGS. 7A-7H, 8A-8J, 9A-9E, and 10A-10E are used to illustrate the processes in FIGS. 11, 12, 13, and 14.

The processes described below enhance the operability of the devices and make the user-device interfaces more efficient (e.g., by helping the user to provide proper inputs and reducing user mistakes when operating/interacting with the device) through various techniques, including by providing improved visual, audio, and/or haptic feedback to the user, increasing user safety and reducing motion sickness often associated with XR experiences, reducing the number of inputs needed to perform an operation, providing additional control options without cluttering the user interface with additional displayed controls, performing an operation when a set of conditions has been met without requiring further user input, reducing the computational burden associated with displaying user interfaces, improving privacy and/or security, providing a more varied, detailed, and/or realistic user experience while saving storage space, and/or additional techniques. These techniques also reduce power usage and improve battery life of the device by enabling the user to use the device more quickly and efficiently. Saving on battery power, and thus weight, improves the ergonomics of the device. These techniques also enable real-time communication, allow for the use of fewer and/or less precise sensors resulting in a more compact, lighter, and cheaper device, and enable the device to be used in a variety of lighting conditions. These techniques reduce energy usage, thereby reducing heat emitted by the device, which is particularly important for a wearable device where a device well within operational parameters for device components can become uncomfortable for a user to wear if it is producing too much heat.

In addition, in methods described herein where one or more steps are contingent upon one or more conditions having been met, it should be understood that the described method can be repeated in multiple repetitions so that over the course of the repetitions all of the conditions upon which steps in the method are contingent have been met in different repetitions of the method. For example, if a method requires performing a first step if a condition is satisfied, and a second step if the condition is not satisfied, then a person of ordinary skill would appreciate that the claimed steps are repeated until the condition has been both satisfied and not satisfied, in no particular order. Thus, a method described with one or more steps that are contingent upon one or more conditions having been met could be rewritten as a method that is repeated until each of the conditions described in the method has been met. This, however, is not required of system or computer readable medium claims where the system or computer readable medium contains instructions for performing the contingent operations based on the satisfaction of the corresponding one or more conditions and thus is capable of determining whether the contingency has or has not been satisfied without explicitly repeating steps of a method until all of the conditions upon which steps in the method are contingent have been met. A person having ordinary skill in the art would also understand that, similar to a method with contingent steps, a system or computer readable storage medium can repeat the steps of a method as many times as are needed to ensure that all of the contingent steps have been performed.

In some embodiments, as shown in FIG. 1, the XR experience is provided to the user via an operating environment 100 that includes a computer system 101. The computer system 101 includes a controller 110 (e.g., processors of a portable electronic device or a remote server), a display generation component 120 (e.g., a head-mounted device (HMD), a display, a projector, a touch-screen, etc.), one or more input devices 125 (e.g., an eye tracking device 130, a hand tracking device 140, other input devices 150), one or more output devices 155 (e.g., speakers 160, tactile output generators 170, and other output devices 180), one or more sensors 190 (e.g., image sensors, light sensors, depth sensors, tactile sensors, orientation sensors, proximity sensors, temperature sensors, location sensors, motion sensors, velocity sensors, etc.), and optionally one or more peripheral devices 195 (e.g., home appliances, wearable devices, etc.). In some embodiments, one or more of the input devices 125, output devices 155, sensors 190, and peripheral devices 195 are integrated with the display generation component 120 (e.g., in a head-mounted device or a handheld device).

When describing an XR experience, various terms are used to differentially refer to several related but distinct environments that the user may sense and/or with which a user may interact (e.g., with inputs detected by a computer system 101 generating the XR experience that cause the computer system generating the XR experience to generate audio, visual, and/or tactile feedback corresponding to various inputs provided to the computer system 101). The following is a subset of these terms:

Physical environment: A physical environment refers to a physical world that people can sense and/or interact with without aid of electronic systems. Physical environments, such as a physical park, include physical articles, such as physical trees, physical buildings, and physical people. People can directly sense and/or interact with the physical environment, such as through sight, touch, hearing, taste, and smell.

Extended reality: In contrast, an extended reality (XR) environment refers to a wholly or partially simulated environment that people sense and/or interact with via an electronic system. In XR, a subset of a person's physical motions, or representations thereof, are tracked, and, in response, one or more characteristics of one or more virtual objects simulated in the XR environment are adjusted in a manner that comports with at least one law of physics. For example, an XR system may detect a person's head turning and, in response, adjust graphical content and an acoustic field presented to the person in a manner similar to how such views and sounds would change in a physical environment. In some situations (e.g., for accessibility reasons), adjustments to characteristic(s) of virtual object(s) in an XR environment may be made in response to representations of physical motions (e.g., vocal commands). A person may sense and/or interact with an XR object using any one of their senses, including sight, sound, touch, taste, and smell. For example, a person may sense and/or interact with audio objects that create a 3D or spatial audio environment that provides the perception of point audio sources in 3D space. In another example, audio objects may enable audio transparency, which selectively incorporates ambient sounds from the physical environment with or without computer-generated audio. In some XR environments, a person may sense and/or interact only with audio objects.

Examples of XR include virtual reality and mixed reality.

Virtual reality: A virtual reality (VR) environment refers to a simulated environment that is designed to be based entirely on computer-generated sensory inputs for one or more senses. A VR environment comprises a plurality of virtual objects with which a person may sense and/or interact. For example, computer-generated imagery of trees, buildings, and avatars representing people are examples of virtual objects. A person may sense and/or interact with virtual objects in the VR environment through a simulation of the person's presence within the computer-generated environment, and/or through a simulation of a subset of the person's physical movements within the computer-generated environment.

Mixed reality: In contrast to a VR environment, which is designed to be based entirely on computer-generated sensory inputs, a mixed reality (MR) environment refers to a simulated environment that is designed to incorporate sensory inputs from the physical environment, or a representation thereof, in addition to including computer-generated sensory inputs (e.g., virtual objects). On a virtuality continuum, a mixed reality environment is anywhere between, but not including, a wholly physical environment at one end and virtual reality environment at the other end. In some MR environments, computer-generated sensory inputs may respond to changes in sensory inputs from the physical environment. Also, some electronic systems for presenting an MR environment may track location and/or orientation with respect to the physical environment to enable virtual objects to interact with real objects (that is, physical articles from the physical environment or representations thereof). For example, a system may account for movements so that a virtual tree appears stationary with respect to the physical ground.

Examples of mixed realities include augmented reality and augmented virtuality.

Augmented reality: An augmented reality (AR) environment refers to a simulated environment in which one or more virtual objects are superimposed over a physical environment, or a representation thereof. For example, an electronic system for presenting an AR environment may have a transparent or translucent display through which a person may directly view the physical environment. The system may be configured to present virtual objects on the transparent or translucent display, so that a person, using the system, perceives the virtual objects superimposed over the physical environment. Alternatively, a system may have an opaque display and one or more imaging sensors that capture images or video of the physical environment, which are representations of the physical environment. The system composites the images or video with virtual objects, and presents the composition on the opaque display. A person, using the system, indirectly views the physical environment by way of the images or video of the physical environment, and perceives the virtual objects superimposed over the physical environment. As used herein, a video of the physical environment shown on an opaque display is called "pass-through video," meaning a system uses one or more image sensor(s) to capture images of the physical environment, and uses those images in presenting the AR environment on the opaque display. Further alternatively, a system may have a projection system that projects virtual objects into the physical environment, for example, as a hologram or on a physical surface, so that a person, using the system, perceives the virtual objects superimposed over the physical environment. An augmented reality environment also refers to a simulated environment in which a representation of a physical environment is transformed by computer-generated sensory information. For example, in providing pass-through video, a system may transform one or more sensor images to impose a select perspective (e.g., viewpoint) different than the perspective captured by the imaging sensors. As another example, a representation of a physical environment may be transformed by graphically modifying (e.g., enlarging) portions thereof, such that the modified portion may be representative but not photorealistic versions of the originally captured images. As a further example, a representation of a physical environment may be transformed by graphically eliminating or obfuscating portions thereof.

Augmented virtuality: An augmented virtuality (AV) environment refers to a simulated environment in which a virtual or computer-generated environment incorporates one or more sensory inputs from the physical environment. The sensory inputs may be representations of one or more characteristics of the physical environment. For example, an AV park may have virtual trees and virtual buildings, but people with faces photorealistically reproduced from images taken of physical people. As another example, a virtual object may adopt a shape or color of a physical article imaged by one or more imaging sensors. As a further example, a virtual object may adopt shadows consistent with the position of the sun in the physical environment.

Viewpoint-locked virtual object: A virtual object is viewpoint-locked when a computer system displays the virtual object at the same location and/or position in the viewpoint of the user, even as the viewpoint of the user shifts (e.g., changes). In embodiments where the computer system is a head-mounted device, the viewpoint of the user is locked to the forward facing direction of the user's head (e.g., the viewpoint of the user is at least a portion of the field-of-view of the user when the user is looking straight ahead); thus, the viewpoint of the user remains fixed even as the user's gaze is shifted, without moving the user's head. In embodiments where the computer system has a display generation component (e.g., a display screen) that can be repositioned with respect to the user's head, the viewpoint of the user is the augmented reality view that is being presented to the user on a display generation component of the computer system. For example, a viewpoint-locked virtual object that is displayed in the upper left corner of the viewpoint of the user, when the viewpoint of the user is in a first orientation (e.g., with the user's head facing north) continues to be displayed in the upper left corner of the viewpoint of the user, even as the viewpoint of the user changes to a second orientation (e.g., with the user's head facing west). In other words, the location and/or position at which the viewpoint-locked virtual object is displayed in the viewpoint of the user is independent of the user's position and/or orientation in the physical environment. In embodiments in which the computer system is a head-mounted device, the viewpoint of the user is locked to the orientation of the user's head, such that the virtual object is also referred to as a "head-locked virtual object."

Environment-locked virtual object: A virtual object is environment-locked (alternatively, "world-locked") when a computer system displays the virtual object at a location and/or position in the viewpoint of the user that is based on (e.g., selected in reference to and/or anchored to) a location and/or object in the three-dimensional environment (e.g., a physical environment or a virtual environment). As the viewpoint of the user shifts, the location and/or object in the environment relative to the viewpoint of the user changes, which results in the environment-locked virtual object being displayed at a different location and/or position in the viewpoint of the user. For example, an environment-locked virtual object that is locked onto a tree that is immediately in front of a user is displayed at the center of the viewpoint of the user. When the viewpoint of the user shifts to the right (e.g., the user's head is turned to the right) so that the tree is now left-of-center in the viewpoint of the user (e.g., the tree's position in the viewpoint of the user shifts), the environment-locked virtual object that is locked onto the tree is displayed left-of-center in the viewpoint of the user. In other words, the location and/or position at which the environment-locked virtual object is displayed in the viewpoint of the user is dependent on the position and/or orientation of the location and/or object in the environment onto which the virtual object is locked. In some embodiments, the computer system uses a stationary frame of reference (e.g., a coordinate system that is anchored to a fixed location and/or object in the physical environment) in order to determine the position at which to display an environment-locked virtual object in the viewpoint of the user. An environment-locked virtual object can be locked to a stationary part of the environment (e.g., a floor, wall, table, or other stationary object) or can be locked to a moveable part of the environment (e.g., a vehicle, animal, person, or even a representation of portion of the users body that moves independently of a viewpoint of the user, such as a user's hand, wrist, arm, or foot) so that the virtual object is moved as the viewpoint or the portion of the environment moves to maintain a fixed relationship between the virtual object and the portion of the environment.

In some embodiments a virtual object that is environment-locked or viewpoint-locked exhibits lazy follow behavior which reduces or delays motion of the environment-locked or viewpoint-locked virtual object relative to movement of a point of reference which the virtual object is following. In some embodiments, when exhibiting lazy follow behavior the computer system intentionally delays movement of the virtual object when detecting movement of a point of reference (e.g., a portion of the environment, the viewpoint, or a point that is fixed relative to the viewpoint, such as a point that is between 5-300 cm from the viewpoint) which the virtual object is following. For example, when the point of reference (e.g., the portion of the environment or the viewpoint) moves with a first speed, the virtual object is moved by the device to remain locked to the point of reference but moves with a second speed that is slower than the first speed (e.g., until the point of reference stops moving or slows down, at which point the virtual object starts to catch up to the point of reference). In some embodiments, when a virtual object exhibits lazy follow behavior the device ignores small amounts of movement of the point of reference (e.g., ignoring movement of the point of reference that is below a threshold amount of movement such as movement by 0-5 degrees or movement by 0-50 cm). For example, when the point of reference (e.g., the portion of the environment or the viewpoint to which the virtual object is locked) moves by a first amount, a distance between the point of reference and the virtual object increases (e.g., because the virtual object is being displayed so as to maintain a fixed or substantially fixed position relative to a viewpoint or portion of the environment that is different from the point of reference to which the virtual object is locked) and when the point of reference (e.g., the portion of the environment or the viewpoint to which the virtual object is locked) moves by a second amount that is greater than the first amount, a distance between the point of reference and the virtual object initially increases (e.g., because the virtual object is being displayed so as to maintain a fixed or substantially fixed position relative to a viewpoint or portion of the environment that is different from the point of reference to which the virtual object is locked) and then decreases as the amount of movement of the point of reference increases above a threshold (e.g., a "lazy follow" threshold) because the virtual object is moved by the computer system to maintain a fixed or substantially fixed position relative to the point of reference. In some embodiments the virtual object maintaining a substantially fixed position relative to the point of reference includes the virtual object being displayed within a threshold distance (e.g., 1, 2, 3, 5, 15, 20, 50 cm) of the point of reference in one or more dimensions (e.g., up/down, left/right, and/or forward/backward relative to the position of the point of reference).

Hardware: There are many different types of electronic systems that enable a person to sense and/or interact with various XR environments. Examples include head-mounted systems, projection-based systems, heads-up displays (HUDs), vehicle windshields having integrated display capability, windows having integrated display capability, displays formed as lenses designed to be placed on a person's eyes (e.g., similar to contact lenses), headphones/earphones, speaker arrays, input systems (e.g., wearable or handheld controllers with or without haptic feedback), smartphones, tablets, and desktop/laptop computers. A head-mounted system may have one or more speaker(s) and an integrated opaque display. Alternatively, a head-mounted system may be configured to accept an external opaque display (e.g., a smartphone). The head-mounted system may incorporate one or more imaging sensors to capture images or video of the physical environment, and/or one or more microphones to capture audio of the physical environment. Rather than an opaque display, a head-mounted system may have a transparent or translucent display. The transparent or translucent display may have a medium through which light representative of images is directed to a person's eyes. The display may utilize digital light projection, OLEDs, LEDs, uLEDs, liquid crystal on silicon, laser scanning light source, or any combination of these technologies. The medium may be an optical waveguide, a hologram medium, an optical combiner, an optical reflector, or any combination thereof. In one embodiment, the transparent or translucent display may be configured to become opaque selectively. Projection-based systems may employ retinal projection technology that projects graphical images onto a person's retina. Projection systems also may be configured to project virtual objects into the physical environment, for example, as a hologram or on a physical surface. In some embodiments, the controller 110 is configured to manage and coordinate an XR experience for the user. In some embodiments, the controller 110 includes a suitable combination of software, firmware, and/or hardware. The controller 110 is described in greater detail below with respect to FIG. 2. In some embodiments, the controller 110 is a computing device that is local or remote relative to the scene 105 (e.g., a physical environment). For example, the controller 110 is a local server located within the scene 105. In another example, the controller 110 is a remote server located outside of the scene 105 (e.g., a cloud server, central server, etc.). In some embodiments, the controller 110 is communicatively coupled with the display generation component 120 (e.g., an HMD, a display, a projector, a touch-screen, etc.) via one or more wired or wireless communication channels 144 (e.g., BLUETOOTH, IEEE 802.11x, IEEE 802.16x, IEEE 802.3x, etc.). In another example, the controller 110 is included within the enclosure (e.g., a physical housing) of the display generation component 120 (e.g., an HMD, or a portable electronic device that includes a display and one or more processors, etc.), one or more of the input devices 125, one or more of the output devices 155, one or more of the sensors 190, and/or one or more of the peripheral devices 195, or share the same physical enclosure or support structure with one or more of the above.

In some embodiments, the display generation component 120 is configured to provide the XR experience (e.g., at least a visual component of the XR experience) to the user. In some embodiments, the display generation component 120 includes a suitable combination of software, firmware, and/or hardware. The display generation component 120 is described in greater detail below with respect to FIG. 3. In some embodiments, the functionalities of the controller 110 are provided by and/or combined with the display generation component 120.

According to some embodiments, the display generation component 120 provides an XR experience to the user while the user is virtually and/or physically present within the scene 105.

In some embodiments, the display generation component is worn on a part of the user's body (e.g., on his/her head, on his/her hand, etc.). As such, the display generation component 120 includes one or more XR displays provided to display the XR content. For example, in various embodiments, the display generation component 120 encloses the field-of-view of the user. In some embodiments, the display generation component 120 is a handheld device (such as a smartphone or tablet) configured to present XR content, and the user holds the device with a display directed towards the field-of-view of the user and a camera directed towards the scene 105. In some embodiments, the handheld device is optionally placed within an enclosure that is worn on the head of the user. In some embodiments, the handheld device is optionally placed on a support (e.g., a tripod) in front of the user. In some embodiments, the display generation component 120 is an XR chamber, enclosure, or room configured to present XR content in which the user does not wear or hold the display generation component 120. Many user interfaces described with reference to one type of hardware for displaying XR content (e.g., a handheld device or a device on a tripod) could be implemented on another type of hardware for displaying XR content (e.g., an HMD or other wearable computing device). For example, a user interface showing interactions with XR content triggered based on interactions that happen in a space in front of a handheld or tripod mounted device could similarly be implemented with an HMD where the interactions happen in a space in front of the HMD and the responses of the XR content are displayed via the HMD. Similarly, a user interface showing interactions with XR content triggered based on movement of a handheld or tripod mounted device relative to the physical environment (e.g., the scene 105 or a part of the user's body (e.g., the user's eye(s), head, or hand)) could similarly be implemented with an HMD where the movement is caused by movement of the HMD relative to the physical environment (e.g., the scene 105 or a part of the user's body (e.g., the user's eye(s), head, or hand)).

While pertinent features of the operating environment 100 are shown in FIG. 1, those of ordinary skill in the art will appreciate from the present disclosure that various other features have not been illustrated for the sake of brevity and so as not to obscure more pertinent aspects of the example embodiments disclosed herein.

Figure 2:
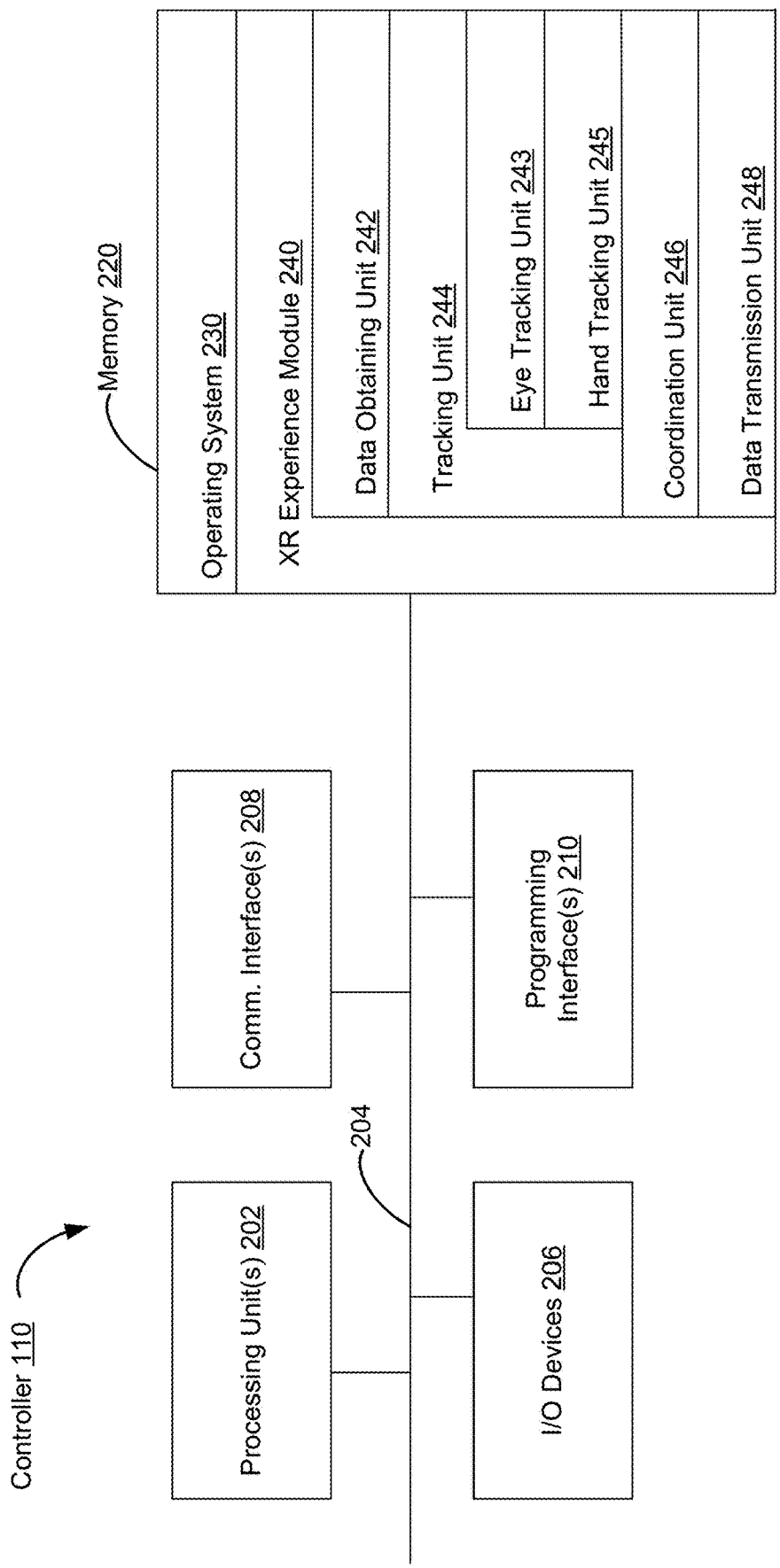
FIG. 2 is a block diagram illustrating a controller of a computer system that is configured to manage and coordinate an XR experience for the user in accordance with some embodiments.

FIG. 2 is a block diagram of an example of the controller 110 in accordance with some embodiments. While certain specific features are illustrated, those skilled in the art will appreciate from the present disclosure that various other features have not been illustrated for the sake of brevity, and so as not to obscure more pertinent aspects of the embodiments disclosed herein. To that end, as a non-limiting example, in some embodiments, the controller 110 includes one or more processing units 202 (e.g., microprocessors, application-specific integrated-circuits (ASICs), field-programmable gate arrays (FPGAs), graphics processing units (GPUs), central processing units (CPUs), processing cores, and/or the like), one or more input/output (I/O) devices 206, one or more communication interfaces 208 (e.g., universal serial bus (USB), FIREWIRE, THUNDERBOLT, IEEE 802.3x, IEEE 802.11x, IEEE 802.16x, global system for mobile communications (GSM), code division multiple access (CDMA), time division multiple access (TDMA), global positioning system (GPS), infrared (IR), BLUETOOTH, ZIGBEE, and/or the like type interface), one or more programming (e.g., I/O) interfaces 210, a memory 220, and one or more communication buses 204 for interconnecting these and various other components.

In some embodiments, the one or more communication buses 204 include circuitry that interconnects and controls communications between system components. In some embodiments, the one or more I/O devices 206 include at least one of a keyboard, a mouse, a touchpad, a joystick, one or more microphones, one or more speakers, one or more image sensors, one or more displays, and/or the like.

The memory 220 includes high-speed random-access memory, such as dynamic random-access memory (DRAM), static random-access memory (SRAM), double-data-rate random-access memory (DDR RAM), or other random-access solid-state memory devices. In some embodiments, the memory 220 includes non-volatile memory, such as one or more magnetic disk storage devices, optical disk storage devices, flash memory devices, or other non-volatile solid-state storage devices. The memory 220 optionally includes one or more storage devices remotely located from the one or more processing units 202. The memory 220 comprises a non-transitory computer readable storage medium. In some embodiments, the memory 220 or the non-transitory computer readable storage medium of the memory 220 stores the following programs, modules and data structures, or a subset thereof including an optional operating system 230 and an XR experience module 240.

The operating system 230 includes instructions for handling various basic system services and for performing hardware dependent tasks. In some embodiments, the XR experience module 240 is configured to manage and coordinate one or more XR experiences for one or more users (e.g., a single XR experience for one or more users, or multiple XR experiences for respective groups of one or more users). To that end, in various embodiments, the XR experience module 240 includes a data obtaining unit 242, a tracking unit 244, a coordination unit 246, and a data transmitting unit 248.

In some embodiments, the data obtaining unit 242 is configured to obtain data (e.g., presentation data, interaction data, sensor data, location data, etc.) from at least the display generation component 120 of FIG. 1, and optionally one or more of the input devices 125, output devices 155, sensors 190, and/or peripheral devices 195. To that end, in various embodiments, the data obtaining unit 242 includes instructions and/or logic therefor, and heuristics and metadata therefor.

In some embodiments, the tracking unit 244 is configured to map the scene 105 and to track the position/location of at least the display generation component 120 with respect to the scene 105 of FIG. 1, and optionally, to one or more of the input devices 125, output devices 155, sensors 190, and/or peripheral devices 195. To that end, in various embodiments, the tracking unit 244 includes instructions and/or logic therefor, and heuristics and metadata therefor. In some embodiments, the tracking unit 244 includes hand tracking unit 245 and/or eye tracking unit 243. In some embodiments, the hand tracking unit 245 is configured to track the position/location of one or more portions of the user's hands, and/or motions of one or more portions of the user's hands with respect to the scene 105 of FIG. 1, relative to the display generation component 120, and/or relative to a coordinate system defined relative to the user's hand. The hand tracking unit 245 is described in greater detail below with respect to FIG. 4. In some embodiments, the eye tracking unit 243 is configured to track the position and movement of the user's gaze (or more broadly, the user's eyes, face, or head) with respect to the scene 105 (e.g., with respect to the physical environment and/or to the user (e.g., the user's hand)) or with respect to the XR content displayed via the display generation component 120. The eye tracking unit 243 is described in greater detail below with respect to FIG. 5.

In some embodiments, the coordination unit 246 is configured to manage and coordinate the XR experience presented to the user by the display generation component 120, and optionally, by one or more of the output devices 155 and/or peripheral devices 195. To that end, in various embodiments, the coordination unit 246 includes instructions and/or logic therefor, and heuristics and metadata therefor.

In some embodiments, the data transmitting unit 248 is configured to transmit data (e.g., presentation data, location data, etc.) to at least the display generation component 120, and optionally, to one or more of the input devices 125, output devices 155, sensors 190, and/or peripheral devices 195. To that end, in various embodiments, the data transmitting unit 248 includes instructions and/or logic therefor, and heuristics and metadata therefor.

Although the data obtaining unit 242, the tracking unit 244 (e.g., including the eye tracking unit 243 and the hand tracking unit 245), the coordination unit 246, and the data transmitting unit 248 are shown as residing on a single device (e.g., the controller 110), it should be understood that in other embodiments, any combination of the data obtaining unit 242, the tracking unit 244 (e.g., including the eye tracking unit 243 and the hand tracking unit 245), the coordination unit 246, and the data transmitting unit 248 may be located in separate computing devices.

Moreover, FIG. 2 is intended more as functional description of the various features that may be present in a particular implementation as opposed to a structural schematic of the embodiments described herein. As recognized by those of ordinary skill in the art, items shown separately could be combined and some items could be separated. For example, some functional modules shown separately in FIG. 2 could be implemented in a single module and the various functions of single functional blocks could be implemented by one or more functional blocks in various embodiments. The actual number of modules and the division of particular functions and how features are allocated among them will vary from one implementation to another and, in some embodiments, depends in part on the particular combination of hardware, software, and/or firmware chosen for a particular implementation.

Figure 3:
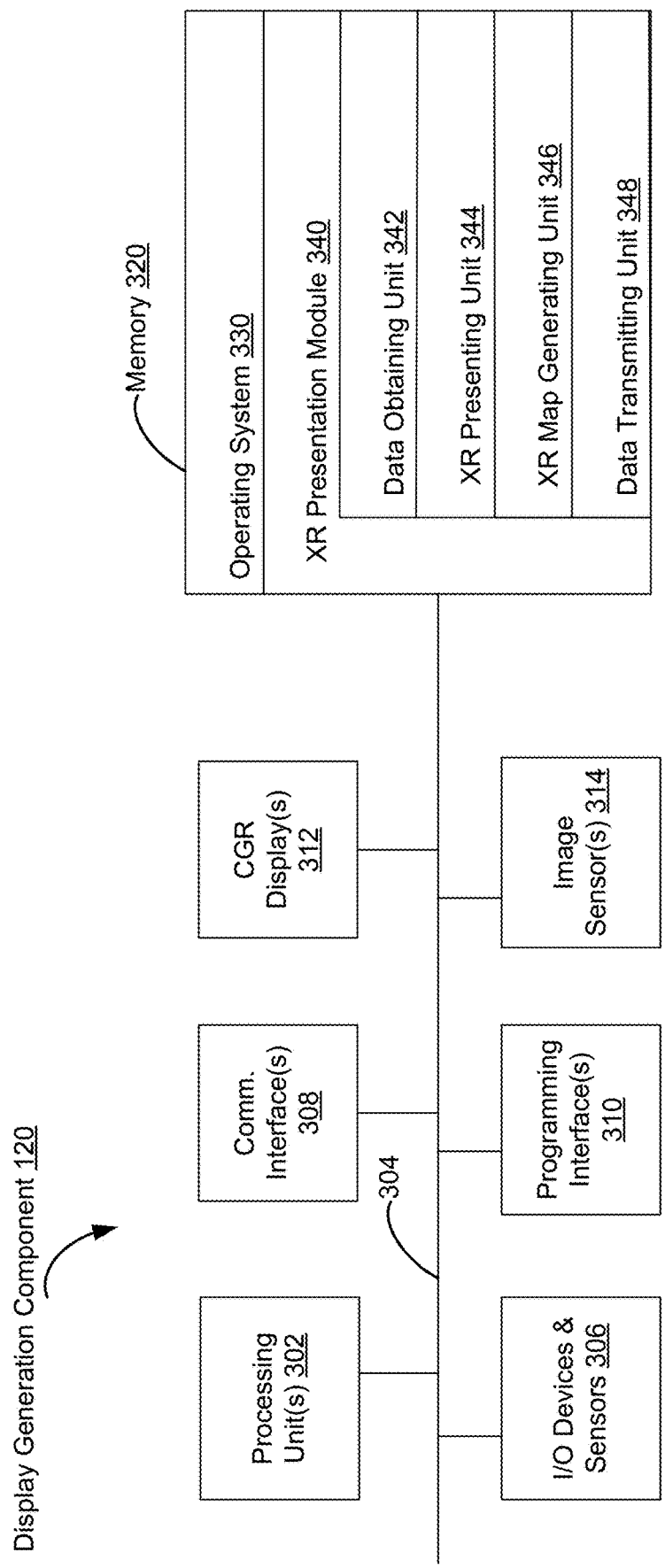
FIG. 3 is a block diagram illustrating a display generation component of a computer system that is configured to provide a visual component of the XR experience to the user in accordance with some embodiments.

FIG. 3 is a block diagram of an example of the display generation component 120 in accordance with some embodiments. While certain specific features are illustrated, those skilled in the art will appreciate from the present disclosure that various other features have not been illustrated for the sake of brevity, and so as not to obscure more pertinent aspects of the embodiments disclosed herein. To that end, as a non-limiting example, in some embodiments the display generation component 120 (e.g., HMD) includes one or more processing units 302 (e.g., microprocessors, ASICs, FPGAs, GPUs, CPUs, processing cores, and/or the like), one or more input/output (I/O) devices and sensors 306, one or more communication interfaces 308 (e.g., USB, FIREWIRE, THUNDERBOLT, IEEE 802.3x, IEEE 802.11x, IEEE 802.16x, GSM, CDMA, TDMA, GPS, IR, BLUETOOTH, ZIGBEE, and/or the like type interface), one or more programming (e.g., I/O) interfaces 310, one or more XR displays 312, one or more optional interior- and/or exterior-facing image sensors 314, a memory 320, and one or more communication buses 304 for interconnecting these and various other components.

In some embodiments, the one or more communication buses 304 include circuitry that interconnects and controls communications between system components. In some embodiments, the one or more I/O devices and sensors 306 include at least one of an inertial measurement unit (IMU), an accelerometer, a gyroscope, a thermometer, one or more physiological sensors (e.g., blood pressure monitor, heart rate monitor, blood oxygen sensor, blood glucose sensor, etc.), one or more microphones, one or more speakers, a haptics engine, one or more depth sensors (e.g., a structured light, a time-of-flight, or the like), and/or the like.

In some embodiments, the one or more XR displays 312 are configured to provide the XR experience to the user. In some embodiments, the one or more XR displays 312 correspond to holographic, digital light processing (DLP), liquid-crystal display (LCD), liquid-crystal on silicon (LCoS), organic light-emitting field-effect transistor (OLET), organic light-emitting diode (OLED), surface-conduction electron-emitter display (SED), field-emission display (FED), quantum-dot light-emitting diode (QD-LED), micro-electro-mechanical system (MEMS), and/or the like display types. In some embodiments, the one or more XR displays 312 correspond to diffractive, reflective, polarized, holographic, etc. waveguide displays. For example, the display generation component 120 (e.g., HMD) includes a single XR display. In another example, the display generation component 120 includes an XR display for each eye of the user. In some embodiments, the one or more XR displays 312 are capable of presenting MR and VR content. In some embodiments, the one or more XR displays 312 are capable of presenting MR or VR content.

In some embodiments, the one or more image sensors 314 are configured to obtain image data that corresponds to at least a portion of the face of the user that includes the eyes of the user (and may be referred to as an eye-tracking camera). In some embodiments, the one or more image sensors 314 are configured to obtain image data that corresponds to at least a portion of the user's hand(s) and optionally arm(s) of the user (and may be referred to as a hand-tracking camera). In some embodiments, the one or more image sensors 314 are configured to be forward-facing so as to obtain image data that corresponds to the scene as would be viewed by the user if the display generation component 120 (e.g., HMD) was not present (and may be referred to as a scene camera). The one or more optional image sensors 314 can include one or more RGB cameras (e.g., with a complimentary metal-oxide-semiconductor (CMOS) image sensor or a charge-coupled device (CCD) image sensor), one or more infrared (IR) cameras, one or more event-based cameras, and/or the like.

The memory 320 includes high-speed random-access memory, such as DRAM, SRAM, DDR RAM, or other random-access solid-state memory devices. In some embodiments, the memory 320 includes non-volatile memory, such as one or more magnetic disk storage devices, optical disk storage devices, flash memory devices, or other non-volatile solid-state storage devices. The memory 320 optionally includes one or more storage devices remotely located from the one or more processing units 302. The memory 320 comprises a non-transitory computer readable storage medium. In some embodiments, the memory 320 or the non-transitory computer readable storage medium of the memory 320 stores the following programs, modules and data structures, or a subset thereof including an optional operating system 330 and an XR presentation module 340.

The operating system 330 includes instructions for handling various basic system services and for performing hardware dependent tasks. In some embodiments, the XR presentation module 340 is configured to present XR content to the user via the one or more XR displays 312. To that end, in various embodiments, the XR presentation module 340 includes a data obtaining unit 342, an XR presenting unit 344, an XR map generating unit 346, and a data transmitting unit 348.

In some embodiments, the data obtaining unit 342 is configured to obtain data (e.g., presentation data, interaction data, sensor data, location data, etc.) from at least the controller 110 of FIG. 1. To that end, in various embodiments, the data obtaining unit 342 includes instructions and/or logic therefor, and heuristics and metadata therefor.

In some embodiments, the XR presenting unit 344 is configured to present XR content via the one or more XR displays 312. To that end, in various embodiments, the XR presenting unit 344 includes instructions and/or logic therefor, and heuristics and metadata therefor.

In some embodiments, the XR map generating unit 346 is configured to generate an XR map (e.g., a 3D map of the mixed reality scene or a map of the physical environment into which computer-generated objects can be placed to generate the extended reality) based on media content data. To that end, in various embodiments, the XR map generating unit 346 includes instructions and/or logic therefor, and heuristics and metadata therefor.

In some embodiments, the data transmitting unit 348 is configured to transmit data (e.g., presentation data, location data, etc.) to at least the controller 110, and optionally one or more of the input devices 125, output devices 155, sensors 190, and/or peripheral devices 195. To that end, in various embodiments, the data transmitting unit 348 includes instructions and/or logic therefor, and heuristics and metadata therefor.

Although the data obtaining unit 342, the XR presenting unit 344, the XR map generating unit 346, and the data transmitting unit 348 are shown as residing on a single device (e.g., the display generation component 120 of FIG. 1), it should be understood that in other embodiments, any combination of the data obtaining unit 342, the XR presenting unit 344, the XR map generating unit 346, and the data transmitting unit 348 may be located in separate computing devices.

Moreover, FIG. 3 is intended more as a functional description of the various features that could be present in a particular implementation as opposed to a structural schematic of the embodiments described herein. As recognized by those of ordinary skill in the art, items shown separately could be combined and some items could be separated. For example, some functional modules shown separately in FIG. 3 could be implemented in a single module and the various functions of single functional blocks could be implemented by one or more functional blocks in various embodiments. The actual number of modules and the division of particular functions and how features are allocated among them will vary from one implementation to another and, in some embodiments, depends in part on the particular combination of hardware, software, and/or firmware chosen for a particular implementation.

Figure 4:
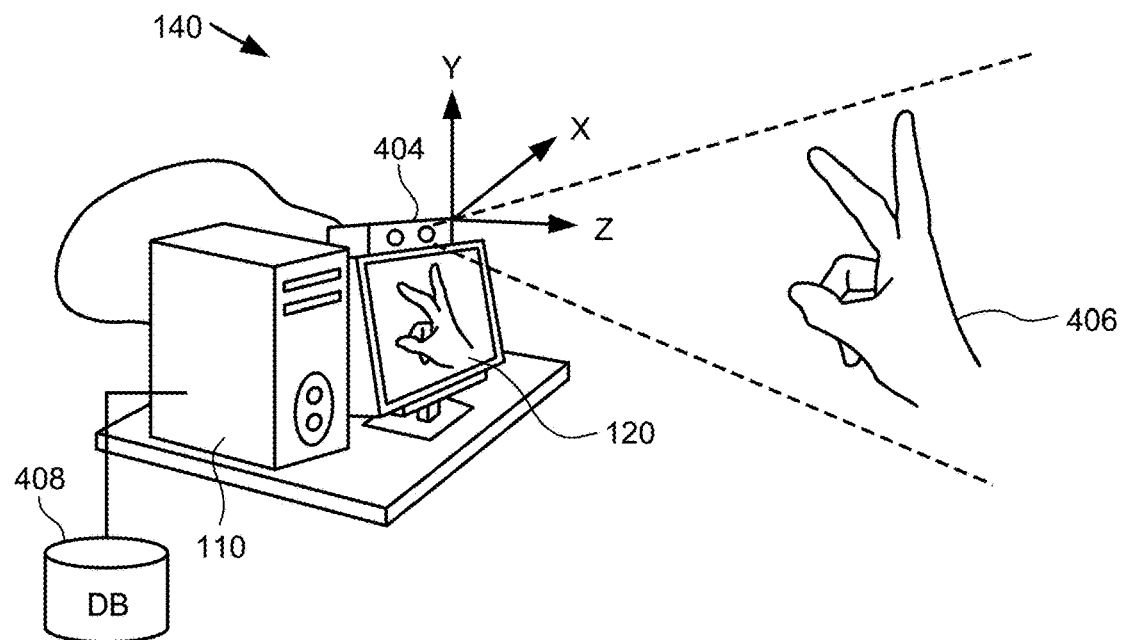
FIG. 4 is a block diagram illustrating a hand tracking unit of a computer system that is configured to capture gesture inputs of the user in accordance with some embodiments.
Figure 4:
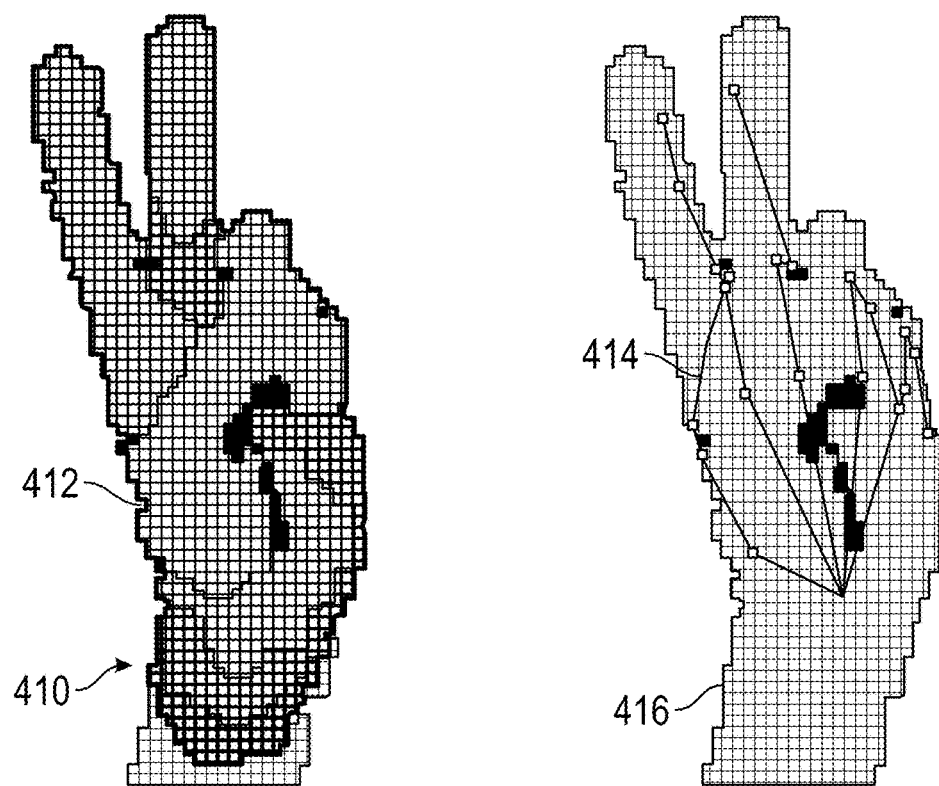

FIG. 4 is a schematic, pictorial illustration of an example embodiment of the hand tracking device 140. In some embodiments, hand tracking device 140 (FIG. 1) is controlled by hand tracking unit 245 (FIG. 2) to track the position/location of one or more portions of the user's hands, and/or motions of one or more portions of the user's hands with respect to the scene 105 of FIG. 1 (e.g., with respect to a portion of the physical environment surrounding the user, with respect to the display generation component 120, or with respect to a portion of the user (e.g., the user's face, eyes, or head), and/or relative to a coordinate system defined relative to the user's hand. In some embodiments, the hand tracking device 140 is part of the display generation component 120 (e.g., embedded in or attached to a head-mounted device). In some embodiments, the hand tracking device 140 is separate from the display generation component 120 (e.g., located in separate housings or attached to separate physical support structures).

In some embodiments, the hand tracking device 140 includes image sensors 404 (e.g., one or more IR cameras, 3D cameras, depth cameras, and/or color cameras, etc.) that capture three-dimensional scene information that includes at least a hand 406 of a human user. The image sensors 404 capture the hand images with sufficient resolution to enable the fingers and their respective positions to be distinguished. The image sensors 404 typically capture images of other parts of the user's body, as well, or possibly all of the body, and may have either zoom capabilities or a dedicated sensor with enhanced magnification to capture images of the hand with the desired resolution. In some embodiments, the image sensors 404 also capture 2D color video images of the hand 406 and other elements of the scene. In some embodiments, the image sensors 404 are used in conjunction with other image sensors to capture the physical environment of the scene 105, or serve as the image sensors that capture the physical environment of the scene 105. In some embodiments, the image sensors 404 are positioned relative to the user or the user's environment in a way that a field of view of the image sensors or a portion thereof is used to define an interaction space in which hand movement captured by the image sensors are treated as inputs to the controller 110.

In some embodiments, the image sensors 404 output a sequence of frames containing 3D map data (and possibly color image data, as well) to the controller 110, which extracts high-level information from the map data. This high-level information is typically provided via an Application Program Interface (API) to an application running on the controller, which drives the display generation component 120 accordingly. For example, the user may interact with software running on the controller 110 by moving their hand 406 and/or changing their hand posture.

In some embodiments, the image sensors 404 project a pattern of spots onto a scene containing the hand 406 and capture an image of the projected pattern. In some embodiments, the controller 110 computes the 3D coordinates of points in the scene (including points on the surface of the user's hand) by triangulation, based on transverse shifts of the spots in the pattern. This approach is advantageous in that it does not require the user to hold or wear any sort of beacon, sensor, or other marker. It gives the depth coordinates of points in the scene relative to a predetermined reference plane, at a certain distance from the image sensors 404. In the present disclosure, the image sensors 404 are assumed to define an orthogonal set of x, y, z axes, so that depth coordinates of points in the scene correspond to z components measured by the image sensors. Alternatively, the image sensors 404 (e.g., a hand tracking device) may use other methods of 3D mapping, such as stereoscopic imaging or time-of-flight measurements, based on single or multiple cameras or other types of sensors.

In some embodiments, the hand tracking device 140 captures and processes a temporal sequence of depth maps containing the user's hand, while the user moves their hand (e.g., whole hand or one or more fingers). Software running on a processor in the image sensors 404 and/or the controller 110 processes the 3D map data to extract patch descriptors of the hand in these depth maps. The software matches these descriptors to patch descriptors stored in a database 408, based on a prior learning process, in order to estimate the pose of the hand in each frame. The pose typically includes 3D locations of the user's hand joints and fingertips.

The software may also analyze the trajectory of the hands and/or fingers over multiple frames in the sequence in order to identify gestures. The pose estimation functions described herein may be interleaved with motion tracking functions, so that patch-based pose estimation is performed only once in every two (or more) frames, while tracking is used to find changes in the pose that occur over the remaining frames. The pose, motion, and gesture information are provided via the above-mentioned API to an application program running on the controller 110. This program may, for example, move and modify images presented on the display generation component 120, or perform other functions, in response to the pose and/or gesture information.

In some embodiments, a gesture includes an air gesture. An air gesture is a gesture that is detected without the user touching (or independently of) an input element that is part of a device (e.g., computer system 101, one or more input device 125, and/or hand tracking device 140) and is based on detected motion of a portion (e.g., the head, one or more arms, one or more hands, one or more fingers, and/or one or more legs) of the user's body through the air including motion of the user's body relative to an absolute reference (e.g., an angle of the user's arm relative to the ground or a distance of the user's hand relative to the ground), relative to another portion of the user's body (e.g., movement of a hand of the user relative to a shoulder of the user, movement of one hand of the user relative to another hand of the user, and/or movement of a finger of the user relative to another finger or portion of a hand of the user), and/or absolute motion of a portion of the user's body (e.g., a tap gesture that includes movement of a hand in a predetermined pose by a predetermined amount and/or speed, or a shake gesture that includes a predetermined speed or amount of rotation of a portion of the user's body).

In some embodiments, input gestures used in the various examples and embodiments described herein include air gestures performed by movement of the user's finger(s) relative to other finger(s) or part(s) of the user's hand) for interacting with an XR environment (e.g., a virtual or mixed-reality environment), in accordance with some embodiments. In some embodiments, an air gesture is a gesture that is detected without the user touching an input element that is part of the device (or independently of an input element that is a part of the device) and is based on detected motion of a portion of the user's body through the air including motion of the user's body relative to an absolute reference (e.g., an angle of the user's arm relative to the ground or a distance of the user's hand relative to the ground), relative to another portion of the user's body (e.g., movement of a hand of the user relative to a shoulder of the user, movement of one hand of the user relative to another hand of the user, and/or movement of a finger of the user relative to another finger or portion of a hand of the user), and/or absolute motion of a portion of the user's body (e.g., a tap gesture that includes movement of a hand in a predetermined pose by a predetermined amount and/or speed, or a shake gesture that includes a predetermined speed or amount of rotation of a portion of the user's body).

In some embodiments in which the input gesture is an air gesture (e.g., in the absence of physical contact with an input device that provides the computer system with information about which user interface element is the target of the user input, such as contact with a user interface element displayed on a touchscreen, or contact with a mouse or trackpad to move a cursor to the user interface element), the gesture takes into account the user's attention (e.g., gaze) to determine the target of the user input (e.g., for direct inputs, as described below). Thus, in implementations involving air gestures, the input gesture is, for example, detected attention (e.g., gaze) toward the user interface element in combination (e.g., concurrent) with movement of a user's finger(s) and/or hands to perform a pinch and/or tap input, as described in more detail below.

In some embodiments, input gestures that are directed to a user interface object are performed directly or indirectly with reference to a user interface object. For example, a user input is performed directly on the user interface object in accordance with performing the input gesture with the user's hand at a position that corresponds to the position of the user interface object in the three-dimensional environment (e.g., as determined based on a current viewpoint of the user). In some embodiments, the input gesture is performed indirectly on the user interface object in accordance with the user performing the input gesture while a position of the user's hand is not at the position that corresponds to the position of the user interface object in the three-dimensional environment while detecting the user's attention (e.g., gaze) on the user interface object. For example, for direct input gesture, the user is enabled to direct the user's input to the user interface object by initiating the gesture at, or near, a position corresponding to the displayed position of the user interface object (e.g., within 0.5 cm, 1 cm, 5 cm, or a distance between 0-5 cm, as measured from an outer edge of the option or a center portion of the option). For an indirect input gesture, the user is enabled to direct the user's input to the user interface object by paying attention to the user interface object (e.g., by gazing at the user interface object) and, while paying attention to the option, the user initiates the input gesture (e.g., at any position that is detectable by the computer system) (e.g., at a position that does not correspond to the displayed position of the user interface object).

In some embodiments, input gestures (e.g., air gestures) used in the various examples and embodiments described herein include pinch inputs and tap inputs, for interacting with a virtual or mixed-reality environment, in accordance with some embodiments. For example, the pinch inputs and tap inputs described below are performed as air gestures.

In some embodiments, a pinch input is part of an air gesture that includes one or more of: a pinch gesture, a long pinch gesture, a pinch and drag gesture, or a double pinch gesture. For example, a pinch gesture that is an air gesture includes movement of two or more fingers of a hand to make contact with one another, that is, optionally, followed by an immediate (e.g., within 0-1 seconds) break in contact from each other. A long pinch gesture that is an air gesture includes movement of two or more fingers of a hand to make contact with one another for at least a threshold amount of time (e.g., at least 1 second), before detecting a break in contact with one another. For example, a long pinch gesture includes the user holding a pinch gesture (e.g., with the two or more fingers making contact), and the long pinch gesture continues until a break in contact between the two or more fingers is detected. In some embodiments, a double pinch gesture that is an air gesture comprises two (e.g., or more) pinch inputs (e.g., performed by the same hand) detected in immediate (e.g., within a predefined time period) succession of each other. For example, the user performs a first pinch input (e.g., a pinch input or a long pinch input), releases the first pinch input (e.g., breaks contact between the two or more fingers), and performs a second pinch input within a predefined time period (e.g., within 1 second or within 2 seconds) after releasing the first pinch input.

In some embodiments, a pinch and drag gesture that is an air gesture includes a pinch gesture (e.g., a pinch gesture or a long pinch gesture) performed in conjunction with (e.g., followed by) a drag input that changes a position of the user's hand from a first position (e.g., a start position of the drag) to a second position (e.g., an end position of the drag). In some embodiments, the user maintains the pinch gesture while performing the drag input, and releases the pinch gesture (e.g., opens their two or more fingers) to end the drag gesture (e.g., at the second position). In some embodiments, the pinch input and the drag input are performed by the same hand (e.g., the user pinches two or more fingers to make contact with one another and moves the same hand to the second position in the air with the drag gesture). In some embodiments, the pinch input is performed by a first hand of the user and the drag input is performed by the second hand of the user (e.g., the user's second hand moves from the first position to the second position in the air while the user continues the pinch input with the user's first hand. In some embodiments, an input gesture that is an air gesture includes inputs (e.g., pinch and/or tap inputs) performed using both of the user's two hands. For example, the input gesture includes two (e.g., or more) pinch inputs performed in conjunction with (e.g., concurrently with, or within a predefined time period of) each other. For example, a first pinch gesture performed using a first hand of the user (e.g., a pinch input, a long pinch input, or a pinch and drag input), and, in conjunction with performing the pinch input using the first hand, performing a second pinch input using the other hand (e.g., the second hand of the user's two hands). In some embodiments, movement between the user's two hands (e.g., to increase and/or decrease a distance or relative orientation between the user's two hands).

In some embodiments, a tap input (e.g., directed to a user interface element) performed as an air gesture includes movement of a user's finger(s) toward the user interface element, movement of the user's hand toward the user interface element optionally with the user's finger(s) extended toward the user interface element, a downward motion of a user's finger (e.g., mimicking a mouse click motion or a tap on a touchscreen), or other predefined movement of the user's hand. In some embodiments a tap input that is performed as an air gesture is detected based on movement characteristics of the finger or hand performing the tap gesture movement of a finger or hand away from the viewpoint of the user and/or toward an object that is the target of the tap input followed by an end of the movement. In some embodiments the end of the movement is detected based on a change in movement characteristics of the finger or hand performing the tap gesture (e.g., an end of movement away from the viewpoint of the user and/or toward the object that is the target of the tap input, a reversal of direction of movement of the finger or hand, and/or a reversal of a direction of acceleration of movement of the finger or hand).

In some embodiments, attention of a user is determined to be directed to a portion of the three-dimensional environment based on detection of gaze directed to the portion of the three-dimensional environment (optionally, without requiring other conditions). In some embodiments, attention of a user is determined to be directed to a portion of the three-dimensional environment based on detection of gaze directed to the portion of the three-dimensional environment with one or more additional conditions such as requiring that gaze is directed to the portion of the three-dimensional environment for at least a threshold duration (e.g., a dwell duration) and/or requiring that the gaze is directed to the portion of the three-dimensional environment while the viewpoint of the user is within a distance threshold from the portion of the three-dimensional environment in order for the device to determine that attention of the user is directed to the portion of the three-dimensional environment, where if one of the additional conditions is not met, the device determines that attention is not directed to the portion of the three-dimensional environment toward which gaze is directed (e.g., until the one or more additional conditions are met).

In some embodiments, the detection of a ready state configuration of a user or a portion of a user is detected by the computer system. Detection of a ready state configuration of a hand is used by a computer system as an indication that the user is likely preparing to interact with the computer system using one or more air gesture inputs performed by the hand (e.g., a pinch, tap, pinch and drag, double pinch, long pinch, or other air gesture described herein). For example, the ready state of the hand is determined based on whether the hand has a predetermined hand shape (e.g., a pre-pinch shape with a thumb and one or more fingers extended and spaced apart ready to make a pinch or grab gesture or a pre-tap with one or more fingers extended and palm facing away from the user), based on whether the hand is in a predetermined position relative to a viewpoint of the user (e.g., below the user's head and above the user's waist and extended out from the body by at least 15, 20, 25, 30, or 50 cm), and/or based on whether the hand has moved in a particular manner (e.g., moved toward a region in front of the user above the user's waist and below the user's head or moved away from the user's body or leg). In some embodiments, the ready state is used to determine whether interactive elements of the user interface respond to attention (e.g., gaze) inputs.

In some embodiments, the software may be downloaded to the controller 110 in electronic form, over a network, for example, or it may alternatively be provided on tangible, non-transitory media, such as optical, magnetic, or electronic memory media. In some embodiments, the database 408 is likewise stored in a memory associated with the controller 110. Alternatively or additionally, some or all of the described functions of the computer may be implemented in dedicated hardware, such as a custom or semi-custom integrated circuit or a programmable digital signal processor (DSP). Although the controller 110 is shown in FIG. 4, by way of example, as a separate unit from the image sensors 404, some or all of the processing functions of the controller may be performed by a suitable microprocessor and software or by dedicated circuitry within the housing of the image sensors 404 (e.g., a hand tracking device) or otherwise associated with the image sensors 404. In some embodiments, at least some of these processing functions may be carried out by a suitable processor that is integrated with the display generation component 120 (e.g., in a television set, a handheld device, or head-mounted device, for example) or with any other suitable computerized device, such as a game console or media player. The sensing functions of image sensors 404 may likewise be integrated into the computer or other computerized apparatus that is to be controlled by the sensor output.

FIG. 4 further includes a schematic representation of a depth map 410 captured by the image sensors 404, in accordance with some embodiments. The depth map, as explained above, comprises a matrix of pixels having respective depth values. The pixels 412 corresponding to the hand 406 have been segmented out from the background and the wrist in this map. The brightness of each pixel within the depth map 410 corresponds inversely to its depth value, i.e., the measured z distance from the image sensors 404, with the shade of gray growing darker with increasing depth. The controller 110 processes these depth values in order to identify and segment a component of the image (i.e., a group of neighboring pixels) having characteristics of a human hand. These characteristics, may include, for example, overall size, shape and motion from frame to frame of the sequence of depth maps.

FIG. 4 also schematically illustrates a hand skeleton 414 that controller 110 ultimately extracts from the depth map 410 of the hand 406, in accordance with some embodiments. In FIG. 4, the hand skeleton 414 is superimposed on a hand background 416 that has been segmented from the original depth map. In some embodiments, key feature points of the hand (e.g., points corresponding to knuckles, fingertips, center of the palm, end of the hand connecting to wrist, etc.) and optionally on the wrist or arm connected to the hand are identified and located on the hand skeleton 414. In some embodiments, location and movements of these key feature points over multiple image frames are used by the controller 110 to determine the hand gestures performed by the hand or the current state of the hand, in accordance with some embodiments.

Figure 5:
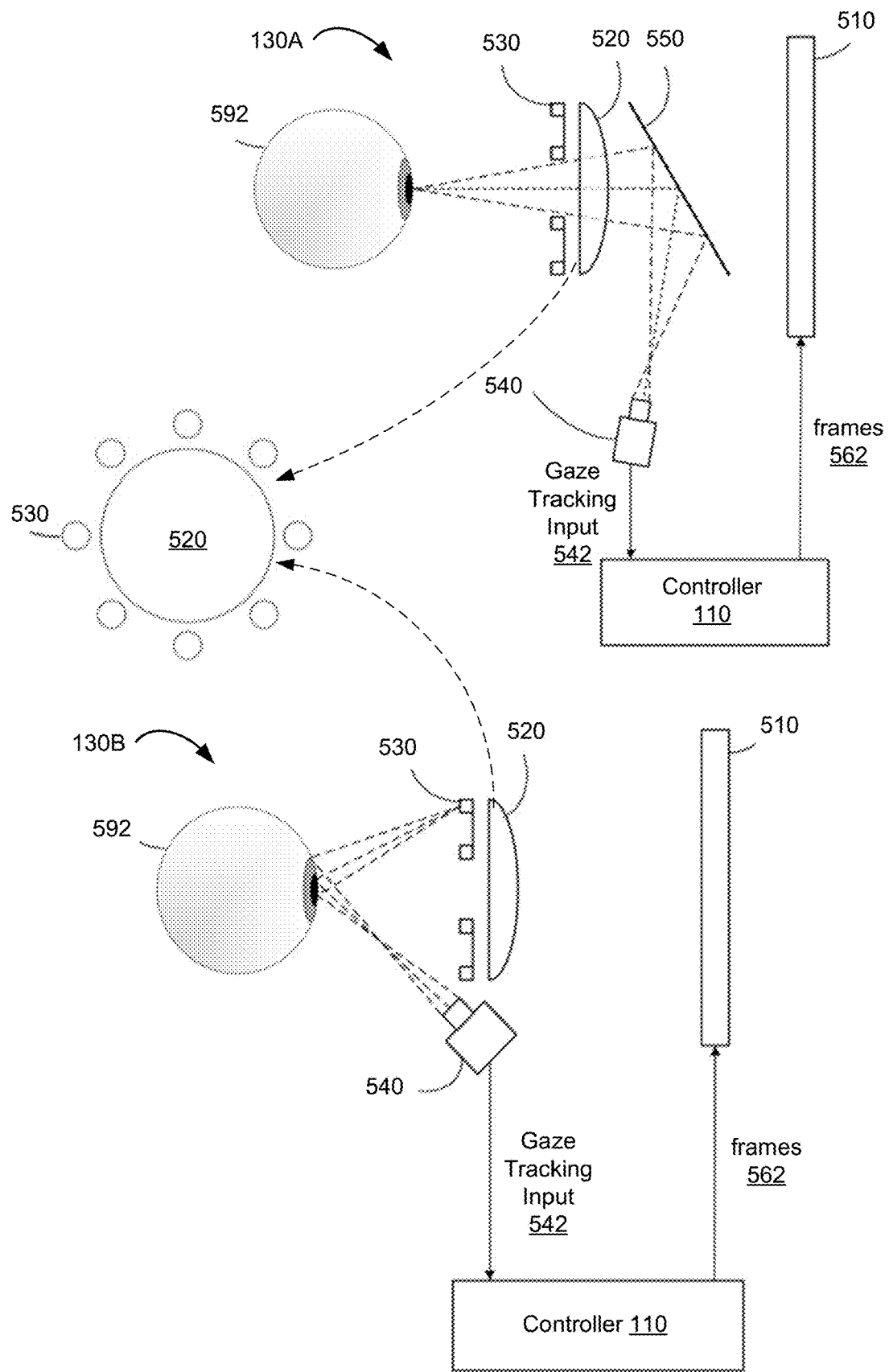
FIG. 5 is a block diagram illustrating an eye tracking unit of a computer system that is configured to capture gaze inputs of the user in accordance with some embodiments.

FIG. 5 illustrates an example embodiment of the eye tracking device 130 (FIG. 1). In some embodiments, the eye tracking device 130 is controlled by the eye tracking unit 243 (FIG. 2) to track the position and movement of the user's gaze with respect to the scene 105 or with respect to the XR content displayed via the display generation component 120. In some embodiments, the eye tracking device 130 is integrated with the display generation component 120. For example, in some embodiments, when the display generation component 120 is a head-mounted device such as headset, helmet, goggles, or glasses, or a handheld device placed in a wearable frame, the head-mounted device includes both a component that generates the XR content for viewing by the user and a component for tracking the gaze of the user relative to the XR content. In some embodiments, the eye tracking device 130 is separate from the display generation component 120. For example, when display generation component is a handheld device or an XR chamber, the eye tracking device 130 is optionally a separate device from the handheld device or XR chamber. In some embodiments, the eye tracking device 130 is a head-mounted device or part of a head-mounted device. In some embodiments, the head-mounted eye-tracking device 130 is optionally used in conjunction with a display generation component that is also head-mounted, or a display generation component that is not head-mounted. In some embodiments, the eye tracking device 130 is not a head-mounted device, and is optionally used in conjunction with a head-mounted display generation component. In some embodiments, the eye tracking device 130 is not a head-mounted device, and is optionally part of a non-head-mounted display generation component.

In some embodiments, the display generation component 120 uses a display mechanism (e.g., left and right near-eye display panels) for displaying frames including left and right images in front of a user's eyes to thus provide 3D virtual views to the user. For example, a head-mounted display generation component may include left and right optical lenses (referred to herein as eye lenses) located between the display and the user's eyes. In some embodiments, the display generation component may include or be coupled to one or more external video cameras that capture video of the user's environment for display. In some embodiments, a head-mounted display generation component may have a transparent or semi-transparent display through which a user may view the physical environment directly and display virtual objects on the transparent or semi-transparent display. In some embodiments, display generation component projects virtual objects into the physical environment. The virtual objects may be projected, for example, on a physical surface or as a holograph, so that an individual, using the system, observes the virtual objects superimposed over the physical environment. In such cases, separate display panels and image frames for the left and right eyes may not be necessary.

As shown in FIG. 5, in some embodiments, eye tracking device 130 (e.g., a gaze tracking device) includes at least one eye tracking camera (e.g., infrared (IR) or near-IR (NIR) cameras), and illumination sources (e.g., IR or NIR light sources such as an array or ring of LEDs) that emit light (e.g., IR or NIR light) towards the user's eyes. The eye tracking cameras may be pointed towards the user's eyes to receive reflected IR or NIR light from the light sources directly from the eyes, or alternatively may be pointed towards "hot" mirrors located between the user's eyes and the display panels that reflect IR or NIR light from the eyes to the eye tracking cameras while allowing visible light to pass. The eye tracking device 130 optionally captures images of the user's eyes (e.g., as a video stream captured at 60-120 frames per second (fps)), analyze the images to generate gaze tracking information, and communicate the gaze tracking information to the controller 110. In some embodiments, two eyes of the user are separately tracked by respective eye tracking cameras and illumination sources. In some embodiments, only one eye of the user is tracked by a respective eye tracking camera and illumination sources.

In some embodiments, the eye tracking device 130 is calibrated using a device-specific calibration process to determine parameters of the eye tracking device for the specific operating environment 100, for example the 3D geometric relationship and parameters of the LEDs, cameras, hot mirrors (if present), eye lenses, and display screen. The device-specific calibration process may be performed at the factory or another facility prior to delivery of the AR/VR equipment to the end user. The device-specific calibration process may be an automated calibration process or a manual calibration process. A user-specific calibration process may include an estimation of a specific user's eye parameters, for example the pupil location, fovea location, optical axis, visual axis, eye spacing, etc. Once the device-specific and user-specific parameters are determined for the eye tracking device 130, images captured by the eye tracking cameras can be processed using a glint-assisted method to determine the current visual axis and point of gaze of the user with respect to the display, in accordance with some embodiments.

As shown in FIG. 5, the eye tracking device 130 (e.g., 130A or 130B) includes eye lens(es) 520, and a gaze tracking system that includes at least one eye tracking camera 540 (e.g., infrared (IR) or near-IR (NIR) cameras) positioned on a side of the user's face for which eye tracking is performed, and an illumination source 530 (e.g., IR or NIR light sources such as an array or ring of NIR light-emitting diodes (LEDs)) that emit light (e.g., IR or NIR light) towards the user's eye(s) 592. The eye tracking cameras 540 may be pointed towards mirrors 550 located between the user's eye(s) 592 and a display 510 (e.g., a left or right display panel of a head-mounted display, or a display of a handheld device, a projector, etc.) that reflect IR or NIR light from the eye(s) 592 while allowing visible light to pass (e.g., as shown in the top portion of FIG. 5), or alternatively may be pointed towards the user's eye(s) 592 to receive reflected IR or NIR light from the eye(s) 592 (e.g., as shown in the bottom portion of FIG. 5).

In some embodiments, the controller 110 renders AR or VR frames 562 (e.g., left and right frames for left and right display panels) and provides the frames 562 to the display 510. The controller 110 uses gaze tracking input 542 from the eye tracking cameras 540 for various purposes, for example in processing the frames 562 for display. The controller 110 optionally estimates the user's point of gaze on the display 510 based on the gaze tracking input 542 obtained from the eye tracking cameras 540 using the glint-assisted methods or other suitable methods. The point of gaze estimated from the gaze tracking input 542 is optionally used to determine the direction in which the user is currently looking.

The following describes several possible use cases for the user's current gaze direction, and is not intended to be limiting. As an example use case, the controller 110 may render virtual content differently based on the determined direction of the user's gaze. For example, the controller 110 may generate virtual content at a higher resolution in a foveal region determined from the user's current gaze direction than in peripheral regions. As another example, the controller may position or move virtual content in the view based at least in part on the user's current gaze direction. As another example, the controller may display particular virtual content in the view based at least in part on the user's current gaze direction. As another example use case in AR applications, the controller 110 may direct external cameras for capturing the physical environments of the XR experience to focus in the determined direction. The autofocus mechanism of the external cameras may then focus on an object or surface in the environment that the user is currently looking at on the display 510. As another example use case, the eye lenses 520 may be focusable lenses, and the gaze tracking information is used by the controller to adjust the focus of the eye lenses 520 so that the virtual object that the user is currently looking at has the proper vergence to match the convergence of the user's eyes 592. The controller 110 may leverage the gaze tracking information to direct the eye lenses 520 to adjust focus so that close objects that the user is looking at appear at the right distance.

In some embodiments, the eye tracking device is part of a head-mounted device that includes a display (e.g., display 510), two eye lenses (e.g., eye lens(es) 520), eye tracking cameras (e.g., eye tracking camera(s) 540), and light sources (e.g., light sources 530 (e.g., IR or NIR LEDs), mounted in a wearable housing. The light sources emit light (e.g., IR or NIR light) towards the user's eye(s) 592. In some embodiments, the light sources may be arranged in rings or circles around each of the lenses as shown in FIG. 5. In some embodiments, eight light sources 530 (e.g., LEDs) are arranged around each lens 520 as an example. However, more or fewer light sources 530 may be used, and other arrangements and locations of light sources 530 may be used.

In some embodiments, the display 510 emits light in the visible light range and does not emit light in the IR or NIR range, and thus does not introduce noise in the gaze tracking system. Note that the location and angle of eye tracking camera(s) 540 is given by way of example, and is not intended to be limiting. In some embodiments, a single eye tracking camera 540 is located on each side of the user's face. In some embodiments, two or more NIR cameras 540 may be used on each side of the user's face. In some embodiments, a camera 540 with a wider field of view (FOV) and a camera 540 with a narrower FOV may be used on each side of the user's face. In some embodiments, a camera 540 that operates at one wavelength (e.g., 850 nm) and a camera 540 that operates at a different wavelength (e.g., 940 nm) may be used on each side of the user's face.

Embodiments of the gaze tracking system as illustrated in FIG. 5 may, for example, be used in computer-generated reality, virtual reality, and/or mixed reality applications to provide computer-generated reality, virtual reality, augmented reality, and/or augmented virtuality experiences to the user.

Figure 6:
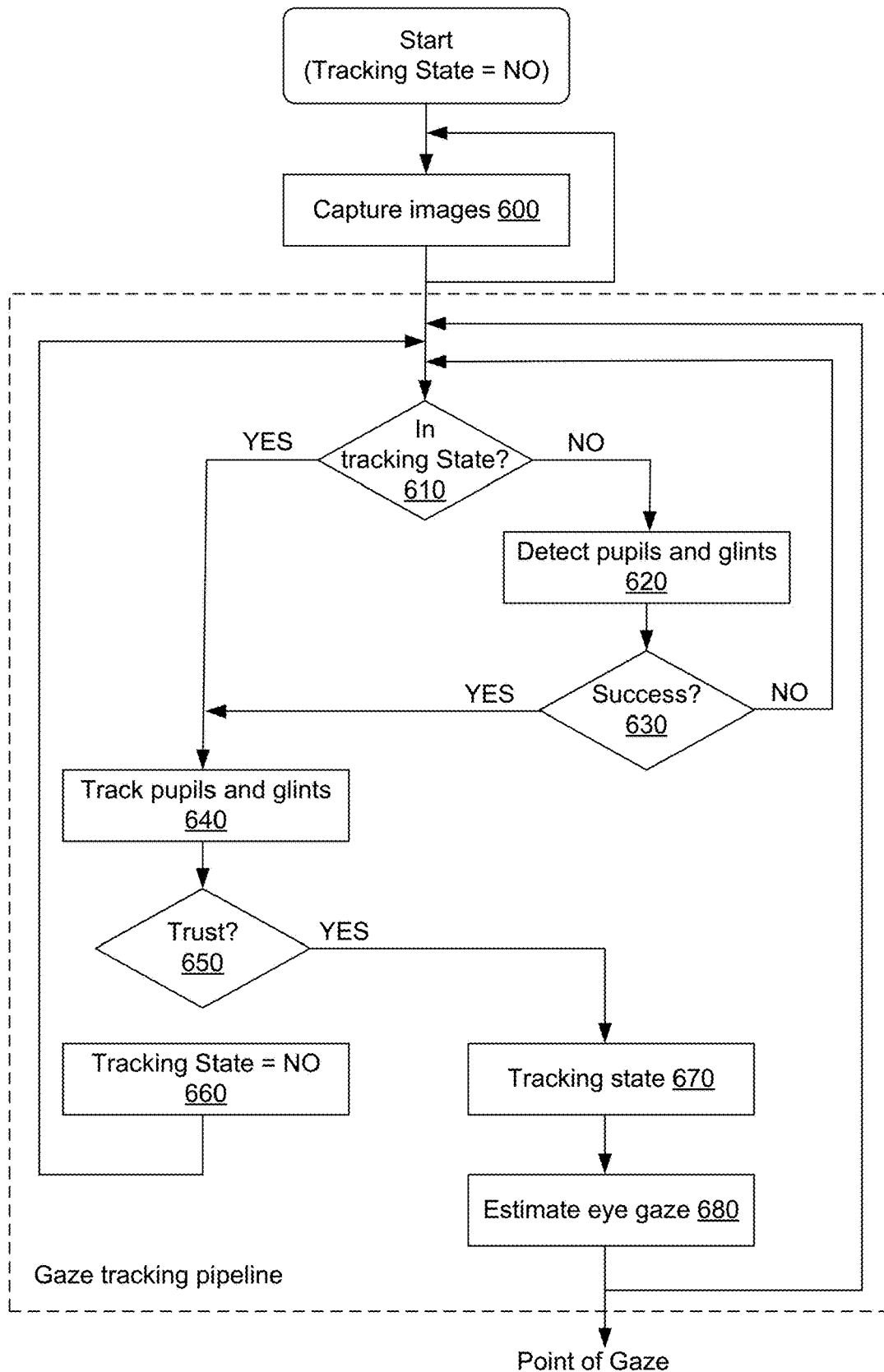
FIG. 6 is a flow diagram illustrating a glint-assisted gaze tracking pipeline in accordance with some embodiments.

FIG. 6 illustrates a glint-assisted gaze tracking pipeline, in accordance with some embodiments. In some embodiments, the gaze tracking pipeline is implemented by a glint-assisted gaze tracking system (e.g., eye tracking device 130 as illustrated in FIGS. 1 and 5). The glint-assisted gaze tracking system may maintain a tracking state. Initially, the tracking state is off or "NO". When in the tracking state, the glint-assisted gaze tracking system uses prior information from the previous frame when analyzing the current frame to track the pupil contour and glints in the current frame. When not in the tracking state, the glint-assisted gaze tracking system attempts to detect the pupil and glints in the current frame and, if successful, initializes the tracking state to "YES" and continues with the next frame in the tracking state.

As shown in FIG. 6, the gaze tracking cameras may capture left and right images of the user's left and right eyes. The captured images are then input to a gaze tracking pipeline for processing beginning at 610. As indicated by the arrow returning to element 600, the gaze tracking system may continue to capture images of the user's eyes, for example at a rate of 60 to 120 frames per second. In some embodiments, each set of captured images may be input to the pipeline for processing. However, in some embodiments or under some conditions, not all captured frames are processed by the pipeline.

At 610, for the current captured images, if the tracking state is YES, then the method proceeds to element 640. At 610, if the tracking state is NO, then as indicated at 620 the images are analyzed to detect the user's pupils and glints in the images. At 630, if the pupils and glints are successfully detected, then the method proceeds to element 640. Otherwise, the method returns to element 610 to process next images of the user's eyes.

At 640, if proceeding from element 610, the current frames are analyzed to track the pupils and glints based in part on prior information from the previous frames. At 640, if proceeding from element 630, the tracking state is initialized based on the detected pupils and glints in the current frames. Results of processing at element 640 are checked to verify that the results of tracking or detection can be trusted. For example, results may be checked to determine if the pupil and a sufficient number of glints to perform gaze estimation are successfully tracked or detected in the current frames. At 650, if the results cannot be trusted, then the tracking state is set to NO at element 660, and the method returns to element 610 to process next images of the user's eyes. At 650, if the results are trusted, then the method proceeds to element 670. At 670, the tracking state is set to YES (if not already YES), and the pupil and glint information is passed to element 680 to estimate the user's point of gaze.

FIG. 6 is intended to serve as one example of eye tracking technology that may be used in a particular implementation. As recognized by those of ordinary skill in the art, other eye tracking technologies that currently exist or are developed in the future may be used in place of or in combination with the glint-assisted eye tracking technology describe herein in the computer system 101 for providing XR experiences to users, in accordance with various embodiments.

In the present disclosure, various input methods are described with respect to interactions with a computer system. When an example is provided using one input device or input method and another example is provided using another input device or input method, it is to be understood that each example may be compatible with and optionally utilizes the input device or input method described with respect to another example. Similarly, various output methods are described with respect to interactions with a computer system. When an example is provided using one output device or output method and another example is provided using another output device or output method, it is to be understood that each example may be compatible with and optionally utilizes the output device or output method described with respect to another example. Similarly, various methods are described with respect to interactions with a virtual environment or a mixed reality environment through a computer system. When an example is provided using interactions with a virtual environment and another example is provided using mixed reality environment, it is to be understood that each example may be compatible with and optionally utilizes the methods described with respect to another example. As such, the present disclosure discloses embodiments that are combinations of the features of multiple examples, without exhaustively listing all features of an embodiment in the description of each example embodiment.

User Interfaces and Associated Processes

Attention is now directed towards embodiments of user interfaces ("UI") and associated processes that may be implemented on a computer system, such as a portable multifunction device or a head-mounted device, in communication with a display generation component and one or more input devices.

FIGS. 7A-7H, 8A-8J, 9A-9E, and 10A-10E illustrate three-dimensional environments that are visible via a display generation component (e.g., a display generation component 7100 or a display generation component 120) of a computer system (e.g., computer system 101) and interactions that occur in the three-dimensional environments caused by user inputs directed to the three-dimensional environments and/or inputs received from other computer systems and/or sensors. In some embodiments, an input is directed to a virtual object within a three-dimensional environment by a user's gaze detected in the region occupied by the virtual object, or by a hand gesture performed at a location in the physical environment that corresponds to the region of the virtual object. In some embodiments, an input is directed to a virtual object within a three-dimensional environment by a hand gesture that is performed (e.g., optionally, at a location in the physical environment that is independent of the region of the virtual object in the three-dimensional environment) while the virtual object has input focus (e.g., while the virtual object has been selected by a concurrently and/or previously detected gaze input, selected by a concurrently or previously detected pointer input, and/or selected by a concurrently and/or previously detected gesture input). In some embodiments, an input is directed to a virtual object within a three-dimensional environment by an input device that has positioned a focus selector object (e.g., a pointer object or selector object) at the position of the virtual object. In some embodiments, an input is directed to a virtual object within a three-dimensional environment via other means (e.g., voice and/or control button). In some embodiments, an input is directed to a representation of a physical object or a virtual object that corresponds to a physical object by the user's hand movement (e.g., whole hand movement, whole hand movement in a respective posture, movement of one portion of the user's hand relative to another portion of the hand, and/or relative movement between two hands) and/or manipulation with respect to the physical object (e.g., touching, swiping, tapping, opening, moving toward, and/or moving relative to). In some embodiments, the computer system displays some changes in the three-dimensional environment (e.g., displaying additional virtual content, ceasing to display existing virtual content, and/or transitioning between different levels of immersion with which visual content is being displayed) in accordance with inputs from sensors (e.g., image sensors, temperature sensors, biometric sensors, motion sensors, and/or proximity sensors) and contextual conditions (e.g., location, time, and/or presence of others in the environment). In some embodiments, the computer system displays some changes in the three-dimensional environment (e.g., displaying additional virtual content, ceasing to display existing virtual content, and/or transitioning between different levels of immersion with which visual content is being displayed) in accordance with inputs from other computers used by other users that are sharing the computer-generated environment with the user of the computer system (e.g., in a shared computer-generated experience, in a shared virtual environment, and/or in a shared virtual or augmented reality environment of a communication session). In some embodiments, the computer system displays some changes in the three-dimensional environment (e.g., displaying movement, deformation, and/or changes in visual characteristics of a user interface, a virtual surface, a user interface object, and/or virtual scenery) in accordance with inputs from sensors that detect movement of other persons and objects and movement of the user that may not qualify as a recognized gesture input for triggering an associated operation of the computer system.

In some embodiments, a three-dimensional environment that is visible via a display generation component described herein is a virtual three-dimensional environment that includes virtual objects and content at different virtual positions in the three-dimensional environment without a representation of the physical environment. In some embodiments, the three-dimensional environment is a mixed reality environment that displays virtual objects at different virtual positions in the three-dimensional environment that are constrained by one or more physical aspects of the physical environment (e.g., positions and orientations of walls, floors, surfaces, direction of gravity, time of day, and/or spatial relationships between physical objects). In some embodiments, the three-dimensional environment is an augmented reality environment that includes a representation of the physical environment. In some embodiments, the representation of the physical environment includes respective representations of physical objects and surfaces at different positions in the three-dimensional environment, such that the spatial relationships between the different physical objects and surfaces in the physical environment are reflected by the spatial relationships between the representations of the physical objects and surfaces in the three-dimensional environment. In some embodiments, when virtual objects are placed relative to the positions of the representations of physical objects and surfaces in the three-dimensional environment, they appear to have corresponding spatial relationships with the physical objects and surfaces in the physical environment. In some embodiments, the computer system transitions between displaying the different types of environments (e.g., transitions between presenting a computer-generated environment or experience with different levels of immersion, adjusting the relative prominence of audio/visual sensory inputs from the virtual content and from the representation of the physical environment) based on user inputs and/or contextual conditions.

In some embodiments, the display generation component includes a pass-through portion in which the representation of the physical environment is displayed or visible. In some embodiments, the pass-through portion of the display generation component is a transparent or semi-transparent (e.g., see-through) portion of the display generation component revealing at least a portion of a physical environment surrounding and within the field of view of a user (sometimes called "optical passthrough"). For example, the pass-through portion is a portion of a head-mounted display or heads-up display that is made semi-transparent (e.g., less than 50%, 40%, 30%, 20%, 15%, 10%, or 5% of opacity) or transparent, such that the user can see through it to view the real world surrounding the user without removing the head-mounted display or moving away from the heads-up display. In some embodiments, the pass-through portion gradually transitions from semi-transparent or transparent to fully opaque when displaying a virtual or mixed reality environment. In some embodiments, the pass-through portion of the display generation component displays a live feed of images or video of at least a portion of physical environment captured by one or more cameras (e.g., rear facing camera(s) of a mobile device or associated with a head-mounted display, or other cameras that feed image data to the computer system) (sometimes called "digital passthrough"). In some embodiments, the one or more cameras point at a portion of the physical environment that is directly in front of the user's eyes (e.g., behind the display generation component relative to the user of the display generation component). In some embodiments, the one or more cameras point at a portion of the physical environment that is not directly in front of the user's eyes (e.g., in a different physical environment, or to the side of or behind the user).

In some embodiments, when displaying virtual objects at positions that correspond to locations of one or more physical objects in the physical environment (e.g., at positions in a virtual reality environment, a mixed reality environment, or an augmented reality environment), at least some of the virtual objects are displayed in place of (e.g., replacing display of) a portion of the live view (e.g., a portion of the physical environment captured in the live view) of the cameras. In some embodiments, at least some of the virtual objects and content are projected onto physical surfaces or empty space in the physical environment and are visible through the pass-through portion of the display generation component (e.g., viewable as part of the camera view of the physical environment, or through the transparent or semi-transparent portion of the display generation component). In some embodiments, at least some of the virtual objects and virtual content are displayed to overlay a portion of the display and block the view of at least a portion of the physical environment visible through the transparent or semi-transparent portion of the display generation component.

In some embodiments, the display generation component displays different views of the three-dimensional environment in accordance with user inputs or movements that change the virtual position of the viewpoint of the currently displayed view of the three-dimensional environment relative to the three-dimensional environment. In some embodiments, when the three-dimensional environment is a virtual environment, the viewpoint moves in accordance with navigation or locomotion requests (e.g., in-air hand gestures, and/or gestures performed by movement of one portion of the hand relative to another portion of the hand) without requiring movement of the user's head, torso, and/or the display generation component in the physical environment. In some embodiments, movement of the user's head and/or torso, and/or the movement of the display generation component or other location sensing elements of the computer system (e.g., due to the user holding the display generation component or wearing the HMD), relative to the physical environment, cause corresponding movement of the viewpoint (e.g., with corresponding movement direction, movement distance, movement speed, and/or change in orientation) relative to the three-dimensional environment, resulting in corresponding change in the currently displayed view of the three-dimensional environment. In some embodiments, when a virtual object has a preset spatial relationship relative to the viewpoint (e.g., is anchored or fixed to the viewpoint), movement of the viewpoint relative to the three-dimensional environment would cause movement of the virtual object relative to the three-dimensional environment while the position of the virtual object in the field of view is maintained (e.g., the virtual object is said to be head locked). In some embodiments, a virtual object is body-locked to the user, and moves relative to the three-dimensional environment when the user moves as a whole in the physical environment (e.g., carrying or wearing the display generation component and/or other location sensing component of the computer system), but will not move in the three-dimensional environment in response to the user's head movement alone (e.g., the display generation component and/or other location sensing component of the computer system rotating around a fixed location of the user in the physical environment). In some embodiments, a virtual object is, optionally, locked to another portion of the user, such as a user's hand or a user's wrist, and moves in the three-dimensional environment in accordance with movement of the portion of the user in the physical environment, to maintain a preset spatial relationship between the position of the virtual object and the virtual position of the portion of the user in the three-dimensional environment. In some embodiments, a virtual object is locked to a preset portion of a field of view provided by the display generation component, and moves in the three-dimensional environment in accordance with the movement of the field of view, irrespective of movement of the user that does not cause a change of the field of view.

In some embodiments, as shown in FIGS. 7A-7H, 8A-8J, 9A-9E, and 10A-10E, the views of a three-dimensional environment sometimes do not include representation(s) of a user's hand(s), arm(s), and/or wrist(s). In some embodiments, the representation(s) of a user's hand(s), arm(s), and/or wrist(s) are included in the views of a three-dimensional environment. In some embodiments, the representation(s) of a user's hand(s), arm(s), and/or wrist(s) are included in the views of a three-dimensional environment as part of the representation of the physical environment provided via the display generation component. In some embodiments, the representations are not part of the representation of the physical environment and are separately captured (e.g., by one or more cameras pointing toward the user's hand(s), arm(s), and wrist(s)) and displayed in the three-dimensional environment independent of the currently displayed view of the three-dimensional environment. In some embodiments, the representation(s) include camera images as captured by one or more cameras of the computer system(s), or stylized versions of the arm(s), wrist(s) and/or hand(s) based on information captured by various sensors). In some embodiments, the representation(s) replace display of, are overlaid on, or block the view of, a portion of the representation of the physical environment. In some embodiments, when the display generation component does not provide a view of a physical environment, and provides a completely virtual environment (e.g., no camera view and no transparent pass-through portion), real-time visual representations (e.g., stylized representations or segmented camera images) of one or both arms, wrists, and/or hands of the user are, optionally, still displayed in the virtual environment. In some embodiments, if a representation of the user's hand is not provided in the view of the three-dimensional environment, the position that corresponds to the user's hand is optionally indicated in the three-dimensional environment, e.g., by the changing appearance of the virtual content (e.g., through a change in translucency and/or simulated reflective index) at positions in the three-dimensional environment that correspond to the location of the user's hand in the physical environment. In some embodiments, the representation of the user's hand or wrist is outside of the currently displayed view of the three-dimensional environment while the virtual position in the three-dimensional environment that corresponds to the location of the user's hand or wrist is outside of the current field of view provided via the display generation component; and the representation of the user's hand or wrist is made visible in the view of the three-dimensional environment in response to the virtual position that corresponds to the location of the user's hand or wrist being moved within the current field of view due to movement of the display generation component, the user's hand or wrist, the user's head, and/or the user as a whole.

FIGS. 7A-7H illustrate examples of displaying attention-based shadows for user interface objects in an environment. The user interfaces in FIGS. 7A-7H are used to illustrate the processes described below, including the processes in FIG. 11.

Figure 7A:
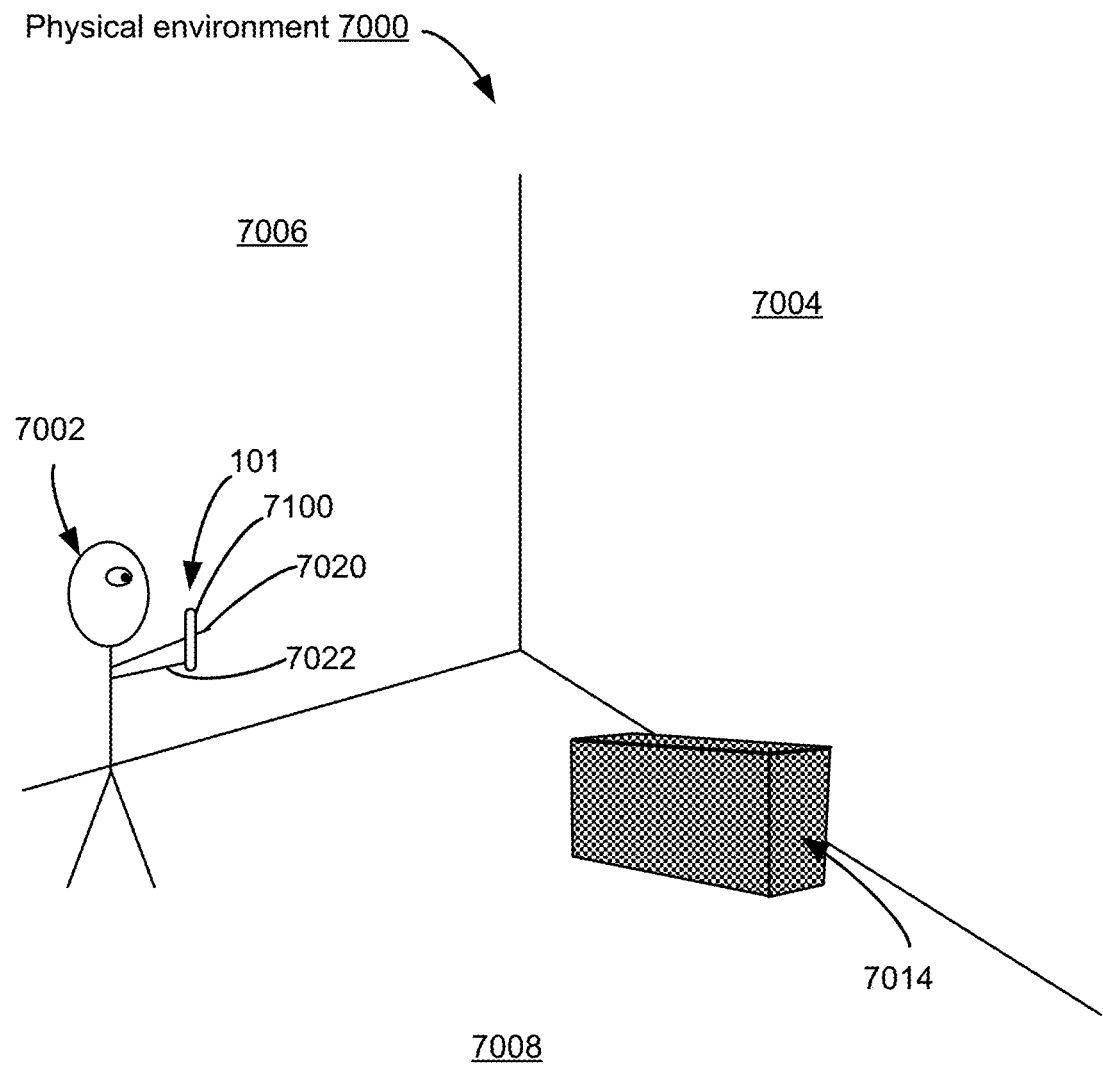

FIG. 7A illustrates an example physical environment 7000 that includes a user 7002 interacting with a computer system 101. Physical environment 7000 includes physical walls 7004 and 7006 and floor 7008. Physical box 7014, which has a textured (e.g., rough or irregular) surface, is positioned on floor 7008. As shown in the examples in FIGS. 7A-7H, display generation component 7100 of computer system 101 is a touchscreen held by user 7002 using hand 7020 and/or hand 7022. In some embodiments, the display generation component of computer system 101 is a head-mounted display worn on user 7002's head (e.g., what is shown in FIGS. 7A-7H as being visible via display generation component 7100 of computer system 101 corresponds to user 7002's field of view when wearing a head-mounted display). In some embodiments, the display generation component is a standalone display, a projector, or another type of display. In some embodiments, the computer system is in communication with one or more input devices, including cameras or other sensors and input devices that detect movement of the user's hand(s), movement of the user's body as whole, and/or movement of the user's head in the physical environment. In some embodiments, the one or more input devices detect the movement and the current postures, orientations, and positions of the user's hand(s), face, and/or body as a whole. In some embodiments, user inputs are detected via a touch-sensitive surface or touchscreen. In some embodiments, the one or more input devices include an eye tracking component that detects location and movement of the user's gaze. In some embodiments, the display generation component, and optionally, the one or more input devices and the computer system, are parts of a head-mounted device that moves and rotates with the user's head in the physical environment, and changes the viewpoint of the user in the three-dimensional environment provided via the display generation component. In some embodiments, the display generation component is a heads-up display that does not move or rotate with the user's head or the user's body as a whole, but, optionally, changes the viewpoint of the user in the three-dimensional environment in accordance with the movement of the user's head or body relative to the display generation component. In some embodiments, the display generation component (e.g., a touchscreen) is optionally moved and rotated by the user's hand relative to the physical environment or relative to the user's head, and changes the viewpoint of the user in the three-dimensional environment in accordance with the movement of the display generation component relative to the user's head or face or relative to the physical environment. In some embodiments, one or more portions of a view of a three-dimensional environment that is visible to user 7002 via display generation component 7100 are digital passthrough portions that include representations of corresponding portions of physical environment 7000 (FIG. 7A) captured via one or more image sensors of computer system 101. In some embodiments, one or more portions of the view of the three-dimensional environment that is visible to user 7002 via display generation component 7100 are optical passthrough portions, in that user 7002 can see one or more portions of physical environment 7000 through one or more transparent or semi-transparent portions of display generation component 7100.

Figure 7C:
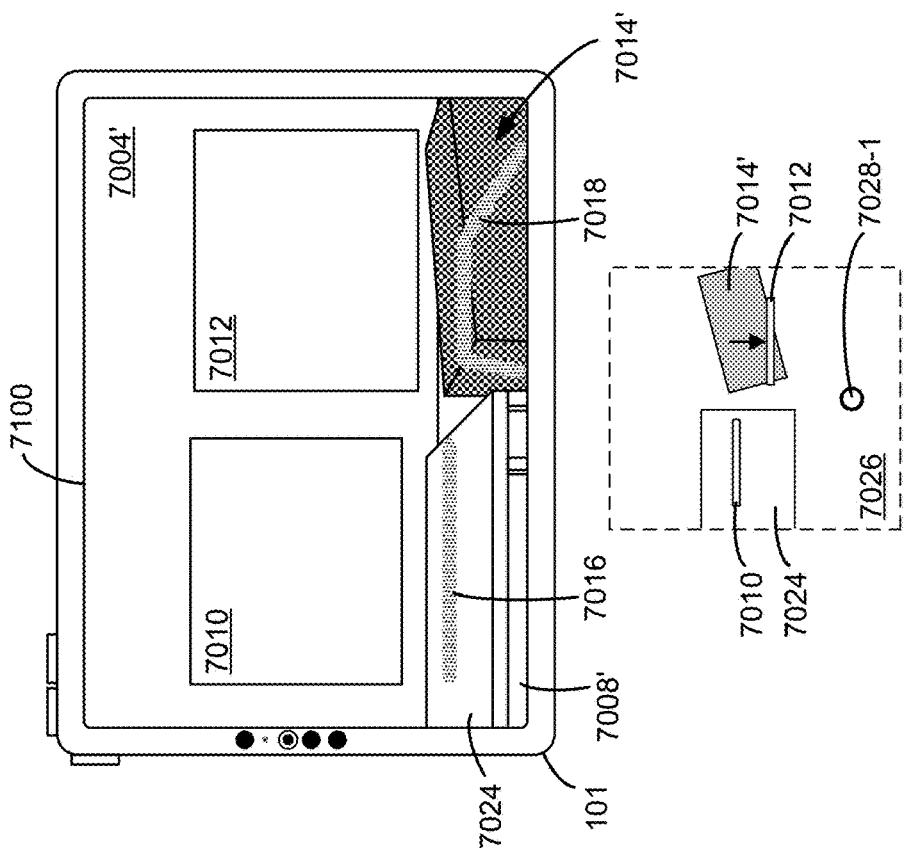
Figure 7B:
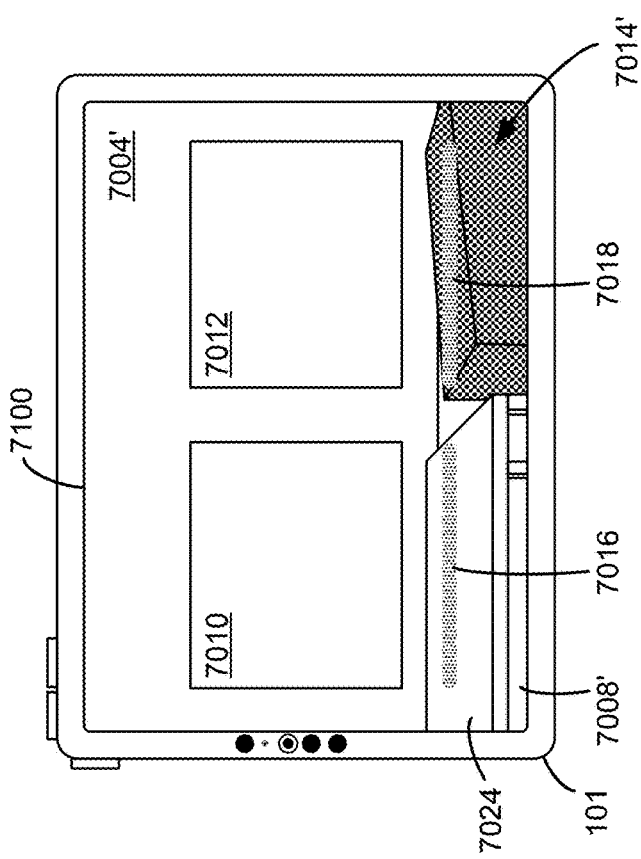

FIG. 7B illustrates a view of a three-dimensional environment that is visible to user 7002 via display generation component 7100 of computer system 101. The three-dimensional environment of FIG. 7B optionally includes representations of objects in a physical environment such as physical environment 7000 (e.g., as captured by one or more cameras of computer system 101) or optical views of objects in the physical environment (e.g., as visible through one or more transparent or semi-transparent portions of display generation component 7100). For example, in FIG. 7B, the three-dimensional environment includes representation (or optical view) 7004' of wall 7004, representation (or optical view) 7008' of physical floor 7008, and representation (or optical view) 7014' of physical box 7014. In addition, the three-dimensional environment includes one or more computer-generated objects, also called virtual objects, displayed via display generation component 7100, such as table 7024 (e.g., which is not a representation or optical view of a physical table in physical environment 7000), and window 7010 and window 7012 (e.g., which are not representations or optical views of physical elements in physical environment 7000). In some embodiments, window 7010 corresponds to a user interface of a software application executing on computer system 101 (e.g., an email application, a web browser, a messaging application, a maps application, or other software application). Likewise, in some embodiments, window 7012 corresponds to a user interface of a software application executing on computer system 101 (e.g., an email application, a web browser, a messaging application, a maps application, or other software application), optionally of the same application or a different application from that of window 7010.

In FIG. 7B, window 7010 is displayed with a computer-generated shadow 7016, and window 7012 is displayed with a computer-generated shadow 7018. As described in more detail herein with reference to FIGS. 7B-7H, the shadow associated with a given object in the three-dimensional environment optionally changes in appearance based on whether user 7002's attention is directed to the object. In some embodiments, user 7002's attention is directed to an object if user 7002 is gazing at the object, optionally with a hand engaged (e.g., in a ready state for performing air gestures or in contact with, but not necessarily having pressed, a touch-sensitive surface) and/or has moved a focus indicator (e.g., a cursor) over the object or is hovering a hand or finger over the object. In FIG. 7B, user 7002's attention is directed to neither window 7010 nor window 7012 (e.g., user 7002 is not gazing at either window, has not moved a cursor over either window, or has not selected either window for interaction). Accordingly, windows 7010 and 7012 are displayed with a first (e.g., neutral or default) appearance without visual emphasis. Shadow 7016 for window 7010 in FIG. 7B represents a shadow displayed with a first opacity, and shadow 7018 for window 7012 in FIG. 7B also represents a shadow displayed with the first opacity. In some embodiments, shadows for objects in the three-dimensional environment are not positioned based on lighting in the three-dimensional environment. For example, if an object is below and to the left of a source of (e.g., real or simulated) light in the three-dimensional environment, the shadow for the object is displayed directly below the object and centered to the object (e.g., even if the object is moved and/or resized) rather than offset to the left (e.g., unlike what would otherwise be expected for a physical object casting a physical shadow opposite a physical light source).

In FIG. 7C, top view 7026 (e.g., a top-down view) shows the relative positions of different elements of the three-dimensional environment that are visible from the viewpoint of user 7002. Top view 7026 shows that window 7012 has been moved forward from its position in FIG. 7B and thus closer to viewpoint 7028-1 of user 7002. Instead of being positioned fully over the top surface of representation 7014' of physical box 7014 (also called box 7014' or passthrough box 7014' for ease of reference), as in FIG. 7B, window 7012 in FIG. 7C partially overhangs the left- and forward-facing edges of box 7014'. Accordingly, shadow 7018 of window 7012 is moved forward along the top surface of box 7014' so as to be cast at least partially on the left- and forward-facing edges of box 7014', as is visible via display generation component 7100. In some embodiments, the display of shadow 7018 along the top and sides of box 7014' is based on a three-dimensional model of box 7014, determined by computer system 101 using depth data captured about box 7014 (e.g., via one or more cameras, structured light scanners, time-of-flight sensors, or the like), time-of-flight sensors, or other depth sensors of the computer system). In some embodiments, the three-dimensional model of box 7014 is a simplified model that smooths or ignores irregularities in the physical surface of box 7014 (e.g., by modeling box 7014 with smooth surfaces even if box 7014 is carpeted, and/or by modeling box 7014 with flat surfaces even if low profile objects such as a pen or magazine are placed on box 7014).

FIG. 7D illustrates user 7002's attention directed to window 7012 (e.g., in a transition from FIG. 7B). The location to which user 7002's attention is directed is represented as attention indicator 7030-1. As noted herein, attention indicator 7030-1 optionally represents the location to which user 7002 has moved a focus indicator (e.g., cursor), the location over which user 7002's finger is hovering, or the location to which user 7002's gaze is directed. In response to user 7002's attention being directed to window 7012, window 7012 is displayed with a second, visually emphasized appearance, such as the selection outline illustrated in FIG. 7D (e.g., to indicate that window 7012 has focus for further interaction). One of ordinary skill in the art will recognize that one or more of various visual properties of a window described herein may be changed to give visual emphasis to the window, instead of or in addition to displaying a selection outline, such as using increased opacity, increased brightness, and/or other form of visual emphasis. In some embodiments, however, one or more visual properties of a window or other computer-generated object described herein stay the same even while a user's attention is directed to the window and the window otherwise has a visually emphasized appearance. For example, in some embodiments the size (e.g., length, width, and/or thickness), position, and/or orientation of a window or object are the same while a user's attention is directed to the window as while the user's attention is not (e.g., has ceased to be or has not yet been) directed to the window. In some embodiments, user 7002's attention must be directed to an object such as window 7012 for at least a threshold amount of time $T_{th}$, as indicated by timer 7032, in order for the object to be given focus and be displayed with visual emphasis.

In response to user 7002's attention being directed to window 7012, shadow 7018 corresponding to window 7012 also changes in appearance (e.g., to visually emphasize shadow 7018 in conjunction with visually emphasizing corresponding window 7012). Shadow 7018 in FIG. 7D represents a shadow displayed with a second opacity that is greater than the first opacity of FIG. 7B (e.g., as indicated by shadow 7018 having a different fill pattern in FIG. 7D than in FIG. 7B). In some embodiments, the change in appearance of shadow 7018 (or of any other shadow described herein) occurs gradually, for example by transitioning from the first opacity through a plurality of intermediate opacities to the second opacity. In some embodiments, the change in appearance of shadow 7018 occurs after a delay, so that the appearance of shadow 7018 does not flicker as user 7002's attention moves across a boundary of window 7012. In some embodiments, the delay is 0.05 sec, 0.1 sec, 0.2 sec, 0.5 sec, 1 sec, 3 sec, or other time period; in some embodiments the delay is long enough to introduce hysteresis to reduce flicker in the user interface yet short enough so as to be imperceptible or hardly perceptible to the unassisted eye. One of ordinary skill in the art will readily appreciate that one or more of various visual properties of a shadow described herein, instead of or in addition to opacity, may be changed in conjunction with giving visual emphasis to the window or other object corresponding to the shadow. In some embodiments, however, one or more visual properties of a shadow described herein stay the same even while a user's attention is directed to the corresponding window (e.g., in the absence of movement of the corresponding window) and the shadow otherwise has a changed intensity (e.g., opacity). For example, in some embodiments the size (e.g., length, width, and/or thickness), position, orientation, and/or diffuseness (e.g., degree of blurring) of a window or object are the same while a user's attention is directed to the window as while the user's attention is not (e.g., has ceased to be or has not yet been) directed to the window. Window 7010 and shadow 7016 retain the same appearance as in FIG. 7B, in accordance with user 7002's attention remaining unchanged with respect to (e.g., continuing to be directed away from) window 7010.

FIG. 7E illustrates that user 7002's attention is directed to window 7010 instead of to window 7012 as in FIG. 7D (e.g., user 7002's gaze, finger, or cursor has moved from window 7012 to window 7010), as indicated by attention indicator 7030-1. In response to user 7002's attention being directed to window 7010, window 7010 in FIG. 7E is displayed with a selection outline (and/or other indication that window 7010 has focus), while maintaining the same size and pose in the three-dimensional environment. Shadow 7016 in FIG. 7E represents that the shadow corresponding to window 7010 has also changed in appearance, optionally gradually and/or after a delay (e.g., as described herein with reference to FIG. 7D), and is displayed with increased opacity (e.g., the second opacity or another opacity that is greater than the first opacity) (e.g., as indicated by shadow 7016 having a different fill pattern in FIG. 7E than in FIG. 7B), also while maintaining the same size and pose in the three-dimensional environment. In addition, in response to user 7002's attention no longer being directed to window 7012, the prior change in appearance of window 7012 to the second appearance (e.g., responsive to when user 7002's attention was directed to window 7012) is at least partially reversed, as is optionally the prior change in appearance of shadow 7018 corresponding to window 7012. For example, window 7012 in FIG. 7E is displayed without the selection outline of FIG. 7D, and shadow 7018 in FIG. 7E represents that the shadow corresponding to window 7012 has decreased in opacity (e.g., from the second opacity of FIG. 7D to the first opacity of FIG. 7B or in some embodiments to a third opacity that is also lower than the second opacity yet is different from the first opacity), optionally gradually and/or after a delay (e.g., as described herein with reference to FIG. 7D).

FIG. 7F illustrates a different view of the three-dimensional environment being visible via display generation component 7100, in accordance with user 7002 viewing the three-dimensional environment from viewpoint 7028-2, as shown in top view 7026. In FIG. 7F, windows 7010 and 7012 are maintained at the same simulated positions relative to the three-dimensional environment (e.g., relative to table 7024 and box 7014', respectively) as also shown in top view 7026. Window 7010 and a portion of window 7012 are visible from viewpoint 7028-2. In addition, computer-generated speaker 7034 (e.g., which is virtual, and not a representation of a physical speaker in physical environment 7000) on table 7024 is visible. Speaker 7034 is displayed with a computer-generated shadow 7036. Because user 7002's attention continues to be directed to window 7010, attention indicator 7030-1 continues to be displayed with respect to window 7010, and window 7010 continues to be displayed with a selection outline. In addition, shadow 7016 corresponding to window 7010 continues to be displayed with the second opacity. Because user 7002's attention is not directed to window 7012, shadow 7018 corresponding to window 7012 continues to be displayed with the first opacity (or other opacity that is less than the second opacity). And, because user 7002's attention is not directed to speaker 7034, shadow 7036 corresponding to speaker 7034 is displayed with the first opacity (or other opacity that is less than the second opacity).

FIG. 7G illustrates that user 7002's attention is directed to speaker 7034 instead of to window 7010 as in FIG. 7F (e.g., user 7002's gaze, finger, or cursor has moved from window 7010 to speaker 7034), as indicated by attention indicator 7030-1. In response to user 7002's attention being directed to speaker 7034, speaker 7034 in FIG. 7G is displayed with a selection outline (and/or other indication that speaker 7034 has focus), while maintaining the same size and pose in the three-dimensional environment. Shadow 7036 in FIG. 7G represents that the shadow corresponding to speaker 7034 has also changed in appearance, optionally gradually and/or after a delay (e.g., as described herein with reference to FIG. 7D), and is displayed with increased opacity (e.g., the second opacity) (e.g., as indicated by shadow 7036 having a different fill pattern in FIG. 7G than in FIG. 7F), also while maintaining the same size and pose in the three-dimensional environment. In addition, in response to user 7002's attention no longer being directed to window 7010, the prior change in appearance of window 7010 (e.g., responsive to when user 7002's attention was directed to window 7010) is at least partially reversed, as is optionally the prior change in appearance of shadow 7016 corresponding to window 7010. For example, window 7010 in FIG. 7G is displayed without the selection outline of FIG. 7F, and shadow 7016 in FIG. 7G represents that the shadow corresponding to window 7010 has decreased in opacity (e.g., from the second opacity of FIG. 7F to the first opacity of FIG. 7D), optionally gradually and/or after a delay (e.g., as described herein with reference to FIG. 7D). The appearances of window 7012 and shadow 7018 in FIG. 7G are unchanged from FIG. 7F, since user 7002's attention with respect to window 7012 has not changed (e.g., user 7002's attention was not directed to window 7012 in either FIG. 7F or FIG. 7G).

Figure 7H:
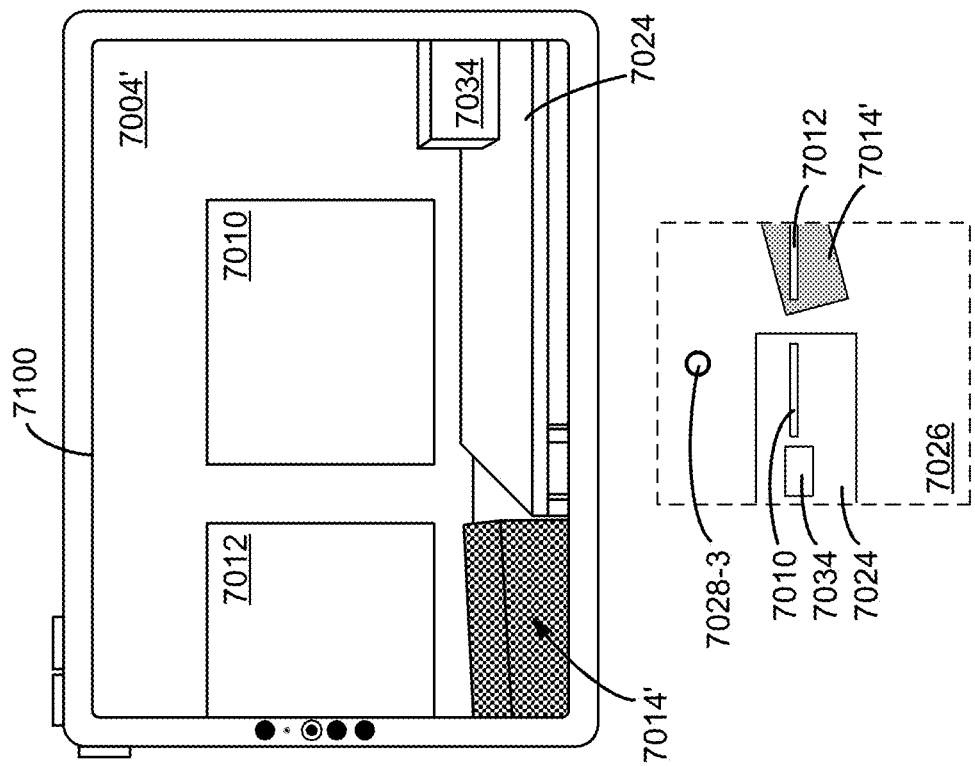

In FIG. 7H, the view of the three-dimensional environment that is visible via display generation component 7100 is from viewpoint 7028-3, such that window 7010, window 7012, and speaker 7034 are being viewed from behind. FIG. 7H illustrates embodiments in which a computer-generated shadow is not displayed for a computer-generated object that is being viewed from outside of a predefined range of angles (e.g., from behind, or from the side, more than 90 degrees from the front view) (e.g., a displayed shadow ceases to be displayed when the viewpoint of the user moves outside of the predefined range of angles). For example, in FIG. 7H, no shadows are displayed for window 7010, window 7012, and speaker 7034 when viewed from behind (e.g., 180 degrees from the front view shown in FIG. 7G).

FIGS. 8A-8J illustrate examples of displaying movement-based shadows for user interface objects in an environment. The user interfaces in FIGS. 8A-8J are used to illustrate the processes described below, including the processes in FIG. 12.

Figure 8A:
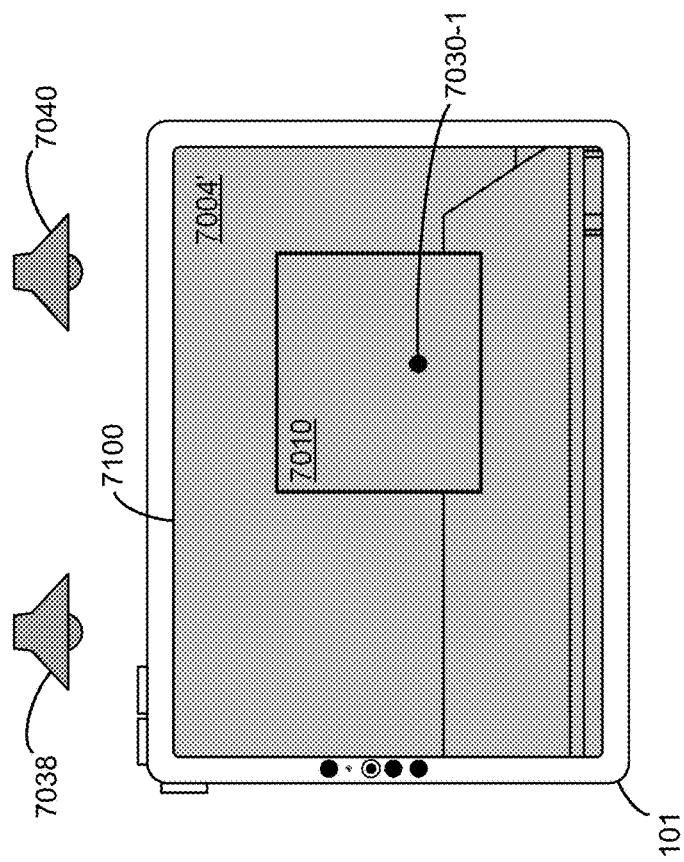

FIG. 8A illustrates a view of the three-dimensional environment that is visible to user 7002 via display generation component 7100 of computer system 101. In some embodiments, one or more portions of the view of the three-dimensional environment are digital passthrough portions that include representations of corresponding portions of physical environment 7000 (FIG. 7A) captured via one or more image sensors of computer system 101. In some embodiments, one or more portions of the view of the three-dimensional environment are optical passthrough portions, in that user 7002 can see one or more portions of physical environment 7000 through one or more transparent or semi-transparent portions of display generation component 7100. In FIG. 8A, the view of the three-dimensional environment that is visible includes representation (or optical view) 7004' of physical wall 7004 and representation (or optical view) 7008' of physical floor 7008 (e.g., as captured by one or more cameras of computer system 101 or visible through one or more transparent or semi-transparent portions of display generation component 7100). As shown in the examples in FIGS. 8A-8J, content that is visible via display generation component 7100 of computer system 101 is displayed on a touch screen optionally held by user 7002. In some embodiments, display generation component 7100 of computer system 101 is a head-mounted display worn on user 7002's head (e.g., what is shown in FIGS. 8A-8J as being visible via display generation component 7100 of computer system 101 corresponds to user 7002's field of view when wearing a head-mounted display).

In FIG. 8A, the three-dimensional environment includes the displayed computer-generated objects table 7024 and window 7010 (e.g., which are not representations or optical views of physical objects in physical environment 7000). Window 7010 has focus for interaction (e.g., user 7002's attention is directed to window 7010), as indicated by attention indicator 7030-1, and accordingly window 7010 is shown as being displayed with a visually emphasized appearance, such as the selection outline illustrated in FIG. 8A (e.g., in contrast to a selection outline being absent around window 7010 in FIG. 7B, when window 7010 does not have focus). Accordingly, shadow 7016 corresponding to window 7016 is displayed with an increased opacity (e.g., the second opacity of FIG. 7E) that is associated with window 7010 having focus (e.g., in contrast to the relatively lower opacity of shadow 7016 in FIG. 7B, when window 7010 does not have focus). One of ordinary skill in the art will recognize that one or more of various visual properties of a window described herein may be changed to give visual emphasis to the window, instead of or in addition to displaying a selection outline, and that one or more of various visual properties of a shadow described herein, instead of or in addition to opacity, may be changed in conjunction with the shadow's corresponding window or other object having focus.

FIG. 8A also illustrates light sources 7038 and 7040. Light source 7038 represents a physical light source in physical environment 7000 or a simulated light source that casts (e.g., computer-generated) light in the three-dimensional environment. Similarly, light source 7040 represents a physical light source or a simulated light source. In some embodiments, both light sources 7038 and 7040 are physical light sources that cast light in physical environment 7000, and the light is in some circumstances at least partially visible in the three-dimensional seen via display generation component 7100. In some embodiments, both light sources 7038 and 7040 are simulated light sources. In some embodiments, one of light sources 7038 and 7040 is a physical light source in physical environment 7000, and the other is a simulated light source. As shown in FIG. 8A, window 7010 is displayed as exhibiting specular reflection, with a visual effect simulating window 7010 reflecting light from light sources 7038 and 7040 from an edge of window 7010. For example, reflection 7042-1 represents specular reflection of light, physical or virtual, from light source 7038, physical or virtual, and reflection 7042-2 represents specular reflection of light, physical or virtual, from light source 7040. In some embodiments, in accordance with a determination that at least a threshold amount of light is present in the three-dimensional environment (e.g., based on physical light and/or computer-generated simulated light), as illustrated in FIG. 8A, computer-generated specular reflection from one or more objects in the three-dimensional environment (e.g., reflections 7042-1 and 7042-2) is displayed, and/or computer-generated shadows for one or more objects in the three-dimensional environment (e.g., shadow 7016) are displayed.

Figure 8B:
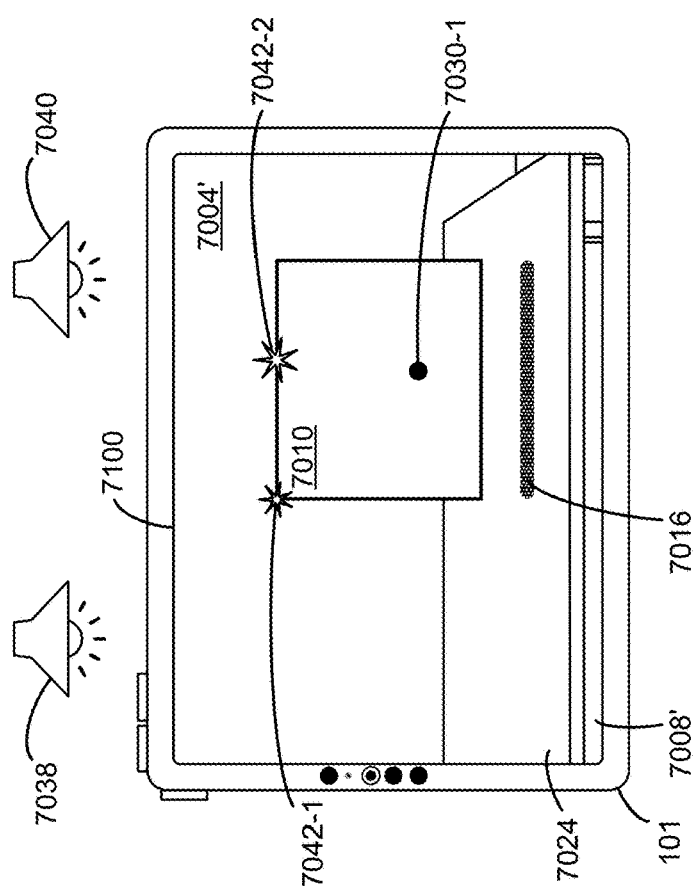

FIG. 8B illustrates a view of the three-dimensional environment in which light sources 7038 and 7040 are dimmed or off (e.g., due to a decrease in physical and/or simulated light). In some embodiments, for a simulated light source, computer system 101 is configured to reduce the amount of simulated light from the light source that is displayed or to altogether cease to display the simulated light from the light source. In some embodiments, for a physical light source, computer system 101 is configured to apply a darkening filter to the view of the three-dimensional environment that is visible via display generation component 7100 (e.g., by displaying a partially transparent darkening layer overlaid on passthrough portions of the view of the three-dimensional environment). Accordingly, the three-dimensional environment in FIG. 8B appears dark, and specular reflections 7042-1 and 7042-2 are not displayed (e.g., consistent with light sources 7038 and 7040 being dimmed or turned off). In some embodiments, in accordance with the three-dimensional environment being dark, shadows are not displayed for objects in the three-dimensional environment. For example, in FIG. 8B, shadow 7016 corresponding to window 7010 has ceased to be displayed (e.g., even though window 7010 retains focus, as indicated by attention indicator 7030-1, and thus continues to be displayed with a selection outline.

Figures 8C, 8D:
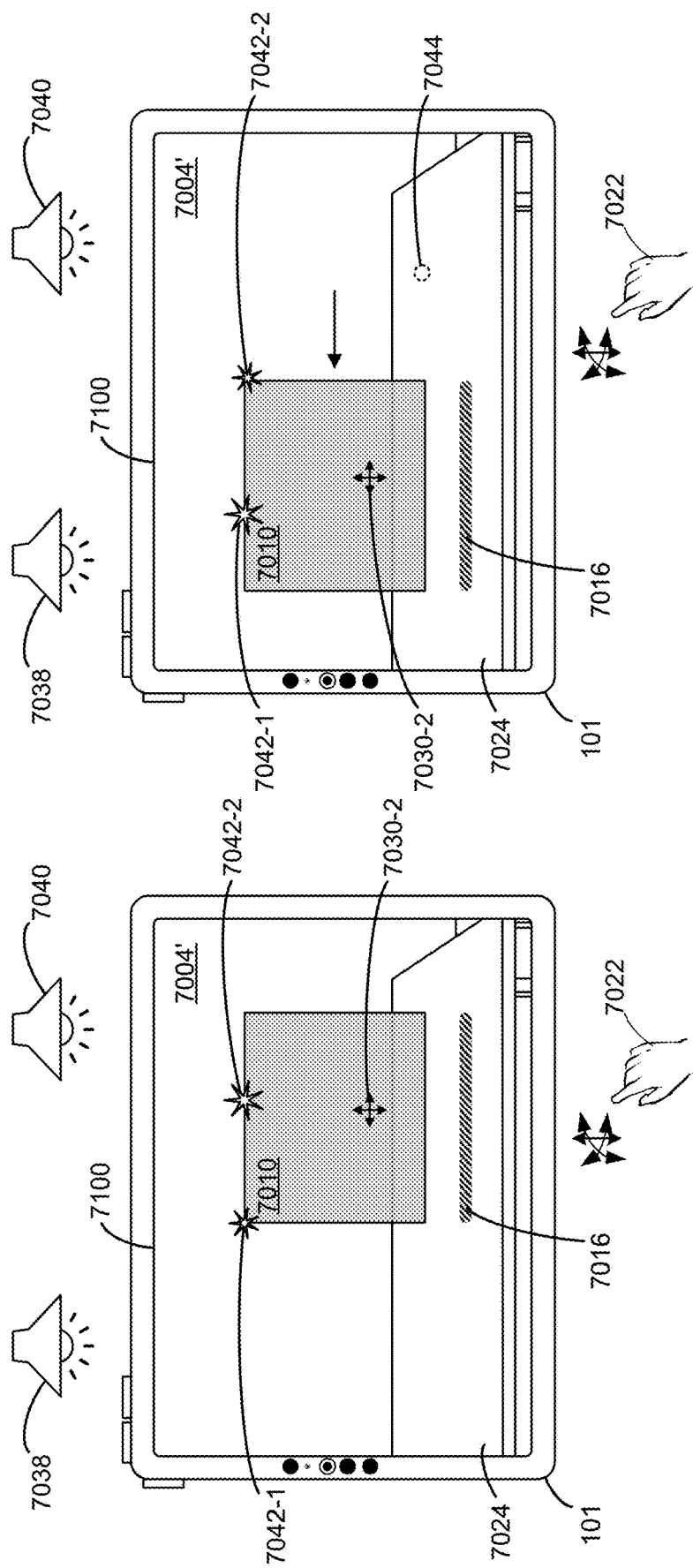

FIG. 8C illustrates a view of the three-dimensional environment in response to an input, performed by user 7002 using hand 7022, initiating movement of window 7010 in the three-dimensional environment, as indicated by movement indicator 7030-2 (e.g., a transition from the scenario of FIG. 8A). In some embodiments, the input is a touch input via a touch-sensitive surface (e.g., a long press-and-drag), an air gesture (e.g., an air pinch-and-drag), a mouse input (e.g., a click-and-drag), or other repositioning input. In response to the input initiating movement of window 7010, shadow 7016 corresponding to window 7010 changes in appearance. For example, shadow 7016 in FIG. 8C represents that the shadow corresponding to window 7010 has decreased in opacity (e.g., from the opacity of FIG. 8A to a lower opacity). The opacity of the shadow corresponding to window 7010 during the movement input (FIG. 8C) is optionally the same as or different from the opacity of the shadow corresponding to window 7010 in the absence of user 7002's attention (FIG. 7B) (e.g., as indicated by shadow 7016 having a different fill pattern in FIG. 8C than in FIG. 7B). In addition, window 7010 is visually deemphasized (e.g., for the duration of the input to move window 7010), and in particular decreased in opacity (e.g., by the same or a different amount as shadow 7016), to reduce the extent to which window 7010 obscures underlying portions of the three-dimensional environment so that user 7002 can better perceive where and how window 7010 is being moved relative to the three-dimensional environment. In FIG. 8C, reflections 7042-1 and 7042-2 are maintained at the same positions relative to window 7010 as in FIG. 8A, in accordance with window 7010 having the same position relative to light sources 7038 and 7040 in FIG. 8C as in FIG. 8A.

In some embodiments, the change in appearance of shadow 7016 occurs in response to the input initiating movement of window 7010, and optionally continues to be displayed during the input initiating movement of window 7010, prior to or even without actual movement of window 7010. For example, shadow 7016 has a different appearance in FIG. 8C, during the input by hand 7022, than in FIG. 8A, prior to the input by hand 7022, even though window 7010 is at the same position in FIG. 8C as in FIG. 8A. In some embodiments, the change in appearance of shadow 7016 occurs in response to the input initiating movement of window 7010 regardless of the lighting conditions in the three-dimensional environment (e.g., as long as a threshold amount of light is present in the three-dimensional environment). For example, if the three-dimensional environment of FIGS. 8A and 8C is lit by light source 7038 (e.g., as a real or simulated light source), shadow 7016 changes from a first appearance to a second appearance in response to detecting an input initiating movement of window 7010; and, if the three-dimensional environment of FIGS. 8A and 8C is lit by light source 7040 (e.g., as a real or simulated light source) or even by both light sources 7038 and 7040, shadow 7016 still changes from the first appearance to the second appearance in response to detecting an input initiating movement of window 7010. One of ordinary skill in the art will readily appreciate that various other lighting conditions may be present in the three-dimensional environment of FIGS. 8A and 8C, and shadow 7016 would optionally still change from the first appearance to the second appearance in response to detecting an input initiating movement of window 7010.

FIG. 8D illustrates movement of window 7010 in the three-dimensional environment in accordance with movement of the input by hand 7022 (e.g., a drag or other movement-related portion of a touch input, air gesture, mouse input, or other input). In conjunction with window 7010 moving to the left in the three-dimensional environment, shadow 7016 moves to the left in the three-dimensional environment by a corresponding amount. In some embodiments, the intensity of shadow 7016 is the same during the input to move window 7010 regardless of the direction or magnitude of movement of the input. For example, shadow 7016 in FIG. 8D represents that the opacity of the shadow corresponding to window 7010 is the same in FIG. 8D as in FIG. 8C (e.g., as indicated by shadow 7016 having the same fill pattern in FIG. 8D as in FIG. 8C), regardless of the direction (e.g., to the left or right) or magnitude of movement of window 7010 in response to the input by hand 7022. In another example described in more detail herein, shadow 7016 in FIG. 8G represents that the opacity of the shadow corresponding to window 7010 is the same in FIG. 8G as in FIG. 8F (e.g., as indicated by shadow 7016 having the same fill pattern in FIG. 8G as in FIG. 8F), regardless of the direction (e.g., backward or forward, further or closer) or magnitude of movement of window 7010 in response to the input by hand 7022 (e.g., so long as window 7010 is within a threshold distance of the viewpoint of the user and/or a corresponding surface, as described in more detail herein with reference to FIGS. 8F-8J).

In some embodiments, the spatial relationship between a window and its corresponding shadow is unaffected by the positions of light sources in the three-dimensional environment. For example, in comparison to window 7010 in FIG. 8C, window 7010 in FIG. 8D has been moved relative to the three-dimensional environment and relative to light sources 7038 and 7040, which have remained fixed relative to the three-dimensional environment. Although the spatial relationship between a physical window and its corresponding physical shadow would typically change (e.g., in distance, relative positions, and/or relative sizes) in response to movement of the physical window relative to one or more light sources (e.g., which remain fixed), the spatial relationship between 7010 and shadow 7016 is the same in FIG. 8D as in FIG. 8C despite the movement of window 7010 relative to light sources 7038 and 7040 from FIG. 8C to FIG. 8D. For example, shadow 7016 is displayed directly below window 7010 on the top surface of table 7024, and has the same appearance (e.g., size, feathering, and opacity), in both FIGS. 8C and 8D. In some embodiments, other elements in the three-dimensional environment are affected by the positions of light sources in the three-dimensional environment, including some elements associated with an object whose spatial relationship with a corresponding shadow is unaffected by light sources. For example, as window 7010 is moved to the left in the three-dimensional environment between FIGS. 8C and 8D, reflection 7042-1 corresponding to light source 7038 and reflection 7042-2 corresponding to light source 7040 both shift accordingly (e.g., to the right) along the edges of window 7010.

In some embodiments, a shadow corresponding to an object moves with the object independently of movement of a user's gaze. For example, gaze indicator 7044 in FIG. 8D indicates that user 7002's gaze is directed to and is optionally moving toward the right side of table 7024 while window 7010 is being moved to the left in the three-dimensional environment. FIG. 8D illustrates that shadow 7016 moves to the left together with window 7010, without regard to the location of and/or direction of movement of user 7002's gaze (e.g., shadow 7016 moves to the left together with window 7010 even if user 7002's gaze is moving toward the right and/or is directed elsewhere in the three-dimensional environment). In some embodiments, during an input to move an object, a shadow corresponding to the object has an appearance that is independent of whether the user's gaze is directed to the object. For example, if gaze indicator 7044 in FIG. 8D were instead over window 7010, shadow 7016 would still have the same appearance shown in FIG. 8D due to the input to move window 7010 being ongoing (e.g., although shadow 7016 may exhibit the attention-based behaviors described herein with reference to FIGS. 7B-7H while an input to move window 7010 is not ongoing).

In FIG. 8E, the input by hand 7022 has ended. In the example of FIG. 8E, window 7010 retains focus after the end of the input by hand 7022 (e.g., prior to a subsequent input giving focus to a different object in the three-dimensional environment). Attention indicator 7030-1 is shown corresponding to window 7010 to indicate that window 7010 has focus. In response to the end of the input by hand 7022, and in accordance with window 7010 having focus without an input to initiate movement being directed to window 7010, the appearances of window 7010 and shadow 7016 are restored to their respective appearances in FIG. 8A, or at least partially restored, although reflections 7042-1 and 7042-2 are maintained at the same positions relative to window 7010, in accordance with window 7010 having the same position relative to light sources 7038 and 7040 in FIG. 8E as in FIG. 8D. For example, window 7010 is visually emphasized with a selection outline, and shadow 7016 represents that the shadow corresponding to window 7010 has increased in opacity (e.g., from the opacity of FIG. 8D to a higher opacity such as the opacity of FIG. 8A) (e.g., as indicated by shadow 7016 having a different fill pattern in FIG. 8E than in FIG. 8D).

FIGS. 8F-8I illustrate changes in the appearance of a shadow corresponding to an object as a distance between the object and the viewpoint of the user increases (e.g., such that the object appears smaller in accordance with perspective). FIG. 8F illustrates that a second input initiating movement of window 7010 in the three-dimensional environment is being performed by user 7002 using hand 7022 (e.g., an input that is analogous to the input of FIGS. 8C-8D, or alternatively a continuation of the input of FIGS. 8C-8D if the end of the input, as illustrated in FIG. 8E, were not detected). Top view 7026 in FIG. 8F illustrates that the simulated position of window 7010 in the three-dimensional environment is less than a threshold distance $D_{th1}$ from viewpoint 7046 of user 7002. Accordingly, in response to the second input initiating movement of window 7010, shadow 7016 represents that the shadow corresponding to window 7010 has decreased in opacity to a first decreased opacity that is different from the opacity of shadow 7016 in FIG. 8E, and window 7010 is visually deemphasized (e.g., for the duration of the input to move window 7010), including by being decreased in opacity, although reflections 7042-1 and 7042-2 are maintained at the same positions relative to window 7010, in accordance with window 7010 having the same position relative to light sources 7038 and 7040 in FIG. 8F as in FIG. 8E.

FIG. 8G illustrates that window 7010 has been moved backward in the three-dimensional environment, further from the viewpoint of user 7002, in response to movement of the second input by hand 7022, as indicated by arrow 7048 (which is included in FIG. 8G for illustrative purposes and optionally not displayed via display generation component 7100) and in top view 7026. Due to perspective, window 7010 is thus shown as smaller in size than in FIG. 8F, due to the increased distance between window 7010 and the viewpoint of user 7002. In accordance with the decreased size, which includes decreased width, of window 7010, shadow 7016 corresponding to window 7010 is also decreased in width relative to shadow 7016 in FIG. 8F (e.g., to a width that corresponds to the decreased width of window 7010 in FIG. 8G). Window 7010 remains visually deemphasized, optionally with the same decreased opacity as in FIG. 8F. Reflections 7042-1 and 7042-2 are shifted relative to window 7010 and slightly decreased in size, in accordance with window 7010 in FIG. 8G having been repositioned relative to light sources 7038 and 7040 in being moved further from viewpoint 7046 of user 7002, in comparison with FIG. 8F. In addition, top view 7026 in FIG. 8G illustrates that the simulated position of window 7010 in the three-dimensional environment remains less than the threshold distance $D_{th1}$ from viewpoint 7046 of user 7002. Accordingly, shadow 7016 represents that the shadow corresponding to window 7010 maintains the same opacity as in FIG. 8F (e.g., the first decreased opacity that is different from the opacity of shadow 7016 in FIG. 8E).

FIG. 8H illustrates that window 7010 has been moved further backward in the three-dimensional environment, even further from the viewpoint of user 7002, in response to further movement of the second input by hand 7022, as indicated by arrow 7050 (which is included in FIG. 8H for illustrative purposes and optionally not displayed via display generation component 7100) and in top view 7026. Due to perspective, window 7010 is thus shown as smaller in size than in FIG. 8G, due to the increased distance between window 7010 and the viewpoint of user 7002. In accordance with the decreased width of window 7010, shadow 7016 corresponding to window 7010 is also decreased in width relative to shadow 7016 in FIG. 8G (e.g., to a width that corresponds to the decreased width of window 7010 in FIG. 8H). Window 7010 remains visually deemphasized, optionally with the same opacity as in FIG. 8G. Reflections 7042-1 and 7042-2 are shifted again relative to window 7010 and decreased slightly further in size, in accordance with window 7010 in FIG. 8H having been repositioned relative to light sources 7038 and 7040 in being moved further from viewpoint 7046 of user 7002, in comparison with FIG. 8G. In addition, top view 7026 in FIG. 8H illustrates that the simulated position of window 7010 in the three-dimensional environment is now greater than the threshold distance $D_{th1}$ yet still less than a threshold distance $D_{th2}$ from viewpoint 7046 of user 7002. In some embodiments, while window 7010 is moved through a predefined range of distances from the viewpoint of user 7002, the shadow corresponding to window 7010 is progressively faded out (e.g., the shadow is faded out more with increasing distance of the window to the viewpoint of the user). Accordingly, shadow 7016 represents that the opacity of the shadow corresponding to window 7010 in FIG. 8H has been decreased relative to FIG. 8G, to a second decreased opacity that is less opaque (e.g., more transparent) than the first decreased opacity of FIGS. 8F-8G. In some embodiments, the fading out of the shadow corresponding to an object as the object is moved further from the viewpoint of the user occurs in conjunction with (and optionally at a faster rate than) the decrease in width of the shadow due to the decrease in width of the object due to perspective (e.g., the shadow fades out completely before the shadow shrinks to zero width).

FIG. 8I illustrates that window 7010 has been moved even further backward in the three-dimensional environment, further yet from the viewpoint of user 7002, in response to even further movement of the second input by hand 7022, as indicated by arrow 7052 (which is included in FIG. 8I for illustrative purposes and optionally not displayed via display generation component 7100) and in top view 7026. Due to perspective, window 7010 is thus shown as smaller in size than in FIG. 8H, due to the increased distance between window 7010 and the viewpoint of user 7002. Window 7010 remains visually deemphasized, optionally with the same opacity as in FIG. 8H. Reflections 7042-1 and 7042-2 are shifted yet again relative to window 7010 and decreased even further in size, in accordance with window 7010 in FIG. 8I having been repositioned relative to light sources 7038 and 7040 in being moved further from viewpoint 7046 of user 7002, in comparison with FIG. 8H. Top view 7026 in FIG. 8H illustrates however that the simulated position of window 7010 in the three-dimensional environment is now greater than even the threshold distance $D_{th2}$ from viewpoint 7046 of user 7002. In some embodiments, while window 7010 is beyond the predefined range of distances from the viewpoint of user 7002 (e.g., the distance between the simulated position of window 7010 and the viewpoint of the user is at least $D_{th2}$), the shadow corresponding to window 7010 ceases to be displayed altogether (e.g., having been progressively faded out as window 7010 was moved through the predefined range of distances). Accordingly, shadow 7016 is not displayed in the three-dimensional environment in FIG. 8I (or, optionally, shadow 7016 is present but fully transparent).

FIG. 8J illustrates changes in the appearance of a shadow corresponding to an object as a distance between the object and a surface corresponding to the object, such as a surface on which the shadow corresponding to the object is displayed (e.g., a surface below the object) increases (e.g., the object is moved away from the surface) (e.g., in a transition from FIG. 8F). FIG. 8J illustrates that a third input to move window 7010 in the three-dimensional environment is being performed by user 7002 using hand 7022 (e.g., an alternate transition from FIG. 8D or FIG. 8F). In response to movement of the third input, window 7010 has been moved upward in the three-dimensional environment, further from the top surface of table 7024, as indicated by arrow 7054 (which is included in FIG. 8J for illustrative purposes and optionally not displayed via display generation component 7100). Accordingly, shadow 7016 in FIG. 8J represents that a degree of blurring and/or feathering of the shadow corresponding to window 7010 is increased (e.g., rather than a change in opacity, as occurs when user 7002's attention with respect to window 7010 changes or while an input initiating movement of window 7010 is detected). Window 7010 is visually deemphasized during the third input, optionally with the same decreased opacity as in FIG. 8D or 8F. Reflections 7042-1 and 7042-2 are shifted slightly relative to window 7010 and increased in size, in accordance with window 7010 in FIG. 8J having been repositioned closer to light sources 7038 and 7040, in comparison with FIG. 8F.

In some embodiments, although certain aspects of the three-dimensional environment, such as the types of changes in appearance of shadow 7016 in response to the input(s) initiating movement of window 7010 in FIGS. 8A-8J, are independent of the lighting conditions in the three-dimensional environment (e.g., as long as a threshold amount of light is present in the three-dimensional environment), other aspects of the three-dimensional environment such as specular reflection do change based on different lighting conditions in the three-dimensional environment. For example, if the three-dimensional environment of FIGS. 8A-8J is lit by light source 7038 (e.g., as a real or simulated light source) and not by light source 7040, reflection 7042-1 of light source 7038 is displayed without displaying reflection 7042-2 of light source 7040. In another example, if the three-dimensional environment of FIGS. 8A-8J is lit by light source 7040 (e.g., as a real or simulated light source) and not by light source 7038, reflection 7042-2 of light source 7040 is displayed without displaying reflection 7042-1 of light source 7038.

In some embodiments, a shadow corresponding to an object exhibits similar behavior in response to changes in the distance between the object and a surface on which the shadow corresponding to the object is displayed as in response to changes in the distance between the object and the viewpoint of the user. For example, while the degree of blurring and/or feathering of shadow 7016 changes as window 7010 is moved further upward and away from the top surface of table 7024, shadow 7016 is progressively faded out (e.g., the (e.g., the shadow is faded out more with increasing height of window 7010 above table 7024). In some embodiments, the fading out of shadow 7016 occurs within a predefined range of heights (e.g., distances) of window 7010 above the top surface of table 7024, beginning at a first threshold height of window 7010 above the top surface of table 7024 and resulting in shadow 7016 being completely faded out at a greater second threshold height of window 7010 above the top surface of table 7024. In some embodiments, while window 7010 is below the first threshold height above the top surface of table 7024, the intensity (e.g., opacity) of shadow 7016 corresponding to window 7010 remains the same regardless of the direction or magnitude of movement of window 7010. In some embodiments, the fading out of the shadow corresponding to an object as the object is moved further from a corresponding surface occurs in conjunction with (and optionally at a faster rate than) the increase in the degree of blurring and/or feathering of the shadow (e.g., the shadow fades out completely before the shadow blur and/or feathering radius reaches a maximum). In some embodiments, the range of distances with respect to a corresponding surface is different from the range of distances with respect to the viewpoint of the user. For example, shadow 7016 is optionally faded out as window 7010 is moved through a first range of distances (e.g., between 1, 1.5, 2, 3 or 4 meters and 4.5, 5, 6, or 7 meters, or other range) from the viewpoint of user 7002, yet faded out as window 7010 is moved through a different (e.g., higher or lower and/or wider or narrower) second range of distances (e.g., between 1, 1.5, or 2 meters and 2.5, 3, or 4 meters, or other range) from the top surface of table 7024.

FIGS. 9A-9E illustrate examples of displaying simplified shadows for user interface objects in an environment. The user interfaces in FIGS. 9A-9E are used to illustrate the processes described below, including the processes in FIG. 13.

Figure 9D:
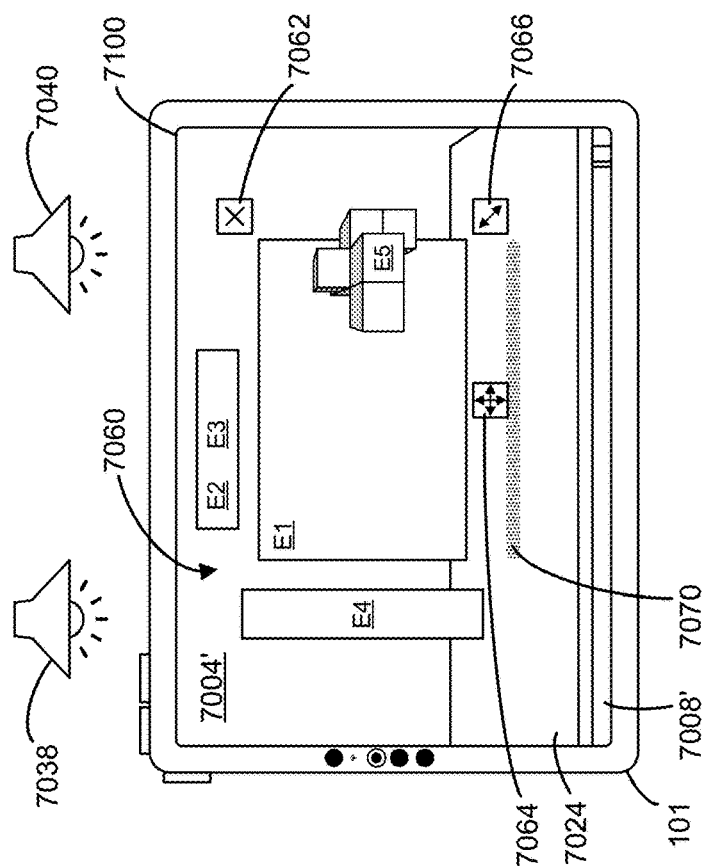

FIG. 9A illustrates a view of the three-dimensional environment that is visible to user 7002 via display generation component 7100 of computer system 101. In some embodiments, one or more portions of the view of the three-dimensional environment are digital passthrough portions that include representations of corresponding portions of physical environment 7000 (FIG. 7A) captured via one or more image sensors of computer system 101. In some embodiments, one or more portions of the view of the three-dimensional environment are optical passthrough portions, in that user 7002 can see one or more portions of physical environment 7000 through one or more transparent or semi-transparent portions of display generation component 7100. In FIG. 9A, user interface 7060 includes a plurality of constituent elements, including for example: element E1, a first region of user interface 7060 (e.g., a main region or window); elements E2 and E3, together in a second region of user interface 7060 (e.g., elements in a toolbar, menu bar, or navigation bar, such as tabs, forward and/or back buttons, or other menu or navigation controls); element E4, a third region of user interface 7060 (e.g., another toolbar, menu bar, navigation bar, or other set of controls, including for example tabs, forward and/or back buttons, scrollbars, or other menu or navigation controls); element E5 (e.g., three-dimensional content displayed in user interface 7060); close button 7062 (e.g., for dismissing user interface 7060); move button 7064 (e.g., for repositioning user interface 7060 in the three-dimensional environment); and resize button 7066 (e.g., for resizing user interface 7060). User interface 7060 is optionally a user interface of an application executing on computer system 101. In some circumstances, user interface 7060 is a more detailed view of an application user interface that is represented more simply as window 7010 or window 7012 in FIGS. 7B-7H and 8A-8J (e.g., user interface 7060 exhibits analogous behavior to window 7010 and/or window 7012 as described herein with reference to FIGS. 7B-7H and 8A-8J). As shown in the examples in FIGS. 9A-9E, content that is visible via display generation component 7100 of computer system 101 is displayed on a touch screen optionally held by user 7002. In some embodiments, display generation component 7100 of computer system 101 is a head-mounted display worn on user 7002's head (e.g., what is shown in FIGS. 9A-9E as being visible via display generation component 7100 of computer system 101 corresponds to user 7002's field of view when wearing a head-mounted display).

At least some of the plurality of elements that make up user interface 7060 are separated from each other in space in the three-dimensional environment. For example, as shown in top view 7026, element E1 is separate from (e.g., does not adjoin) elements E2 & E3, element E4, and buttons 7062, 7064, and 7066. Close button is positioned separate from and to the right of element E1, in the same plane (or in some embodiments at a same distance from viewpoint 7068 of user 7002) as element E1. Move button 7064 and resize button 7066 are in front of element E1 (e.g., forward from element E1 in a z-direction or radial direction), closer to viewpoint 7068 of user 7002, and optionally in the same plane as each other (or both the same distance from viewpoint 7068 of user 7002). The user interface region containing elements E2 and E3 is positioned in front of element E1 as well as in front of move button 7064 and resize button 7066 (e.g., forward in a z-direction or radial direction), closer to viewpoint 7068 of user 7002. Element E4 is also positioned in front of element E1 as well as in front of move button 7064 and resize button 7066, closer to viewpoint 7068 of user 7002, and is optionally in the same plane as the user interface region containing elements E2 and E3, or is the same distance from viewpoint 7068 as the user interface region containing elements E2 and E3. Element E5, the three-dimensional content of user interface 7060, extends forward from element E1 and past other elements toward viewpoint 7068 of user 7002.

FIG. 9A also shows shadow 7070 corresponding to user interface 7060 being displayed. Shadow 7070 is a computer-generated shadow (e.g., rendered by computer system 101). The appearance, such as the size and shape, of shadow 7070 is based on at least some of the plurality of elements that make up user interface 7060. Specifically, shadow 7070 encompasses a portion that is a shadow corresponding to element E1 of user interface 7060. In the example of FIG. 9A, shadow 7070 does not include portions that are shadows corresponding to other elements of user interface 7060. For example, shadow 7070 does not include a shadow corresponding to close button 7062 nor a shadow corresponding to resize button 7066 (which would have resulted in shadow 7070 extending further to the right). Shadow 7070 also does not include a shadow corresponding to the user interface region containing elements E2 and E3, nor shadows corresponding to elements E4 and E5, nor shadows corresponding to move button 7064 and resize button 7066 (any of which would have resulted in shadow 7070 extending further forward toward viewpoint 7068 of user 7002).

In some embodiments, computer system 101 is configured to display shadows on computer-generated surfaces and/or on passthrough views of physical surfaces. For example, shadow 7070 in FIG. 9A is displayed partially on the top surface of computer-generated table 7024, as well as partially on the top surface of box 7014', the passthrough view of physical box 7014 in physical environment 7000. FIG. 9B illustrates shadow 7070 displayed entirely on a computer-generated surface, such as the top surface of computer-generated table 7024. One of ordinary skill in the art will readily appreciate that shadow 7070 may likewise be displayed entirely on a passthrough view of a physical surface, such as entirely on the top surface of box 7014', which is the passthrough view of physical box 7014 (FIG. 7A). FIG. 9B illustrates an example transition from FIG. 9A in which user interface 7060 is repositioned (e.g., to the left) in the three-dimensional environment in response to detecting an input to reposition user interface 7060 (e.g., an input activating move button 7064 and optionally including movement of the input, such as a drag gesture, to the left). The spatial relationships between the constituent elements of user interface 7060 stay the same as user interface 7060 is repositioned from a first location as shown in FIG. 9A (e.g., with a first set of locations for the constituent elements) to a second location as shown in FIG. 9B (e.g., with a second set of locations for the constituent elements).

In some embodiments, the appearance of shadow 7070 is independent of the lighting conditions in the three-dimensional environment (e.g., as long as a threshold amount of light is present in the three-dimensional environment). For example, shadow 7070 would have the same appearance if the three-dimensional environment of FIGS. 9A-9B were lit by light source 7038 (e.g., as a real or simulated light source) or if the three-dimensional environment of FIGS. 9A-9B were lit by light source 7040 (e.g., as a real or simulated light source) or even by both light sources 7038 and 7040, or if the three-dimensional environment transitioned from being lit by one combination of light sources 7038 and 7040 to being lit by a different combination of light sources 7038 and 7040. One of ordinary skill in the art will readily appreciate that various other lighting conditions may be present in the three-dimensional environment of FIGS. 9A-9B, and shadow 7070 would optionally be the same under the various lighting conditions.

Figure 9C:
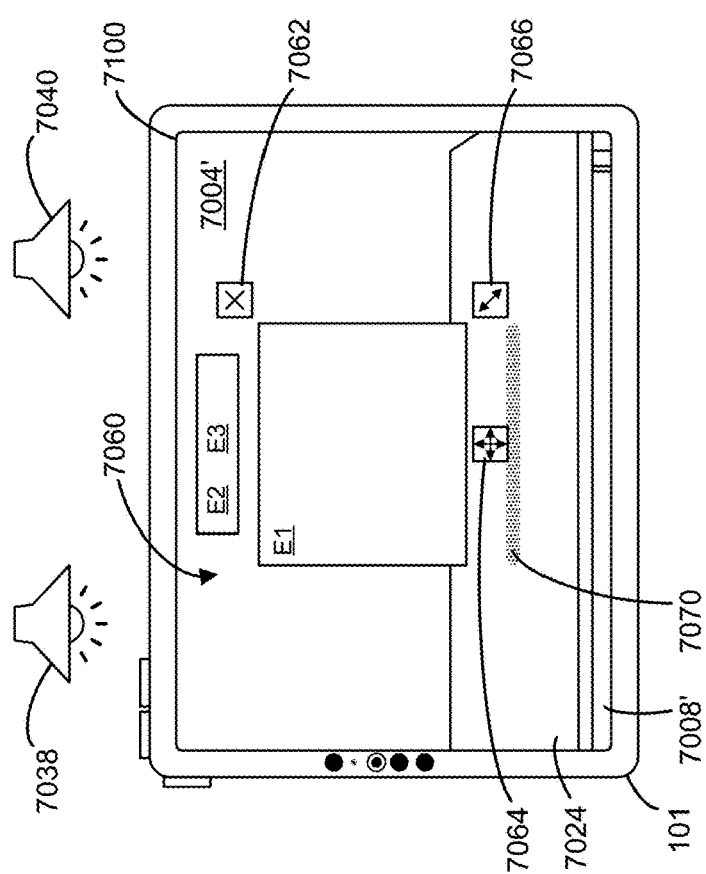

FIG. 9C illustrates user interface 7060 with a changed appearance. In FIG. 9C, user interface 7060 does not include elements E4 and E5. Although the appearance of user interface 7060 has changed, the appearance of shadow 7070 corresponding to user interface 7060 has not changed in FIG. 9C. In particular, because shadow 7070 in FIGS. 9A-9B did not include portions that were shadows corresponding to elements E4 and E5, the absence of elements E4 and E5 from user interface 7060 in FIG. 9C does not affect the appearance of shadow 7070 in FIG. 9C.

FIG. 9D illustrates that user interface 7060 has been resized (e.g., in response to an input activating resize button 7066 and optionally including movement of the input, such as a drag gesture, to the right). In particular, element E1 has been resized so as to be wider than in FIG. 9C. In some embodiments, as element E1 is increased in width, close button 7062 and resize button 7066 are repositioned to the right, optionally so as to remain beyond the right edge of element E1, and separate from element E1. In some embodiments, as element E1 is increased in width, move button 7064 is repositioned to the right, optionally so as to remained centered relative to element E1. In the example of FIG. 9D, the positions of element E4 and of the user interface region that contains elements E2 and E3 in the three-dimensional environment, to the left and above element E1 respectively, are maintained as element E1 is resized. In accordance with element E1 of user interface 7060 being resized, shadow 7070 corresponding to user interface 7060 is also resized. In particular, shadow 7070 is increased in width by an amount corresponding to the increase in width of element E1. Because shadow 7070 in FIGS. 9A-9B did not include portions that were shadows corresponding to elements of user interface 7060 other than element E1, only the change to element E1 affects the appearance of shadow 7070 in FIG. 9D.

Figure 9E:
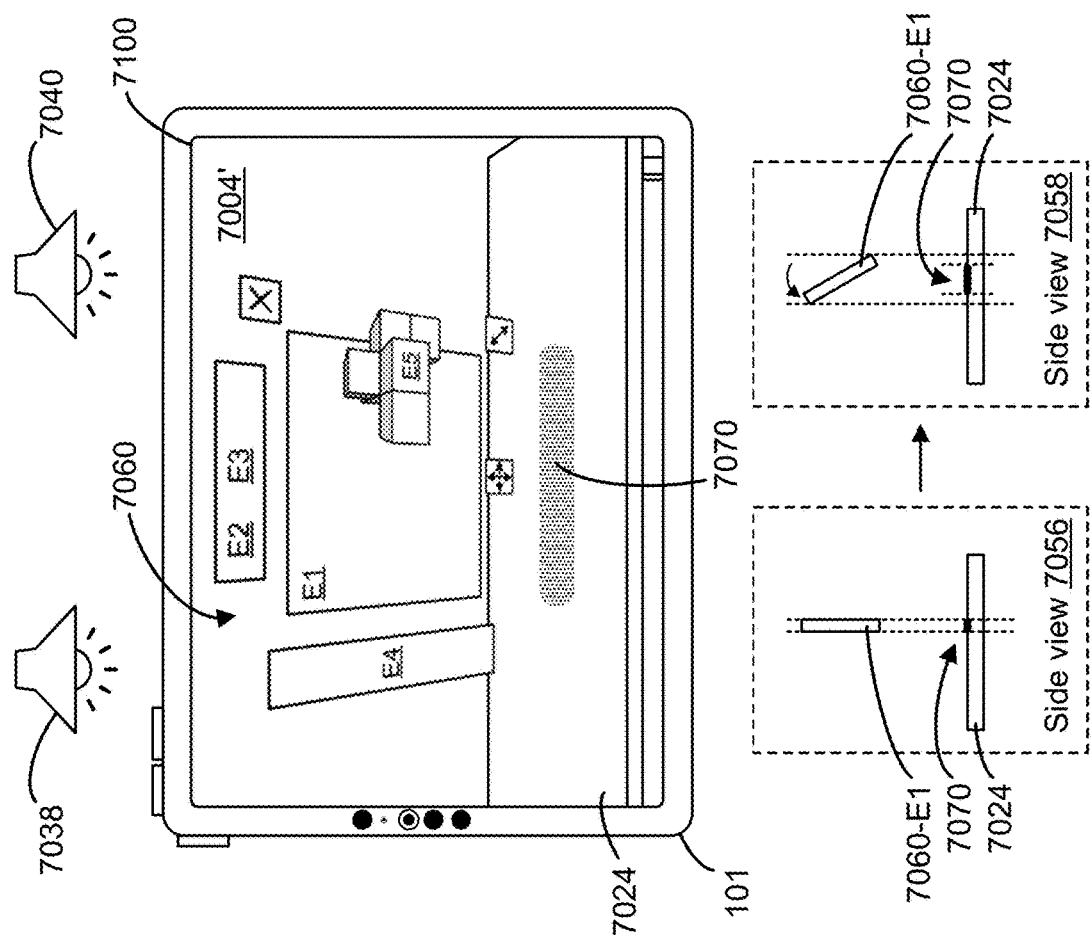

FIG. 9E illustrates that user interface 7060 has been tilted relative to a vertical direction in the three-dimensional environment (e.g., in a transition from the scenario of FIG. 9C). Side views 7056 and 7058 show a view of user interface 7060 from the right. Side view 7056 shows a view of the previous orientation of user interface 7060 (e.g., as user interface 7060 appeared in FIG. 9C), where user interface 7060, and specifically element E1 of user interface 7060, is oriented vertically above table 7024. Side view 7058 shows a view of the current orientation of user interface 7060 in FIG. 9E, where user interface 7060, and specifically element E1, is tilted toward the viewpoint of the user 7002 such that the top portion of user interface 7060 (e.g., the top portion of element E1) is closer to the viewpoint of user 7002 than the bottom portion of user interface 7060 (e.g., the bottom portion of element E1). In accordance with user interface 7060 being tilted relative to the vertical direction, shadow 7070 is increased in depth (e.g., relative to shadow 7070 in FIG. 9C). However, in some embodiments the increase in depth of shadow 7070 is different from (e.g., less than or greater than) the amount of increase in depth that would occur with a physical shadow for a physical object. For example, in side view 7056, the depth of shadow 7070 is the same as the top-down thickness of user interface 7060 (or specifically of element E1) (e.g., the thickness of user interface 7060 or element E1 when viewed directly from above), whereas the depth of shadow 7070 is less than the top-down thickness of user interface 7060 in side view 7058. Optionally, when user interface 7060 is vertical and has a first top-down thickness, shadow 7070 has a first depth; when user interface 7060 is tilted and has a second top-down thickness, shadow 7070 has a second depth; and a degree of change between the first depth and the second depth of shadow 7070 is less than (or greater than) a degree of change between the first top-down thickness and the second top-down thickness of user interface 7060.

FIGS. 10A-10E illustrate examples of simulating light emanating from user interface objects displayed in an environment. The user interfaces in FIGS. 10A-10E are used to illustrate the processes described below, including the processes in FIG. 14.

Figure 10A:
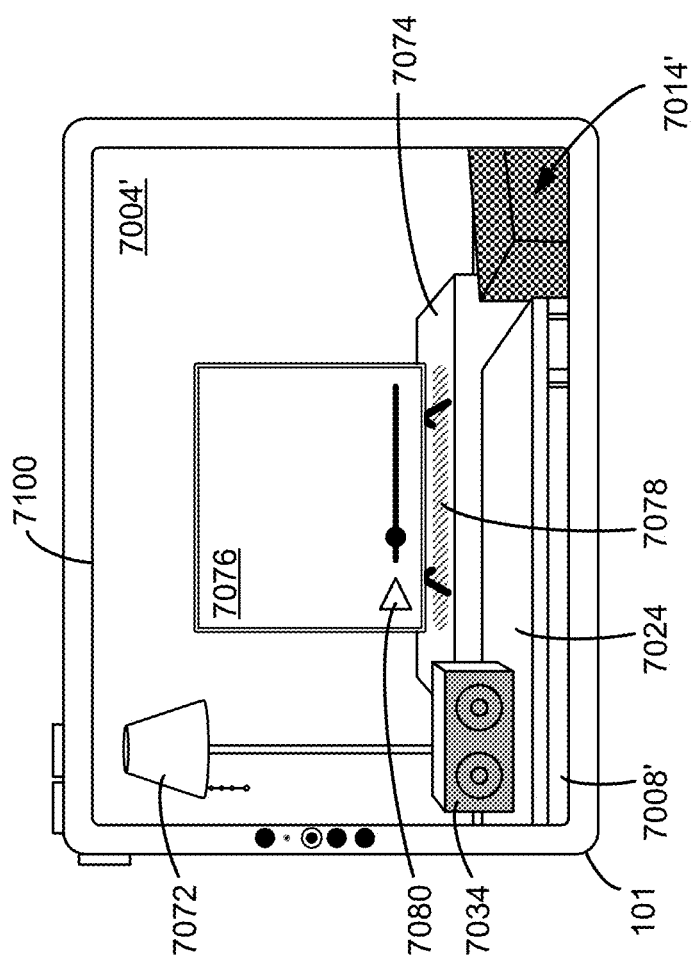
FIGS. 10A-10E illustrate example techniques for simulating light emanating from user interface objects displayed in an environment, in accordance with some embodiments.

FIG. 10A illustrates a view of a scene in the three-dimensional environment that is visible to user 7002 via display generation component 7100 of computer system 101. In some embodiments, one or more portions of the view of the three-dimensional environment are digital passthrough portions that include representations of corresponding portions of physical environment 7000 (FIG. 7A) captured via one or more image sensors of computer system 101. In some embodiments, one or more portions of the view of the three-dimensional environment are optical passthrough portions, in that user 7002 can see one or more portions of physical environment 7000 through one or more transparent or semi-transparent portions of display generation component 7100. The view includes representation (or optical view) 7004' of physical wall 7004 (also called wall 7004' for ease of reference), representation (or optical view) 7008' of physical floor 7008 (also called floor 7008' for ease of reference), and representation (or optical view) 7014' of physical object 7014 (also called box 7014' for ease of reference) (e.g., as captured by one or more cameras of computer system 101 or visible through one or more transparent or semi-transparent portions of display generation component 7100). As shown in the examples in FIGS. 10A-10E, content that is visible via display generation component 7100 of computer system 101 is displayed on a touch screen optionally held by user 7002. In some embodiments, display generation component 7100 of computer system 101 is a head-mounted display worn on user 7002's head (e.g., what is shown in FIGS. 8A-8J as being visible via display generation component 7100 of computer system 101 corresponds to user 7002's field of view when wearing a head-mounted display).

The scene in FIG. 10A also includes a view of speaker 7034 on table 7024 (e.g., computer-generated objects as described), as well as a view of television 7076 (e.g., a representation or optical view of a physical television or a computer-generated television), television stand 7074 (e.g., a representation or optical view of a physical television stand or a computer-generated television stand), and lamp 7072 (e.g., a representation or optical view of a physical lamp or a computer-generated lamp). In FIG. 10A, the three-dimensional environment is well lit (e.g., at least a threshold amount of light is present in the environment), based on physical lighting in corresponding physical environment 7000 and/or simulated lighting from one or more computer-generated light sources. Accordingly, television 7076 is shown with a computer-generated shadow 7078. Speaker 7034 is optionally displayed without a computer-generated shadow, as illustrated in FIG. 10A, or optionally displayed with a computer-generated shadow (e.g., similar to shadow 7036 (FIG. 7F)). In addition, content (e.g., a video) is not being played on television 7076, as indicated by play-pause button 7080 being displayed as a play button.

Figure 10C:
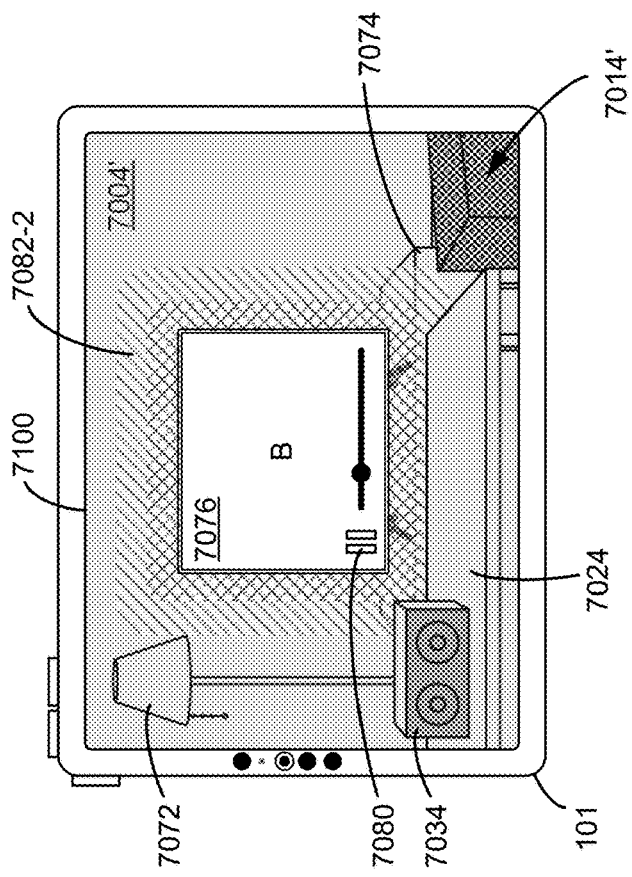
Figure 10B:
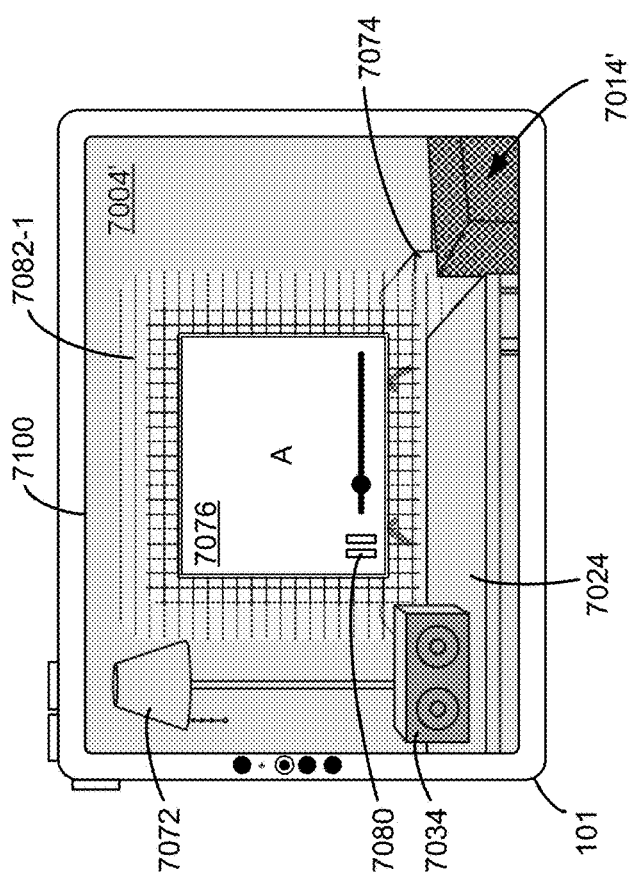

FIGS. 10B-10C illustrate ongoing playback of content in the three-dimensional environment, as indicated by play-pause button being displayed as a pause button, when the three-dimensional environment is a mixed reality environment. For example, the view of the three-dimensional environment in FIGS. 10B-10C includes wall 7004', floor 7008', and box 7014' (e.g., the respective passthrough views of physical wall 7004, physical floor 7008, and physical box 7014 in physical environment 7000 (FIG. 7A)). FIGS. 10B-10C also illustrate examples where one or more of television 7076, television stand 7074, and lamp 7072 are passthrough views of physical counterparts (e.g., which would also have been shown in physical environment 7000 of FIG. 7A).

FIG. 10B illustrates a view of the three-dimensional environment that is visible in response to detecting an input to play content (e.g., video content) via television 7076 (e.g., an input activating play button 7080 in the scenario illustrated in FIG. 10A). As shown in FIGS. 10B-10C, in response to detecting the input to play the content (and while playing the content), computer system 101 dims or darkens the view of the three-dimensional environment, such as by reducing the amount of simulated light from one or more computer-generated light sources and/or applying a darkening filter to one or more computer-generated elements in the three-dimensional environment and/or to one or more passthrough portions of the view of the three-dimensional environment (e.g., by overlaying a partially transparent darkening layer). In addition, computer system 101 ceases to display computer-generated shadows corresponding to objects in the three-dimensional environment, such as shadow 7078 corresponding to television 7076.

While content is playing in the three-dimensional environment (e.g., on television 7076 or in another user interface in the three-dimensional environment), computer system 101 displays a light spill visual effect that simulates light emanating from the content. In FIG. 10B, light spill 7082-1 appears as a glow (e.g., beyond the bounds of television 7076) that has a first degree of fidelity to the content being played, in accordance with the three-dimensional environment in FIG. 10B being a mixed reality environment. In some embodiments, a currently playing scene A of the content being played is sampled to generate light spill 7082-1, optionally using a first number of samples such as 12, 18, 32, 45, or any other first number of samples. For example, colors sampled from various regions, such as edge regions and/or interior regions, of the content (e.g., sampled from scene A) are blurred past the edge of television 7076 to form light spill 7082-1. In some embodiments, light spill 7082-1 has a color tint that is based on a second number of samples, such as 1, 2, 3, 8, or any other second number of samples, taken from (e.g., scene A of) the content. A sampled color is optionally the color of a specific point in the content, a median color of the colors in the content (or in a particular region of the content), an average of the colors in the content (or in a particular region of the content), or a color determined from the content using another means.

In some embodiments, light spill 7082-1 is displayed in the same plane (or in some embodiments along a surface whose points are the same distance from a viewpoint of user 7002) as the content. For example, in accordance with the plane of television 7076, light spill 7082-1 is displayed in front of wall 7004' and in front of at least a portion of television stand 7074 while being at least partially obscured by table 7024 and speaker 7034. In some embodiments, the intensity of the visual effect decreases with distance from the content. For example, portions of light spill 7082-1 that are closer to television 7076 are more intense (e.g., as indicated by the denser gridded fill pattern), whereas portions of light spill 7082-1 that are further from television 7076 are less intense (e.g., as indicated by the sparser horizontal ruled fill pattern).

FIG. 10C illustrates that the appearance of light spill 7082 (e.g., the glow visual effect of FIG. 10B) is based on a current appearance of the content being played, by illustrating that the appearance of light spill 7082 changes when the appearance of the content changes. In contrast to FIG. 10B, in which the appearance of light spill 7082-1 is based on scene A of the content playing on television 7076, in FIG. 10C, the content playing on television 7076 has progressed from scene A to scene B, and thus the appearance of light spill 7082-2 in FIG. 10C is based on scene B of the content (e.g., as represented by the hatched and crosshatched pattern fills for light spill 7082-2 in FIG. 10C being different from the horizontal ruled and gridded pattern fills for light spill 7082-1 in FIG. 10B). In some embodiments, one or more other aspects of light spill 7082 stay the same as the appearance of the light spill changes due to the appearance of the corresponding content changing. For example, like light spill 7082-1, light spill 7082-2 is optionally generated based on the first number of samples taken from scene B and/or color tinted based on the second number of samples taken from scene B (rather than from scene A as in FIG. 10B). In some embodiments, light spill 7082-2 optionally continues to be displayed in the same plane (or along the same surface whose points are the same distance from a viewpoint of user 7002) as the content and/or continues to decrease in intensity with increasing distance from the content (e.g., as indicated by the progression of light spill 7082-2 from the denser crosshatched fill pattern to the sparser hatched fill pattern as the distance from television 7076 increases).

Figure 10D:
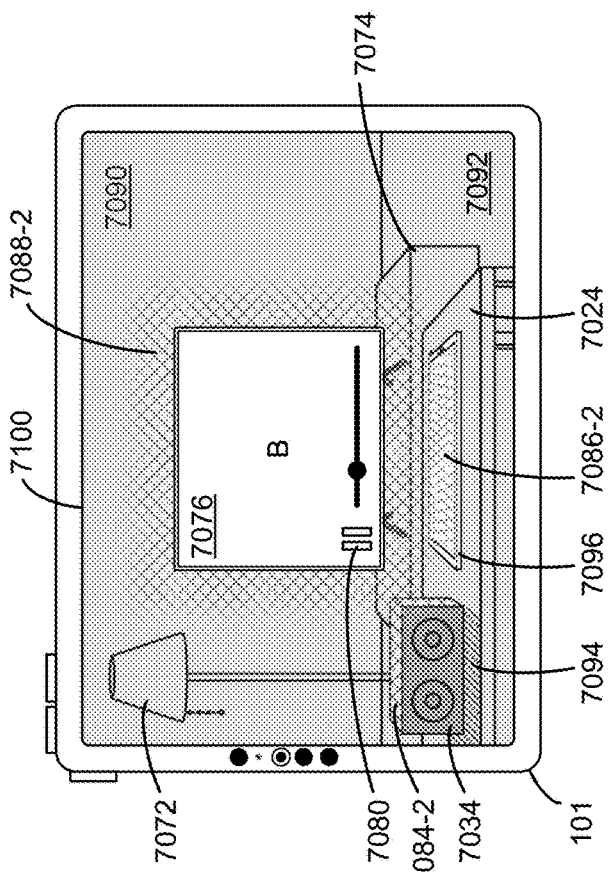
Figure 10E:
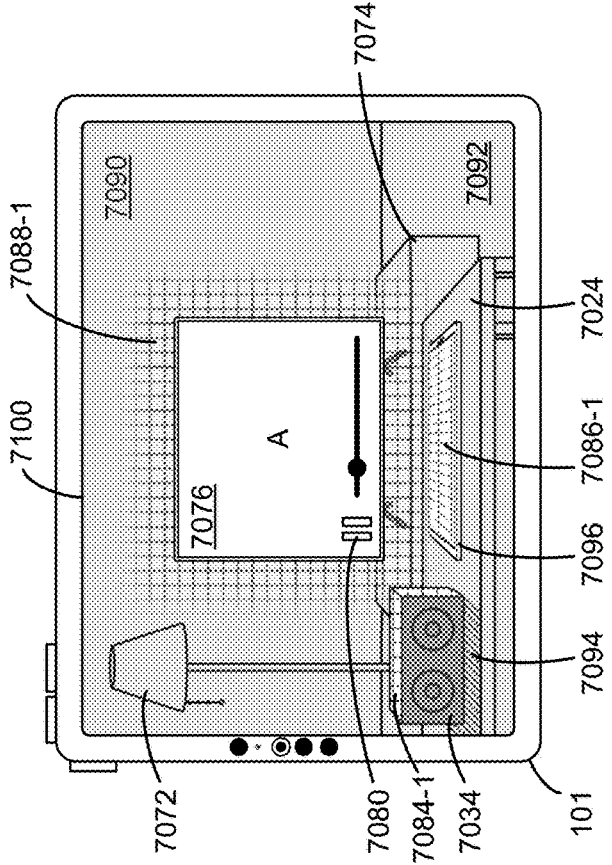

FIGS. 10D-10E illustrate ongoing playback of content in the three-dimensional environment, as indicated by play-pause button being displayed as a pause button, when the three-dimensional environment is a computer-generated virtual reality environment. For example, the view of the three-dimensional environment in FIGS. 10D-10E includes computer-generated wall 7090 instead of passthrough wall 7004', includes computer-generated floor 7092 instead of passthrough floor 7008', and does not include passthrough box 7014'. In addition, in the examples of FIGS. 10D-10E, television 7076, television stand 7074, and lamp 7072 are computer-generated objects.

FIG. 10D illustrates a view of the three-dimensional environment that is visible in response to detecting an input to play content (e.g., video content) via television 7076, and that is analogous to the view illustrated in FIG. 10B except that the three-dimensional environment visible in FIG. 10D is a virtual reality environment whereas the three-dimensional environment visible in FIG. 10B is a mixed reality environment. In some embodiments, the input to play the content is directed to a mixed reality environment such as the mixed reality environment of FIG. 10A, and computer system 101 transitions the three-dimensional environment to a fully virtual environment such as the virtual environment of FIG. 10D, optionally increasing the level of immersion by ceasing to display one or more passthrough elements (e.g., box 7014', wall 7004', and/or floor 7008') and/or by displaying one or more additional computer-generated elements (e.g., floor 7092, wall 7090, and/or tablet 7096. In some embodiments, the input to play the content is directed to a virtual environment (e.g., such as if FIG. 10D were a transition from a different version of FIG. 10A that illustrated the virtual environment of FIG. 10D with the lights on). As shown in FIGS. 10D-10E, in response to detecting the input to play the content (e.g., whether directed to a mixed reality or virtual environment) (and while playing the content), computer system 101 dims or darkens the view of the three-dimensional environment, such as by reducing the amount of simulated light from one or more computer-generated light sources and/or applying a darkening filter to various computer-generated elements in the three-dimensional environment and/or to one or more passthrough portions of the view of the three-dimensional environment (e.g., if the input to play the content is directed to a mixed reality environment). In addition, computer system 101 ceases to display computer-generated shadows corresponding to objects in the three-dimensional environment, such as shadow 7078 corresponding to television 7076.

While scene A of the content is playing in the three-dimensional environment (e.g., on television 7076 or in another user interface in the three-dimensional environment), computer system 101 displays a light spill visual effect that simulates light emanating from the content. In FIG. 10D, light spill 7088-1 appears as light being cast in the three-dimensional environment (e.g., beyond the bounds of television 7076) with a second degree of fidelity to the content being played that is higher than the first degree of fidelity, in accordance with the three-dimensional environment in FIG. 10D being a virtual reality environment. In some embodiments, light spill 7088 (e.g., including light spill 7088-1 in FIG. 10D and light spill 7088-2 in FIG. 10E) is generated based on a three-dimensional model (e.g., mesh) of the three-dimensional virtual environment, so that light being cast onto and/or reflected by other objects in the three-dimensional environment is displayed more realistically. In some embodiments, scene A of the content is sampled to generate light spill 7088-1, optionally using a third number of samples that is greater than the first number of samples used for the lower first degree of fidelity light spill. For example, colors sampled from various regions, such as edge regions and/or interior regions, of the content (e.g., sampled from scene A) are blurred past the edge of television 7076 to form part of light spill 7088-1.

In some embodiments, as part of light spill 7088-1, colors sampled from various regions of scene A are used to generate reflections that create the appearance of other objects in the three-dimensional environment reflecting light from the content, as represented by reflection 7084-1 from speaker 7034 and reflection 7086-1 from table 7024 and from objects on table 7024 such as tablet 7096 (e.g., reflection 7086-1 represents a visual effect of light from the content on television 7076 being reflected by tablet 7096 (with the display of tablet 7096 turned off, for example) rather than a visual effect of light generated by tablet 7096). In some embodiments, as part of light spill 7088-1, computer system 101 displays shadows beyond one or more objects in the three-dimensional environment to simulate the one or more objects obstructing at least some light emanating from the content, as represented by shadow 7094 appearing to be cast by speaker 7034. Accordingly, for virtual environments, light spill visual effects such as light spill 7088-1 are not constrained to the same plane (or surface whose points are the same distance from a viewpoint of user 7002) as the content, as such light spill visual effects optionally are for mixed reality environments. For example, light spill 7088-1 (e.g., including reflections 7084-1 and 7086-1 as well as shadow 7094) are displayed beyond the plane of television 7076. In some embodiments, the intensity of the light spill visual effect decreases with distance from the content (e.g., for virtual environments as well as for mixed reality environments). For example, portions of light spill 7088-1 that are closer to television 7076 are more intense, whereas portions of light spill 7088-1 that are further from television 7076 are less intense (e.g., as indicated by the feathering of the fill pattern of light spill 7088-1). In another example, portions of reflections 7084-1 and 7086-1 that are closer to television 7076 (e.g., closer to the parts of speaker 7034 and tablet 7096, respectively, that face television 7076) are more intense, whereas portions of reflections 7084-1 and 7086-1 that are further from television 7076 (e.g., closer to the parts of speaker 7034 and tablet 7096, respectively, that face away from television 7076) are less intense.

FIG. 10E illustrates that the appearance of light spill 7088-2 (e.g., the light casting visual effect of FIG. 10D) is based on a current appearance of the content being played, by illustrating that the appearance of light spill 7088 changes when the appearance of the content changes (e.g., FIGS. 10D-10E together illustrate how a light spill visual effect in a virtual environment changes based on the content currently being played in the virtual environment, analogously to the manner in which FIGS. 10B-10C together illustrate how a light spill visual effect in a mixed reality environment changes based on the content currently being played in the mixed reality environment). FIG. 10E is thus analogous to FIG. 10C except that the three-dimensional environment visible in FIG. 10E is a virtual reality environment whereas the three-dimensional environment visible in FIG. 10C is a mixed reality environment. In contrast to FIG. 10D, in which the appearance of light spill 7088-1 is based on scene A of the content playing on television 7076, in FIG. 10E, the content playing on television 7076 has progressed from scene A to scene B, and thus the appearance of light spill 7088-2 in FIG. 10E is based on scene B of the content (e.g., as represented by the crosshatched pattern fills for light spill 7088-2, reflection 7084-2, and reflection 7086-2 in FIG. 10E being different from the gridded pattern fills for light spill 7088-1, reflection 7084-1, and reflection 7086-1 in FIG. 10D). In some embodiments, one or more other aspects of light spill 7088 stay the same as the appearance of the light spill changes due to the appearance of the corresponding content changing. For example, like light spill 7082-1, light spill 7088-2 is optionally generated based on the third number of samples taken from scene B (rather than from scene A as in FIG. 10D). In some embodiments, light spill 7088-2 optionally is displayed in the same or analogous regions of the three-dimensional environment as light spill 7088-1, such as by extending into the same space beyond the bounds of television 7076 and/or by being reflected by the same objects (e.g., speaker 7034, table 7024 and/or tablet 7096). In some embodiments, like light spill 7082-2, light spill 7088-2 decreases in intensity with increasing distance from the content and/or casts the same or analogous shadows (e.g., speaker 7034 casts shadow 7094 with both light spill 7088-1 and 7088-2).

One of ordinary skill will readily appreciate that alternatively, FIG. 10E together with FIG. 10B, and analogously FIG. 10D together with FIG. 10C, illustrate how a light spill visual effect in a three-dimensional environment changes based on the content currently being played in the three-dimensional environment (e.g., based on scene B being a later scene than scene A) as well as based on changes in the degree of immersion of the three-dimensional environment (e.g., an increase in immersion from the less immersive mixed reality environment of FIG. 10B to the more immersive virtual environment of FIG. 10E, and a decrease in immersion from the more immersive virtual environment of FIG. 10D to the less immersive mixed reality environment of FIG. 10C).

In some embodiments, light spill visual effects have a size (e.g., length and/or width) that is based on a size (e.g., length and/or width) of the corresponding content. For example, light spill 7082 in FIGS. 10B-10C has a width and height based on the size of the corresponding content being played on television 7076 (e.g., based on the size of television 7076). In another example, light spill 7088 in FIGS. 10D-10E has a width and height based on the size of the corresponding content being played on television 7076 (e.g., based on the size of television 7076); in addition, the extent to which light is simulated as being cast in the three-dimensional environment, such as in the form of reflections 7084 and 7086, is based on the size of the corresponding content being played on television 7076 (e.g., based on the size of television 7076). If television 7076 were wider and taller, light spill 7082 and light spill 7088 would likewise be wider and taller, and optionally light would be cast further into the three-dimensional environment such that reflections 7084 and 7086 would be brighter and reflection 7086 would be wider and extend further from television 7076.

Additional descriptions regarding FIGS. 7A-7H, 8A-8J, 9A-9E, and 10A-10E are provided below in reference to methods 1100, 1200, 1300, and 1400 described with respect to FIGS. 7A-7H, 8A-8J, 9A-9E, and 10A-10E.

FIG. 11 is a flow diagram of an exemplary method 1100 for displaying attention-based shadows for user interface objects in an environment, in accordance with some embodiments. In some embodiments, method 1100 is performed at a computer system (e.g., computer system 101 in FIG. 1) that is in communication with a display generation component (e.g., display generation component 120 in FIGS. 1, 3, and 4) (e.g., a hardware element, comprising one or more display devices, such as a display, a touchscreen, a projector, a heads-up display, a head-mounted display, or the like) and one or more input devices (e.g., one or more cameras (e.g., color sensors, infrared sensors, structured light scanners, and/or other depth-sensing cameras) that point downward at a user's hand, forward from the user's head, and/or that faces the user; eye-tracking devices; user-held and/or user-worn controllers; touch-sensitive surfaces, and/or other input hardware). In some embodiments, the method 1100 is governed by instructions that are stored in a non-transitory (or transitory) computer-readable storage medium and that are executed by one or more processors of a computer system, such as the one or more processors 202 of computer system 101 (e.g., control 110 in FIG. 1A). Some operations in method 1100 are, optionally, combined and/or the order of some operations is, optionally, changed.

While a view of a three-dimensional environment is visible via the display generation component (e.g., including one or more computer-generated portions and optionally one or more passthrough portions), the computer system displays (1102), in the three-dimensional environment, a first computer-generated user interface object (e.g., a computer-generated object that is not a view of a physical object in a field of view of one or more cameras of the computer system) (e.g., window 7010 (FIG. 7B), window 7012 (FIG. 7B), or speaker 7034 (FIG. 7F)).

The computer system detects (1104) that a user's attention (e.g., gaze) is directed to the first user interface object. In response to detecting that the user's attention is directed to the first user interface object (e.g., and while continuing to detect that the user's attention is directed to the first user interface object), the computer system displays (1106) a first virtual shadow (e.g., a computer-generated shadow) for the first user interface object with a first appearance (e.g., appearing to be cast by the first user interface object onto a portion of the environment), while maintaining a pose (e.g., position and/or orientation) of the first user interface object relative to the three-dimensional environment (e.g., and, optionally, independently of a pose of a source of light in the environment). Displaying the first virtual shadow for the first user interface object with the first appearance includes displaying the first virtual shadow with a first value for a first visual property (e.g., shadow 7016 for window 7010 (FIG. 7B), shadow 7018 for window 7012 (FIG. 7B), or shadow 7036 for speaker 7034 (FIG. 7F)).

While continuing to display the first user interface object in the three-dimensional environment (optionally at the same location relative to other real and/or virtual objects in the three-dimensional environment), the computer system detects (1108) that the user's attention has ceased to be directed to the first user interface object (e.g., while displaying the first user interface object; in other words, the first user interface object remains in view yet no longer has focus). In response to detecting that the user's attention has ceased to be directed to the first user interface object, the computer system displays (1110) the first virtual shadow (e.g., a computer-generated shadow) for the first user interface object with a second appearance that is different from the first appearance, while maintaining the pose (e.g., position and/or orientation) of the first user interface object relative to the three-dimensional environment (e.g., and, optionally, independently of a pose of a source of light in the environment). Displaying the first virtual shadow for the first user interface object with the second appearance includes (1112) displaying the first virtual shadow with a second value for the first visual property. The second value is (1114) different from the first value. In some embodiments, before detecting that the user's attention is directed to the first user interface object, the first virtual shadow for the first user interface object is displayed with the second appearance. For example, as described herein, shadow 7016 for window 7010 is displayed with a different opacity while user 7002's gaze is directed to window 7010 (FIG. 7E) than while user 7002's gaze is not (e.g., has ceased to be) directed to window 7010 (FIG. 7B or FIG. 7G). Similarly, shadow 7018 for window 7012 is displayed with a different opacity while user 7002's gaze is directed to window 7012 (FIG. 7D) than while user 7002's gaze is not (e.g., has ceased to be) directed to window 7012 (FIG. 7B or FIG. 7E). Likewise, shadow 7036 for speaker 7034 is displayed with a different opacity while user 7002's gaze is directed to speaker 7034 (FIG. 7G) than while user 7002's gaze is not (e.g., has ceased to be) directed to speaker 7034 (FIG. 7F).

While displaying a computer-generated shadow for a user interface object in a three-dimensional environment, which provides improved visual feedback about the spatial relationship between the user interface object and the three-dimensional environment, changing the value of a visual property of the shadow based on whether a user's attention is directed to the user interface object indicates which part of the three-dimensional environment currently has focus for further interaction, which provides improved visual feedback about a state of the computer system.

In some embodiments, in response to detecting that the user's attention is directed to the first user interface object, the computer system displays the first virtual shadow with the first appearance while maintaining a size (e.g., in one or more dimensions, such as height, width, and/or depth) of the first user interface object; and, in response to detecting that the user's attention has ceased to be directed to the first user interface object, the computer system displays the first virtual shadow with the second appearance while maintaining the size of the first user interface object. Maintaining the size of a user interface object while changing the appearance of a computer-generated shadow for the user interface object balances providing improved visual feedback about a state of the computer system with reducing the likelihood that the user will suffer from motion sickness when using the computer system by not cluttering the user interface with too many changes.

In some embodiments, displaying the first virtual shadow for the first user interface object with the first appearance (e.g., in response to detecting that the user's attention is directed to the first user interface object) is performed in accordance with a determination that the user's attention has been directed to the first user interface object for at least a first threshold amount of time (e.g., the computer system forgoes displaying the first virtual shadow with the first appearance until detecting that the user's attention has been directed to the first user interface object for at least the first threshold amount of time) (e.g., as described herein with reference to timer 7032 of FIG. 7D). In some embodiments, the first virtual shadow is not displayed with the first appearance (e.g., the first virtual shadow continues to be displayed with a prior appearance) prior to the user's attention being directed to the first user interface object for at least the first threshold amount of time. Requiring that a user's attention be directed to a user interface object for at least a threshold amount of time in order for the computer system to indicate that the user interface object has focus for further interaction causes the computer system to automatically discern user intent more accurately and thereby reduce input mistakes and unintended outcomes.

In some embodiments, detecting that the user's attention is directed to the first user interface object includes detecting that the user's gaze is directed to the first user interface object, and detecting that the user's attention has ceased to be directed to the first user interface object includes ceasing to detect that the user's gaze is directed to the first user interface object (e.g., by detecting that the user's gaze has moved away from the first user interface object or by ceasing to detect the user's gaze). Requiring that a user's gaze be directed to a user interface object in order for the computer system to indicate that the user interface object has focus for further interaction based on the user's attention being directed to the user interface object causes the computer system to automatically discern user intent more accurately and thereby reduce input mistakes and unintended outcomes.

In some embodiments, the first visual property is visual intensity (e.g., opacity, darkness, and/or other visual property). In some embodiments, when the first virtual shadow is displayed with the first appearance (e.g., in response to detecting that the user's attention is directed to the first user interface object), the first virtual shadow is displayed with the first value for visual intensity (e.g., opacity, degree of blurring, degree of feathering, darkness, and/or other visual property), and when the first virtual shadow is displayed with the second appearance (e.g., in response to detecting that the user's attention has ceased to be directed to the first user interface object), the first virtual shadow is displayed with the second value for visual intensity that is different from (e.g., more or less intense than) the first value for visual intensity. Changing the visual intensity of a shadow (e.g., by changing the value of a visual property such as opacity or darkness) based on whether a user's attention is directed to the user interface object indicates which part of the three-dimensional environment currently has focus for further interaction, which provides improved visual feedback about a state of the computer system.

In some embodiments, the computer system displays the first virtual shadow at least partially on a computer-generated surface in the three-dimensional environment (e.g., with a spatial relationship to the first user interface object, such as below the first user interface object). For example, shadow 7016 is displayed on the top surface of computer-generated table 7024 in FIGS. 7B-7G. Displaying a shadow for a user interface object on a computer-generated surface in the three-dimensional environment provides improved visual feedback about the spatial relationship between the user interface object and the three-dimensional environment.

In some embodiments, the computer system displays the first virtual shadow at least partially on a passthrough view of a physical surface in a physical environment that corresponds to the three-dimensional environment (e.g., the physical surface corresponds to a simulated position in the three-dimensional environment that is below the simulated position of the first user interface object). For example, shadow 7018 is displayed on the top surface of passthrough box 7014' in FIGS. 7B-7G. Displaying, in a three-dimensional environment, a shadow for a user interface object on a passthrough view of a physical surface in a corresponding physical environment provides improved visual feedback about the spatial relationships between the user interface object, the three-dimensional environment, and the corresponding physical environment.

In some embodiments, the first virtual shadow that is displayed at least partially on the passthrough view of the physical surface follows a three-dimensional model of the physical surface. For example, as described herein with reference to FIG. 7C, shadow 7018 is displayed on the top surface as well as down the sides of passthrough box 7014' based on a three-dimensional model of physical box 7014 (FIG. 7A). In some embodiments, the three-dimensional model of the physical surface is determined and/or generated based on depth data captured about the physical surface and/or the physical environment (e.g., via one or more cameras, time-of-flight sensors, or other depth sensors of the computer system). Displaying the shadow for the user interface object in the three-dimensional environment in accordance with a three-dimensional model or mesh of the physical surface in the corresponding physical environment provides improved visual feedback about the spatial relationships between the user interface object, the three-dimensional environment, and the corresponding physical environment.

In some embodiments, the passthrough view of the physical surface has a first degree of fidelity to the physical surface; the three-dimensional model of the physical surface has a second degree of fidelity to the physical surface; and the second degree is less than the first degree. In some embodiments, the three-dimensional model of the physical surface has a degree of fidelity to the physical surface that smooths the physical surface (e.g., so as to ignore small bumps and/or thin objects on the physical surface). For example, as described herein with reference to FIG. 7C, displaying shadow 7018 along the top and sides of passthrough box 7014' is optionally based on a simplified three-dimensional model of physical box 7014 (FIG. 7A) that smooths or ignores irregularities in the physical surface of box 7014. Displaying the shadow for the user interface object in the three-dimensional environment in accordance with a three-dimensional model or mesh with a lower fidelity to the physical surface than an optical view of the physical surface (e.g., a simplified three-dimensional model that smooths or ignores small irregularities of the physical surface and/or low profile objects on the physical surface) reduces the computational load imposed on the computer system while providing improved visual feedback about the spatial relationships between the user interface object, the three-dimensional environment, and the corresponding physical environment.

In some embodiments, the computer system displays a second computer-generated user interface object and a second virtual shadow for the second user interface object (e.g., window 7010 and shadow 7016 (FIG. 7B), window 7012 and shadow 7018 (FIG. 7B), or speaker 7034 and shadow 7036 (FIG. 7F)). Displaying computer-generated shadows for multiple computer-generated user interface objects in a three-dimensional environment provides improved visual feedback about the spatial relationships between various user interface objects and the three-dimensional environment.

In some embodiments, while displaying the first virtual shadow for the first user interface object with the first appearance (e.g., in response to detecting that the user's attention is directed to the first user interface object), the computer system displays the second virtual shadow for the second user interface object with a third appearance, including displaying the second virtual shadow with a third value for the first visual property, wherein the third value is different from the first value. In some embodiments, while continuing to display the second user interface object in the three-dimensional environment, the computer system detects that the user's attention is directed to the second user interface object after ceasing to be directed to the first user interface object (e.g., the user's attention moves from the first user interface object to the second user interface object). In some embodiments, in response to detecting that the user's attention is directed to the second user interface object, the computer system displays the second virtual shadow for the second user interface object with a fourth appearance that is different from the third appearance, while maintaining a pose of the second user interface object relative to the three-dimensional environment (e.g., and, optionally, independently of a pose of a source of light in the environment). In some embodiments, displaying the second virtual shadow for the second user interface object with the fourth appearance includes displaying the second virtual shadow with a fourth value for the first visual property; and the fourth value is different from the third value.

In some embodiments, the third value is the same as the second value (e.g., with respect to the first visual property, the appearance of the first virtual shadow while the user is not directing attention to the first user interface object is the same as the appearance of the second virtual shadow while the user is not directing attention to the second user interface object). In some embodiments, the fourth value is the same as the first value (e.g., with respect to the first visual property, the appearance of the first virtual shadow while the user is directing attention to the first user interface object is the same as the appearance of the second virtual shadow while the user is directing attention to the second user interface object). In some embodiments, the second virtual shadow for the second user interface object exhibits analogous behavior to the first virtual shadow for the first user interface object (e.g., the value of the first visual property of the second virtual shadow changes) when the user's attention has ceased to be directed to the second user interface object. For example, as described herein with reference to FIGS. 7D-7E, as user 7002's attention moves from window 7012 to window 7010, shadow 7018 for window 7012 changes in appearance in one manner, while shadow 7016 for window 7010 changes in appearance in the opposite manner (optionally, shadow 7018 and shadow 7016 trade appearances). In another example, as described herein with reference to FIGS. 7F-7G, as user 7002's attention moves from window 7010 to speaker 7034, shadow 7016 for window 7010 changes in appearance in one manner, while shadow 7036 for speaker 7034 changes in appearance in the opposite manner (optionally, shadow 7016 and shadow 7036 trade appearances). Changing the value of a visual property of a shadow for one user interface object (e.g., in one manner) as the value of the visual property of a shadow for a different user interface object in the three-dimensional is also changed (e.g., in an opposite manner) based on which user interface object a user's attention is directed to (e.g., particularly when the user's attention moves from one of the user interface objects to the other) indicates which part of the three-dimensional environment currently has focus for further interaction (and which part does not), which provides improved visual feedback about a state of the computer system.

In some embodiments, while the first virtual shadow is displayed with the second value for the first visual property, the first virtual shadow has a lower visual intensity (e.g., lower opacity, less dark, more blurred, more feathered, or other difference in a visual property) than while the first virtual shadow is displayed with the first value for the first visual property (e.g., the visual intensity of the first virtual shadow decreases when the user's attention moves away from the first user interface object). In some embodiments, while the second virtual shadow is displayed with the fourth value for the first visual property, the second virtual shadow has a greater visual intensity than while the second virtual shadow is displayed with the third value for the first visual property (e.g., the visual intensity of the second virtual shadow increases when the user's attention moves to the second user interface object). For example, as described herein with reference to FIGS. 7D-7E, as user 7002's attention moves from window 7012 to window 7010, shadow 7018 for window 7012 decreases in opacity while shadow 7016 for window 7010 increases in opacity. In another example, as described herein with reference to FIGS. 7F-7G, as user 7002's attention moves from window 7010 to speaker 7034, shadow 7016 for window 7010 decreases in opacity while shadow 7036 for speaker 7034 increases in opacity. Changing the value of a visual property of a shadow for a user interface object to which a user's attention is directed, so as to increase the visual intensity of that shadow (e.g., while the shadows for other user interface objects to which the user's attention is not directed have decreased visual intensity in comparison) indicates which part of the three-dimensional environment currently has focus for further interaction (and which part does not), which provides improved visual feedback about a state of the computer system.

In some embodiments, the computer system displays a third computer-generated user interface object and a third virtual shadow for the third user interface object, including: while the user's attention is directed to the first user interface object (e.g., not to the third user interface object), displaying the third virtual shadow with a fifth value for the first visual property (e.g., while maintaining a pose of the third user interface object relative to the three-dimensional environment); and while the user's attention is directed to the second user interface object after ceasing to be directed to the first user interface object (e.g., the user's attention is not directed to the third user interface object), displaying the third virtual shadow with the fifth value for the first visual property (e.g., while maintaining a pose of the third user interface object relative to the three-dimensional environment). For example, as described herein with reference to FIGS. 7F-7G, as user 7002's attention moves from window 7010 to speaker 7034, the appearance (e.g., opacity) of shadow 7018 for window 7012 stays the same. While the user's attention moves between two user interface objects, maintaining the value of a visual property of a shadow for a user interface object that is different from the two user interface objects indicates which part of the three-dimensional environment does not have focus (and has neither received nor lost focus) for further interaction, which provides improved visual feedback about a state of the computer system.

In some embodiments, while the user's attention is not directed to the first user interface object, the computer system displays the first user interface object with a first value for a respective visual property (optionally the same as the first visual property of the first virtual shadow) of the first user interface object. In some embodiments, in response to detecting that the user's attention is directed to the first user interface object, the computer system displays the first user interface object with a second value for the respective visual property of the first user interface object (e.g., by increasing the opacity of the first user interface object while the user's attention is directed to the first user interface object), while maintaining the pose of the first user interface object relative to the three-dimensional environment, wherein the second value for the respective visual property is different from the first value for the respective visual property. For example, as described herein with reference to FIG. 7D, in response to user 7002's attention being directed to window 7012, window 7012 is displayed with a visually emphasized appearance that optionally adds a selection outline and/or increases the opacity of window 7012. Window 7010 (FIG. 7E) and/or speaker 7034 (FIG. 7G) optionally exhibit analogous behavior while the target of user 7002's attention. In some embodiments, other user interface objects exhibit analogous behavior to the first user interface object. For example, while the user's attention is not directed to the second user interface object, the second user interface object is displayed with a different value for the respective visual property of the second user interface object than while the user's attention is directed to the second user interface object. In another example, the third user interface object is displayed with the same value for the respective visual property of the third user interface object both while the user's attention is directed to the first user interface object and while the user's attention is directed to the second user interface object after ceasing to be directed to the first user interface object. In conjunction with changing the value of a visual property of a shadow for a user interface object based on whether a user's attention is directed to the user interface object, changing a value for a visual property for the user interface object itself (e.g., the same or a different visual property as the shadow) further indicates which part of the three-dimensional environment currently has focus for further interaction, which provides improved visual feedback about a state of the computer system.

In some embodiments, in response to detecting that the user's attention has ceased to be directed to the first user interface object, the computer system gradually progresses the first visual property of the first virtual shadow through a plurality of intermediate values between the first value and the second value (e.g., progressing the first virtual shadow through a plurality of intermediate display states corresponding to the changing value of the first visual property) (e.g., as described herein with reference to shadow 7018 in FIG. 7D, shadow 7016 in FIG. 7E, and shadow 7036 in FIG. 7G). For a shadow whose appearance is changed (e.g., in response to a user directing their attention to or away from a corresponding object), changing the appearance of the shadow gradually balances providing improved visual feedback about a state of the computer system with reducing the likelihood that the user will suffer from motion sickness when using the computer system by not changing the user interface too abruptly.

In some embodiments, in response to detecting that the user's attention is directed to the first user interface object, the computer system delays displaying the first virtual shadow for the first user interface object with the first appearance until a second threshold amount of time has passed since detecting that the user's attention is directed to the first user interface object (e.g., a non-zero delay period of 0.05 sec, 0.1 sec, 0.2 sec, 0.5 sec, 1 sec, 3 sec, or other time period) (e.g., as described herein with reference to shadow 7018 in FIG. 7D, shadow 7016 in FIG. 7E, and shadow 7036 in FIG. 7G). In some embodiments, the first virtual shadow for the first user interface object is displayed with the first appearance in accordance with a determination that the second threshold amount of time has passed since detecting that the user's attention is directed to the first user interface object. In some embodiments, the first virtual shadow is displayed with the first appearance in accordance with a determination that the second threshold amount of time has passed since one or more other preconditions for displaying the first virtual shadow with the first appearance (e.g., the user's attention remaining directed to the first user interface object for at least the first threshold amount of time) were met.

In some embodiments, in response to detecting that the user's attention has ceased to be directed to the first user interface object, the computer system delays displaying the first virtual shadow for the first user interface object with the second appearance until the second threshold amount of time has passed since detecting that the user's attention has ceased to be directed to the first user interface object (e.g., as described herein with reference to shadow 7018 in FIG. 7E and shadow 7016 in FIG. 7G). In some embodiments, the first virtual shadow for the first user interface object is displayed with the second appearance in accordance with a determination that the second threshold amount of time has passed since detecting that the user's attention has ceased to be directed to the first user interface object (optionally for at least a threshold amount of time). Delaying changing the appearance of a shadow in response to a user directing their attention to or away from a corresponding object until a threshold amount of time has passed causes the computer system to automatically discern user intent more accurately and adds hysteresis that reduces flicker in the user interface, which would increase the likelihood that the user will suffer from motion sickness when using the computer system.

In some embodiments, displaying the first virtual shadow for the first user interface object is performed in accordance with a determination that a viewpoint of the user is within a range of viewpoints relative to the first user interface object. In some embodiments, the computer system detects that the viewpoint of the user has moved beyond the range of viewpoints relative to the first user interface object and, in response to detecting that the viewpoint of the user has moved beyond the range of viewpoints relative to the first user interface object, ceases to display the first virtual shadow for the first user interface object (e.g., while displaying the first user interface object in accordance with the current viewpoint of the user that is outside of the range of viewpoints) (e.g., as described herein with reference to FIG. 7H). Ceasing to display a shadow for a user interface object that is being viewed from outside of a specific range of viewpoints (e.g., outside of a range of viewing angles) in a three-dimensional environment, such from the side or from behind, visually deemphasizes objects that are not being viewed directly, which provides improved visual feedback about the spatial relationship between the user interface object and the three-dimensional environment.

In some embodiments, the computer system displays the first virtual shadow for the first user interface object without displaying a visual effect corresponding to simulated light emanating from content displayed in the first user interface object, and ceasing to display the first virtual shadow for the first user interface object while displaying the visual effect corresponding to simulated light emanating from the content. In some embodiments, the computer system ceases to display the first virtual shadow for the first user interface object in accordance with a determination that the visual effect corresponding to simulated light emanating from the content displayed in the first user interface object is being displayed, or in response to the same input or event that causes the display of the visual effect. For example, as described herein with reference to FIGS. 10B and 10D, shadow 7078 for television 7076 and optionally other computer-generated shadows in the scenario of FIG. 10A cease to be displayed when computer system 101 begins displaying light spill visual effect 7082 or 7088. Displaying visual effects corresponding to simulated light emanating from content displayed in a user interface object is described in more detail herein with reference to method 1400. Ceasing to display a shadow for a user interface object in a three-dimensional environment when starting to display a light spill visual effect that simulates light emanating from content displayed in the user interface object, both of which provide visual feedback about the spatial relationship between the user interface object and the three-dimensional environment, reduces the computational burden of providing some visual feedback when other visual feedback serving a similar purpose is available.

In some embodiments, the computer system displays the visual effect corresponding to simulated light emanating from the content while (and optionally in accordance with a determination that) playback of the content is ongoing, and forgoes displaying the visual effect corresponding to simulated light emanating from the content while (and optionally in accordance with a determination that) playback of the content is not ongoing (e.g., paused or stopped). For example, as described herein with reference to FIGS. 10B and 10D, light spill visual effect 7082 and 7088, respectively, are displayed when content on television 7076 is playing, and not displayed when content on television 7076 is not playing, as described herein with reference to FIG. 10A. Displaying the light spill visual effect that simulates light emanating from content displayed in the user interface object while the content (e.g., video content) is playing, and not displaying the light spill visual effect while the content is not playing, provides improved visual feedback about the spatial relationship between the user interface object that displays the content and the three-dimensional environment while the content has visual prominence and is more likely to have a user's attention, and reduces the computational burden of generating the light spill visual effect at other times.

In some embodiments, the first user interface object is (or includes) a user interface of an application (e.g., executing on the computer system) (e.g., window 7010 (FIG. 7B) or window 7012 (FIG. 7B)). Changing the value of a visual property of the shadow for an application user interface displayed in a three-dimensional environment, based on whether a user's attention is directed to the application user interface, indicates which part of the three-dimensional environment currently has focus for further interaction, which provides improved visual feedback about a state of the computer system.

In some embodiments, the first user interface object is a three-dimensional object in the three-dimensional environment (e.g., speaker 7034 (FIG. 7F), which optionally also represents a software application or user interface thereof). Changing the value of a visual property of the shadow for a three-dimensional user interface object displayed in a three-dimensional environment, based on whether a user's attention is directed to the three-dimensional object, indicates which part of the three-dimensional environment currently has focus for further interaction, which provides improved visual feedback about a state of the computer system.

In some embodiments, displaying the first virtual shadow for the first user interface object with the first appearance includes displaying the first virtual shadow with a first value for a second visual property; and maintaining the pose of the first user interface object relative to the three-dimensional environment includes displaying the first user interface object at a first location in the three-dimensional environment and a first distance from a surface in the three-dimensional environment that corresponds to the first location (e.g., a surface that has a spatial relationship to the first user interface object at the first location, such as below the first user interface object). In some embodiments, the computer system detects an input corresponding to a request to reposition the first user interface object (e.g., optionally while the user's attention is directed to the first user interface object). In some embodiments, the input corresponding to the request to reposition the first user interface object includes an input directed to the first user interface object, such as with a first portion that enables and/or initiates repositioning of the first user interface object (e.g., a press or long press input via a touch-sensitive surface while a cursor or other focus indicator corresponds to the first user interface object, an input activating a control for repositioning the first user interface object (e.g., as described herein with reference to method 1300), or other means of initiating repositioning) and a second portion that includes movement of the input to reposition the first user interface object (e.g., movement of a contact along a touch-sensitive surface, movement of a hand performing an air gesture, movement of a field of view of the computer system while an input continues to be detected, or other input movement).

In some embodiments, in response to detecting the input corresponding to the request to reposition the first user interface object, the computer system: repositions the first user interface object to a second location in the three-dimensional environment that is a second distance from a surface in the three-dimensional environment that corresponds to the second location (e.g., a surface that has a spatial relationship to the first user interface object at the second location, such as below the first user interface object, and which is optionally the same or a different surface as before the repositioning of the first user interface object from the first location); and, in accordance with a determination that the second distance is different from the first distance (and optionally less than a threshold distance, as described herein with reference to method 1300), displays the first virtual shadow for the first user interface object with a second value for the second visual property, wherein the second value is different from the first value. For example, as described herein with reference to FIG. 8J, shadow 7016 for window 7010 is changed in degree of blurring and/or feathering as window 7010 is moved further from the top surface of table 7024 below window 7010. Accordingly, while window 7010 is at the higher position relative to table 7024 shown in FIG. 8J (e.g., whether with an opacity corresponding to a movement input directed to window 7010, an opacity corresponding to user 7002's attention being directed to window 7010, or an opacity corresponding to user 7002 not directing attention to nor interacting with window 7010, provided that window 7010 is within the threshold distance above table 7024 at which shadow 7016 begins to be faded out), shadow 7016 has a different degree of blurring and/or feathering than in FIG. 8F while window 7010 is at a lower position relative to table 7024. In some embodiments, in accordance with a determination that the second distance is the same as the first distance (and optionally less than the threshold distance), the computer system displays the first virtual shadow for the first user interface object with the first value for the second visual property. Changing the values of different visual properties of the shadow for a user interface object, such as by changing one visual property based on whether a user's attention is directed to the user interface object and a different visual property based on a distance between the user interface object and a corresponding surface (e.g., below the user interface object) enables more complex visual feedback to be provided that both indicates which part of the three-dimensional environment currently has focus for further interaction and indicates a spatial relationship between the user interface object and the three-dimensional environment.

In some embodiments, the first visual property is opacity of the first virtual shadow, and the second visual property is size (e.g., length and/or area) and/or degree of blurring of the first virtual shadow (e.g., as described herein with reference to shadow 7016 in FIG. 8J). Changing the opacity of a shadow for a user interface object based on whether a user's attention is directed to the user interface object, and changing the size and/or degree of blurring of the shadow based on a distance between the user interface object and a corresponding surface (e.g., below the user interface object), enables more complex visual feedback to be provided that both indicates which part of the three-dimensional environment currently has focus for further interaction and indicates a spatial relationship between the user interface object and the three-dimensional environment.

In some embodiments, aspects/operations of methods 1200, 1300, and 1400 may be interchanged, substituted, and/or added between these methods. For example, the computer-generated objects and virtual shadows of method 1100 optionally also exhibit the movement-based behavior of method 1200, and/or the virtual shadows of method 1100 are simplified shadows as described in method 1300. For brevity, these details are not repeated here.

FIG. 12 is a flow diagram of an exemplary method 1200 for displaying movement-based shadows for user interface objects in an environment, in accordance with some embodiments. In some embodiments, method 1200 is performed at a computer system (e.g., computer system 101 in FIG. 1) that is in communication with a display generation component (e.g., display generation component 120 in FIGS. 1, 3, and 4) (e.g., a hardware element, comprising one or more display devices, such as a display, a touchscreen, a projector, a heads-up display, a head-mounted display, or the like) and one or more input devices (e.g., one or more cameras (e.g., color sensors, infrared sensors, structured light scanners, and/or other depth-sensing cameras) that point downward at a user's hand, forward from the user's head, and/or that faces the user; eye-tracking devices; user-held and/or user-worn controllers; touch-sensitive surfaces, and/or other input hardware). In some embodiments, the method 1200 is governed by instructions that are stored in a non-transitory (or transitory) computer-readable storage medium and that are executed by one or more processors of a computer system, such as the one or more processors 202 of computer system 101 (e.g., control 110 in FIG. 1A). Some operations in method 1200 are, optionally, combined and/or the order of some operations is, optionally, changed.

While a view of an environment is visible via the display generation component (e.g., the environment being a two-dimensional or three-dimensional environment that includes one or more computer-generated portions and optionally one or more passthrough portions), the computer system displays (1202), in the environment, a first user interface object at a first location in the environment and a virtual shadow (e.g., a computer-generated shadow) corresponding to the first user interface object (e.g., appearing to be cast by the first user interface object onto a portion of the environment), including displaying the virtual shadow with a first value for a first visual property (e.g., shadow intensity or opacity). For example, shadow 7016 for window 7010 is displayed with a first opacity in FIGS. 8A and 8E.

The computer system detects (1204) an input corresponding to a request to reposition the first user interface object from the first location in the environment to a second location in the environment that is different from the first location. In response to detecting the input (1206): the computer system repositions (1208) the first user interface object from the first location in the environment to the second location in the environment (e.g., moving the first user interface object through a plurality of intermediate locations between the first location and the second location) in accordance with movement of the input relative to the environment; and, while repositioning the first user interface object from the first location in the environment to the second location in the environment, the computer system displays (1210) the virtual shadow corresponding to the first user interface object with a second value for the first visual property (e.g., changing the virtual shadow from having the first value for the first visual property to having the second value for the first visual property). For example, shadow 7016 for window 7010 is displayed with a second opacity, different from the first opacity, in FIGS. 8D and 8G while window 7010 is being moved in the three-dimensional environment. In some embodiments, the virtual shadow corresponding to the first user interface object is displayed with the second value for the first visual property while detecting the input (e.g., without regard to whether the first user interface object is repositioned). For example, shadow 7016 for window 7010 is displayed with the second opacity in FIGS. 8C and 8F while the input to reposition window 7010 is being detected yet before window 7010 is moved in the three-dimensional environment.

While displaying a computer-generated shadow for a user interface object in a three-dimensional environment, which provides improved visual feedback about the spatial relationship between the user interface object and the three-dimensional environment, changing the value of a visual property of the shadow based on whether an input to reposition the user interface object is being detected (e.g., whether or not the user interface object is in fact being repositioned) indicates which part of the three-dimensional environment is currently the target of user interaction and the type of interaction that is occurring, which provides improved visual feedback about a state of the computer system.

In some embodiments, in response to detecting the input, the computer system repositions the virtual shadow corresponding to the first user interface object in accordance with the repositioning of the first user interface object from the first location to the second location (e.g., in accordance with movement of the input relative to the environment) (e.g., in FIGS. 8A-8J, as window 7010 is repositioned, shadow 7016 is repositioned accordingly). While repositioning a user interface object in a three-dimensional environment, repositioning the shadow for the user interface object accordingly provides improved visual feedback about the spatial relationship between the user interface object and the three-dimensional environment.

In some embodiments, in response to detecting the input: in accordance with a determination that the input includes a first amount of movement in a first direction relative to the environment, the computer system: repositions the first user interface object (e.g., and the corresponding virtual shadow) by a second amount corresponding to the first amount and in a second direction corresponding to the first direction and, while repositioning the first user interface object by the second amount in the second direction, displays the virtual shadow corresponding to the first user interface object with the second value for the first visual property. For example, as described herein with reference to FIG. 8D, shadow 7016 for window 7010 is displayed with the second opacity in FIGS. 8C-8D while window 7010 and shadow 7016 are moved to the left in the three-dimensional environment in accordance with the magnitude and direction of the movement of the input by hand 7022 in FIGS. 8C-8D. In some embodiments, in response to detecting the input: in accordance with a determination that the input includes a third amount of movement in a third direction relative to the environment, wherein the third amount is different from the first amount and/or the third direction is different from the first direction, the computer system: repositions the first user interface object (e.g., and the corresponding virtual shadow) by a fourth amount corresponding to the third amount and in a fourth direction corresponding to the third direction, wherein the fourth amount is different from the second amount when the third amount is different from the first amount, and the fourth direction is different from the second direction when the third direction is different from the first direction and, while repositioning the first user interface object by the fourth amount in the fourth direction, displays the virtual shadow corresponding to the first user interface object with the second value for the first visual property. For example, as described herein with reference to FIG. 8D, shadow 7016 for window 7010 is displayed with the same second opacity in FIGS. 8F-8G as in FIGS. 8C-8D while window 7010 and shadow 7016 are moved further from viewpoint 7046 of user 7002 in the three-dimensional environment in accordance with the magnitude and direction of the movement of the input by hand 7022 in FIGS. 8F-8G. When repositioning a user interface object and a corresponding shadow in a three-dimensional environment based on a direction and/or magnitude of movement of an input to reposition the user interface object, changing a value of a visual property of the corresponding shadow based on the fact that the repositioning input is being detected without regard to the direction and/or magnitude of movement of the repositioning input provides improved visual feedback about the spatial relationship between the user interface object and the three-dimensional environment, that indicates in a consistent manner which part of the three-dimensional environment is currently the target of user interaction and the type of interaction that is occurring.

In some embodiments, in response to detecting the input, prior to repositioning the first user interface object, the computer system displays the virtual shadow corresponding to the first user interface object with a third value for the first visual property, wherein the third value is different from the first value (e.g., changing the virtual shadow from having the first value for the first visual property to having the third value for the first visual property even before repositioning of the first user interface object). For example, as described herein with reference to FIG. 8C, shadow 7016 for window 7010 is displayed with a different opacity in response to the input, indicated by movement indicator 7030-2, initiating movement of window 7010 (e.g., even though window 7010 in FIG. 8C has not been moved in the three-dimensional environment (e.g., window 7010 in FIG. 8C is still in the same place as in FIG. 8A)). In some embodiments, the third value is the same as the second value. In some embodiments, the third value is different from the second value. Changing the value of the visual property of the shadow based on whether an input to reposition the user interface object is being detected, even before the user interface object is in fact repositioned, indicates which part of the three-dimensional environment is currently the target of user interaction and the type of interaction that is occurring, which provides improved visual feedback about a state of the computer system.

In some embodiments, the computer system ceases to detect the input (e.g., detecting an end of the input); and, in response to ceasing to detect the input, the computer system displays the virtual shadow corresponding to the first user interface object with a fourth value for the first visual property, wherein the fourth value is different from the second value. For example, as described herein with reference to FIG. 8E, in response to detecting an end of the input for repositioning window 7010 (FIGS. 8C-8D), the appearance of shadow 7016 for window 7010 is changed (e.g., restored from the appearance of shadow 7016 in FIGS. 8C-8D to the appearance of shadow 7016 in FIG. 8A). In some embodiments, the fourth value is the same as the first value (e.g., the change from the first value to the second value of the first visual property of the virtual shadow is reversed). In some embodiments, the first value and the fourth value are both greater than the second value or both less than the second value. Where the value of a visual property of a shadow is changed while an input to reposition the user interface object is detected, at least partially reversing the change when the input ends indicates which part of the three-dimensional environment has ceased to be the target of user interaction and optionally the type of interaction that occurred, which provides improved visual feedback about a state of the computer system.

In some embodiments, detecting the input corresponding to the request to reposition the first user interface object includes detecting an air gesture (e.g., such as an air pinch gesture, an air pinch and drag gesture, or other air gesture performed with one or both of the user's hands) (e.g., as described herein with reference to FIGS. 8C-8D). Changing the value of the visual property of the shadow based on whether an air gesture to reposition the user interface object is being detected indicates which part of the three-dimensional environment is currently the target of user interaction and the type of interaction that is occurring, which is particularly helpful for air gestures that are often performed separated in space from their target user interface objects, making it harder to tell which object are being manipulated (e.g., in contrast to touch inputs that directly manipulate user interface objects displayed on a touchscreen), which provides improved visual feedback about a state of the computer system and reduces an amount of time needed to perform the interaction using the computer system.

In some embodiments, prior to displaying the first user interface object and the virtual shadow with the first value for the first visual property: the computer system displays the first user interface object; while a user's attention is not directed to the first user interface object, the computer system displays the virtual shadow corresponding to the first user interface object with a fifth value for the first visual property, wherein the fifth value is different from the first value; and the computer system detects that a user's attention is directed to the first user interface object. In some embodiments, displaying the virtual shadow with the first value for the first visual property is performed in response to detecting that the user's attention is directed to the user interface object. For example, as described herein with reference to FIGS. 8A-8J, shadow 7016 optionally exhibits any combination of the properties and behaviors of the shadows described herein with reference to method 1100, including for example being displayed with the attention-based appearance of FIGS. 8A and 8E. In some embodiments, the fifth value and the second value are both less than the first value or both greater than the second value. In some embodiments, the fifth value is different from the second value. In some embodiments, the fifth value is the same as the second value. Prior to changing the value of a visual property of the shadow based on whether an input to reposition the user interface object is being detected, changing the value of the visual property of the shadow based on whether a user's attention is directed to the user interface object indicates which part of the three-dimensional environment currently has focus for the subsequent repositioning interaction, which provides improved visual feedback about a state of the computer system.

In some embodiments, while repositioning the first user interface object from the first location to the second location in the environment, the computer system maintains an appearance of the virtual shadow corresponding to the first user interface object without regard to whether the user's attention is directed to the first user interface object (e.g., the computer system maintains an appearance of the virtual shadow corresponding to the first user interface object even if the computer system detects that the user's attention has moved to the first user interface object or that the user's attention has moved away from the first user interface object). For example, although shadow 7016 in FIGS. 8A-8J optionally exhibits any combination of the properties and behaviors of the shadows described herein with reference to method 1100, including for example being displayed with the attention-based appearance of FIGS. 8A and 8E, shadow 7016 optionally does not change in appearance based on whether a user's attention is directed to shadow 7016 while an input to move corresponding window 7010 is ongoing, as described herein with reference to FIG. 8D. Changing the value of the visual property of the shadow based on whether a user's attention is directed to the corresponding user interface object except while an input to reposition the user interface object is being detected (e.g., whether or not the user interface object is in fact repositioned) gives priority to indicating which part of the three-dimensional environment is currently the target of user interaction and the type of interaction that is occurring (e.g., over indicating which part of the three-dimensional environment has focus for subsequent interaction), which provides improved visual feedback about a state of the computer system.

In some embodiments, prior to detecting the input, the computer system displays the first user interface object with a first value for a respective visual property of the first user interface object. In some embodiments, while repositioning the first user interface object from the first location in the environment to the second location in the environment, the computer system displays the first user interface object with a second value for the respective visual property of the first user interface object, wherein the second value for the respective visual property is different from the first value for the respective visual property. For example, as described herein with reference to FIGS. 8C and 8F, window 7010 is decreased in opacity during the input to move window 7010, to help user 7002 see how window 7010 appears relative to the three-dimensional environment while moving window 7010. In some embodiments, the visual property of the first user interface object is the same as the first visual property or second visual property of the virtual shadow (e.g., the visual property of the first user interface object is opacity, size, and/or degree of blurring). In some embodiments, after ceasing to detect the input, the first user interface object is displayed with a third value, which is optionally the same as the first value, for the respective visual property of the first user interface object. In conjunction with changing the value of a visual property of a shadow for a user interface object while an input to reposition the user interface object is being detected, changing a value for a visual property for the user interface object itself (e.g., the same or a different visual property as the shadow) further indicates which part of the three-dimensional environment is currently the target of user interaction and the type of interaction that is occurring, as well as making it easier for a user to see (e.g., if the change in the value of the visual property of the user interface object increases the transparency of the user interface object) where the user interface object is being moved in the three-dimensional environment, which provides improved visual feedback about a state of the computer system.

In some embodiments, the virtual shadow corresponding to the first user interface object is displayed on a surface in the environment (e.g., a surface below the first user interface object, as viewed from the viewpoint of the user); repositioning the first user interface object from the first location to the second location in the environment changes a distance between the first user interface object and the surface; and prior to detecting the input, the virtual shadow displayed with the first value for the first visual property is displayed with a first value for a second visual property. In some embodiments, in response to detecting the input, the computer system displays the virtual shadow corresponding to the first user interface object with a second value for the second visual property in accordance with the change in the distance between the first user interface object and the surface (e.g., changing the second visual property of the shadow through a plurality of intermediate values as the first user interface object is moved through a plurality of intermediate locations between the first location and the second location), while continuing to display the virtual shadow with the second value for the first visual property. For example, as described herein with reference to FIG. 8J, shadow 7016 for window 7010 is changed in degree of blurring and/or feathering as window 7010 is moved further from the top surface of table 7024 below window 7010 (e.g., rather than being changed in opacity).

In some embodiments, displaying the virtual shadow with the second value for the second visual property is independent of lighting conditions in the environment (e.g., the change from the first value for the second visual property to the second value for the second visual property is different from a change that would occur based on one or more light sources in the environment, such as a change in size or length of a shadow as the object casting the shadow moves toward or away from a light source). In some embodiments, after (e.g., in response to) ceasing to detect the input, the computer system continues to display the virtual shadow with the second value for the second visual property, in accordance with the object having been repositioned from the first location to the second location (e.g., in contrast to changing the value of the first visual property from the second value to a different value, such as back to the first value, upon the input ceasing to be detected). Changing the values of different visual properties of the shadow corresponding to a user interface object, such as by changing one visual property based on whether an input to reposition the user interface object is being detected and a different visual property based on a distance between the user interface object and a corresponding surface (e.g., below the user interface object) enables more complex visual feedback to be provided that both indicates which part of the three-dimensional environment is currently the target of user interaction and indicates a spatial relationship between the user interface object and the three-dimensional environment.

In some embodiments, the first visual property is opacity of the virtual shadow, and the second visual property is size (e.g., length and/or area) and/or degree of blurring of the virtual shadow (e.g., as described herein with reference to shadow 7016 in FIG. 8J). Changing the opacity of a shadow corresponding to a user interface object based on whether an input to reposition the user interface object is being detected, and changing the size and/or degree of blurring of the shadow based on a distance between the user interface object and a corresponding surface (e.g., below the user interface object), enables more complex visual feedback to be provided that both indicates which part of the three-dimensional environment is currently the target of user interaction and indicates a spatial relationship between the user interface object and the three-dimensional environment.

In some embodiments, displaying the virtual shadow with the first value for the first visual property and displaying the virtual shadow with the second value for the first visual property are performed while the environment has a first set of lighting conditions (e.g., based on real and/or virtual lighting). In some embodiments, while the environment has a second set of lighting conditions that is different from the first set of lighting conditions, the computer system: displays, in the environment, the first user interface object and the virtual shadow corresponding to the first user interface object, including displaying the virtual shadow with the first value for the first visual property; detects a second input corresponding to a request to reposition the first user interface object from the first location in the environment to the second location in the environment; and, in response to detecting the second input: repositions the first user interface object from the first location in the environment to the second location in the environment in accordance with movement of the second input relative to the environment; and, while repositioning the first user interface object from the first location in the environment to the second location in the environment, displays the virtual shadow corresponding to the first user interface object with the second value for the first visual property. For example, as described herein with reference to FIG. 8C, shadow 7016 optionally changes from the first appearance to the second appearance in response to detecting an input initiating movement of window 7010 whether the three-dimensional environment is lit by light source 7038, light source 7040, or both.

More generally, the change in the first visual property, from the first value to the second value, of the virtual shadow corresponding to the first user interface object is the same regardless of whether the environment has a first set of lighting conditions or a second set of lighting conditions, optionally as long as both the first set of lighting conditions and the second set of lighting conditions provide a threshold amount of light in the environment. Where the value of a visual property of a shadow for a user interface object in a three-dimensional environment is changed based on whether an input to reposition the user interface object is being detected, displaying the same change in the visual property of the shadow regardless of what lighting conditions are present in the three-dimensional environment indicates in a consistent manner which part of the three-dimensional environment is currently the target of user interaction and the type of interaction that is occurring, which provides improved visual feedback about a state of the computer system.

In some embodiments, aspects/operations of methods 1100, 1300, and 1400 may be interchanged, substituted, and/or added between these methods. For example, the computer-generated objects and virtual shadows of method 1200 optionally also exhibit the attention-based behavior of method 1100, and/or the virtual shadows of method 1200 are simplified shadows as described in method 1300. For brevity, these details are not repeated here.

FIG. 13 is a flow diagram of an exemplary method 1300 for displaying simplified shadows for user interface objects in an environment, in accordance with some embodiments. In some embodiments, method 1300 is performed at a computer system (e.g., computer system 101 in FIG. 1) that is in communication with a display generation component (e.g., display generation component 120 in FIGS. 1, 3, and 4) (e.g., a hardware element, comprising one or more display devices, such as a display, a touchscreen, a projector, a heads-up display, a head-mounted display, or the like) and one or more input devices (e.g., one or more cameras (e.g., color sensors, infrared sensors, structured light scanners, and/or other depth-sensing cameras) that point downward at a user's hand, forward from the user's head, and/or that faces the user; eye-tracking devices; user-held and/or user-worn controllers; touch-sensitive surfaces; and/or other input hardware). In some embodiments, the method 1300 is governed by instructions that are stored in a non-transitory (or transitory) computer-readable storage medium and that are executed by one or more processors of a computer system, such as the one or more processors 202 of computer system 101 (e.g., control 110 in FIG. 1A). Some operations in method 1300 are, optionally, combined and/or the order of some operations is, optionally, changed.

While a view of an environment is visible via the display generation component (e.g., the environment being a two-dimensional or three-dimensional environment that includes one or more computer-generated portions and optionally one or more passthrough portions), the computer system displays (1302), in the environment, a group of user interface objects (1304) that are separated from one another in the environment (e.g., separated in simulated space), the group including a first user interface object at a first location in the environment and a second user interface object at a second location in the environment in accordance with a respective spatial relationship between the first user interface object and the second user interface object. In some embodiments, the group of user interface objects, though separated in the simulated space, are associated with a same application. In some embodiments, the first user interface object is a main user interface or window of the application, and the second user interface object is an auxiliary user interface or window (e.g., a menu, toolbar, or other peripheral user interface feature) of the application.

In addition, the computer system displays (1302), in the environment, a virtual shadow (1306) corresponding to the group of user interface objects. Displaying the virtual shadow corresponding to the group of user interface objects includes displaying a first virtual shadow portion corresponding to the first user interface object at the first location in the environment (e.g., appearing to be cast by the first user interface object onto a portion of the environment) without displaying a virtual shadow portion corresponding to the second user interface object in the environment. For example, as described herein with reference to FIG. 9A, user interface 7060 is displayed with shadow 7070, and shadow 7070 includes a portion that is a shadow for element E1 of user interface 7060 without including portions that are shadows for other elements of user interface 7060 besides element E1. In some embodiments, the displayed shadow corresponding to the first user interface object simulates a shadow cast by the first user interface object according to a simulated light source (e.g., having a respective spatial relationship to the group of user interface objects), and the computer system forgoes displaying a shadow corresponding to the second user interface object, even though a shadow would otherwise also be cast by the second user interface object according to the same simulated light source.

The computer system detects (1308) a first input corresponding to a request to reposition the group of user interface objects in the environment. In response to detecting the first input (1310): the computer system repositions (1312) the group of user interface objects in the environment, including repositioning the first user interface object from the first location to a third location in the environment and repositioning the second user interface object from the second location to a fourth location in the environment, while maintaining the respective spatial relationship between the first user interface object and the second user interface object (e.g., and maintaining other spatial relationships between other pairs of user interface objects in the group); and the computer system repositions (1314) the virtual shadow corresponding to the group of user interface objects, including displaying the first virtual shadow portion corresponding to the first user interface object at the third location in the environment without displaying a virtual shadow portion corresponding to the second user interface object in the environment. For example, as described herein with reference to FIG. 9B, in response to detecting an input to reposition user interface 7060 of FIG. 9A, user interface 7060 and shadow 7070 are repositioned in the three-dimensional environment, while the constituent elements of user interface 7060 retain the same spatial relationships relative to each other, and repositioned shadow 7070 includes the portion that is a shadow for element E1 of user interface 7060 without including portions that are shadows for other elements of user interface 7060 besides element E1. In some embodiments, the displayed second shadow corresponding to the first user interface object simulates the shadow cast by the first user interface object according to the simulated light source (e.g., having the respective spatial relationship to the group of user interface objects), and the computer system forgoes displaying a shadow corresponding to the second user interface object, even though a shadow would otherwise also be cast by the second user interface object according to the same simulated light source.

Displaying a simplified shadow for a group of user interface objects (e.g., that make up a given user interface) in a three-dimensional environment, by displaying shadows corresponding to some of the user interface objects of the group without displaying shadows corresponding to others reduces the computational load imposed on the computer system while providing improved visual feedback about the spatial relationships between the group of user interface objects and the three-dimensional environment.

In some embodiments, the computer system displays the virtual shadow corresponding to the group of user interface objects at least partially on a computer-generated surface in the three-dimensional environment (e.g., below the group of user interface objects). For example, as described herein with reference to FIGS. 9A and 9B, shadow 7070 for user interface 7060 is displayed at least partially on the top surface of computer-generated table 7024. Displaying a shadow for a group of user interface objects on a computer-generated surface in a three-dimensional environment provides improved visual feedback about the spatial relationship between the group of user interface objects and the three-dimensional environment.

In some embodiments, the computer system displays the virtual shadow corresponding to the group of user interface objects at least partially on a passthrough view of a physical surface in a physical environment that corresponds to the three-dimensional environment (e.g., the physical surface corresponds to a simulated position in the three-dimensional environment that is below the simulated position of the first user interface object). For example, as described herein with reference to FIG. 9A, shadow 7070 for user interface 7060 is displayed at least partially on the top surface of passthrough box 7014'. Displaying, in a three-dimensional environment, a shadow for a group of user interface objects on a passthrough view of a physical surface in a corresponding physical environment provides improved visual feedback about the spatial relationships between the group of user interface objects, the three-dimensional environment, and the corresponding physical environment.

In some embodiments, the first user interface object (for which the first virtual shadow portion is displayed) is a main region of an application user interface (e.g., element E1 of user interface 7060 (FIG. 9A)), and the second user interface object (for which a virtual shadow portion is not displayed) is an auxiliary region to the main region of the application user interface (e.g., element E2, the user interface region containing elements E2 and E3, element E4, element E5, close button 7062, move button 7064, and/or resize button 7066 of user interface 7060 (FIG. 9A)). In some embodiments, the group of user interface objects constitute the application user interface. In some embodiments, the group of user interface objects includes one or more user interface objects other than the first user interface object (e.g., the second user interface object, and optionally include a third, fourth, fifth, or any number of other user interface objects). In some embodiments, one or more user interface objects of the group other than the first user interface object are auxiliary regions to the main region of the application user interface. In some embodiments, virtual shadow portions are not displayed for one or more user interface objects of the group other than the first user interface object. In some embodiments, virtual shadow portions are displayed for one or more user interface objects of the group other than the first user interface object. In some embodiments, the second user interface object includes a plurality of constituent objects, such as the controls and/or content described as follows. When displaying a simplified shadow for a group of user interface objects that make up an application user interface in a three-dimensional environment, displaying a shadow corresponding to a main region of the application user interface without displaying shadows corresponding to one or more auxiliary regions of the application user interface gives visual prominence to the main region of the application user interface and reduces the computational load imposed on the computer system while providing improved visual feedback about the spatial relationship between the main region of the application user interface and the three-dimensional environment.

In some embodiments, the second user interface object includes a first control (e.g., move button 7064 (FIG. 9A)) that is activatable to select and/or reposition the first user interface object. In some embodiments, the computer system detects an input corresponding to activation of the first control and, in response to detecting the input corresponding to the activation of the first control, initiates (e.g., enables a mode for) repositioning of the first user interface object (e.g., in response to movement of the input corresponding to activation of the first control, the movement of the input optionally including movement in x-, y-, and/or z-directions or in polar, azimuthal, and/or radial directions in three-dimensional space) (e.g., activation of move button 7064 (FIG. 9A) enables a mode in which user interface 7060 is configured to be repositioned in response to further input (e.g., movement of a user's hand performing an air gesture, movement of a touch input via a touch-sensitive surface, or other input), as described with reference to window 7010 in FIGS. 8A-8J). In some embodiments, a respective control or respective content described herein, such as the first control, changes in appearance (e.g., in location, size, distance relative to the main region of the application user interface, opacity, degree of blurring, and/or other aspect) in response to a user interacting with the respective control. For example, the respective control moves forward in a z-direction (e.g., closer to a viewpoint of the user) in response to the user directing their gaze to the respective control. In another example, the respective control moves backward in the z-direction (e.g., further from the viewpoint of the user, and optionally to or past the position of the respective control just prior to the user directing their gaze to the respective control) in response to the user activating the respective control (e.g., via an air gesture and/or press input via a touch-sensitive surface). Forgoing displaying a shadow for a control for initiating repositioning of an application user interface (or of a main region of the application user interface), as part of displaying a simplified shadow for the application user interface, reduces the computational load imposed on the computer system while providing improved visual feedback about the spatial relationship between the application user interface and the three-dimensional environment.

In some embodiments, the second user interface object includes a second control (e.g., resize button 7066 (FIG. 9A)) that is activatable to resize the first user interface object. In some embodiments, the computer system detects an input corresponding to activation of the second control and, in response to detecting the input corresponding to the activation of the second control, initiates (e.g., enables a mode for) resizing of the first user interface object (e.g., in response to movement of the input corresponding to activation of the second control) (e.g., activation of resize button 7066 (FIG. 9A) enables a mode in which user interface 7060 is configured to be resized in response to further input (e.g., movement of a user's hand performing an air gesture, movement of a touch input via a touch-sensitive surface, or other input), as described with reference to user interface 7060 in FIG. 9D). In some embodiments, in response to a user interacting with the second control, the second control exhibits analogous behavior to that described herein with reference to the first control. Forgoing displaying a shadow for a control for initiating resizing of an application user interface (or of a main region of the application user interface), as part of displaying a simplified shadow for the application user interface, reduces the computational load imposed on the computer system while providing improved visual feedback about the spatial relationship between the application user interface and the three-dimensional environment.

In some embodiments, the second user interface object includes one or more controls that are activatable to navigate within the application user interface (e.g., forward and/or back buttons, scrollbars, tabs and/or other pagination indicators, or other navigation controls, as represented by elements E2, E3, and/or E4 (FIG. 9A)). In some embodiments, the computer system detects an input corresponding to activation of the one or more controls (e.g., a respective control of the one or more controls) and, in response to detecting the input corresponding to the activation of the one or more controls, performs a navigation operation with respect to content displayed in the first user interface object (e.g., navigating to next content (e.g., using element E3) or previous content (e.g., using element E2), viewing content of a different tab or page (e.g., where elements E2 and E3 represent different tabs or pages), or scrolling the content). In some embodiments, in response to a user interacting with the one or more controls, the one or more controls exhibit analogous behavior to that described herein with reference to the first control. Forgoing displaying a shadow for one or more controls for navigating content of an application user interface (e.g., displayed in a main region of the application user interface), as part of displaying a simplified shadow for the application user interface, reduces the computational load imposed on the computer system while providing improved visual feedback about the spatial relationship between the application user interface and the three-dimensional environment.

In some embodiments, the second user interface object includes a third control (e.g., close button 7062 (FIG. 9A)) that is activatable to dismiss (e.g., close or hide) the application user interface (e.g., including the main region and/or one or more, or all, auxiliary regions of the application user interface). In some embodiments, the computer system detects an input corresponding to activation of the third control and, in response to detecting the input corresponding to the activation of the third control, ceases to display the group of user interface objects (e.g., activation of close button 7062 closes user interface 7060). In some embodiments, in response to a user interacting with the third control, the third control exhibits analogous behavior to that described herein with reference to the first control. In some embodiments, in response to activation of the third control, the computer system ceases to display a window, tab, pop up, or other portion of the application user interface represented by the group of user interface objects without ceasing to display the entire group of user interface objects. Forgoing displaying a shadow for a control for dismissing an application user interface, as part of displaying a simplified shadow for the application user interface, reduces the computational load imposed on the computer system while providing improved visual feedback about the spatial relationship between the application user interface and the three-dimensional environment.

In some embodiments, the second user interface object includes three-dimensional content of the application (e.g., that extends from and is optionally separated from the first user interface object in a z-direction or radial direction relative to a viewpoint of a user) (e.g., element E5 (FIG. 9A)). In some embodiments, in response to a user interacting with the content of the application, the content of the application exhibits analogous behavior to that described herein with reference to the first control. Forgoing displaying a shadow for three-dimensional (e.g., volumetric) content of an application user interface, as part of displaying a simplified shadow for the application user interface, reduces the computational load imposed on the computer system while providing improved visual feedback about the spatial relationship between the application user interface and the three-dimensional environment.

In some embodiments, the repositioning of the group of user interface objects in response to detecting the first input repositions the group of user interface objects within a threshold distance of a reference location (e.g., a viewpoint of the user, a surface on which the virtual shadow corresponding to the group of user interface objects is displayed, or other reference location) in the environment. In some embodiments, the computer system detects a second input corresponding to a request to reposition the group of user interface objects in the environment. In some embodiments, in response to detecting the second input, the computer system repositions the group of user interface objects in the environment, including repositioning the first user interface object from the third location to a fifth location in the environment and repositioning the second user interface object from the fourth location to a sixth location in the environment, while maintaining the respective spatial relationship between the first user interface object and the second user interface object. In some embodiments, in response to detecting the second input, in accordance with a determination that the repositioning of the group of user interface objects in response to detecting the second input repositions the group of user interface objects within the threshold distance of the reference location, the computer system repositions the virtual shadow corresponding to the group of user interface objects, including displaying the first virtual shadow portion corresponding to the first user interface object at the fifth location in the environment without displaying a virtual shadow portion corresponding to the second user interface object in the environment. In some embodiments, in response to detecting the second input, in accordance with a determination that the repositioning of the group of user interface objects in response to detecting the second input repositions the group of user interface objects to beyond the threshold distance of the reference location, the computer system forgoes displaying the virtual shadow corresponding to the group of user interface objects (e.g., including forgoing displaying the first virtual shadow portion corresponding to the first user interface object at the fifth location in the environment while continuing to not display a virtual shadow portion corresponding to the second user interface object). For example, shadow 7070 for user interface 7060 (FIGS. 9A-9E) optionally exhibits at least some of the behavior of shadow 7016 for window 7010 described with reference to FIGS. 8A-8J. Accordingly, as described herein with reference to shadow 7016 in FIGS. 8F-8J, shadow 7070 of FIGS. 9A-9E optionally ceases to be displayed as user interface 7060 is moved beyond a threshold distance from a reference location such as the top surface of table 7024 or the viewpoint of user 7002. Ceasing to display a shadow for a user interface object (e.g., a group of user interface objects) in a three-dimensional environment if the user interface object is moved more than a threshold distance from a reference location in the three-dimensional environment provides improved visual feedback about the spatial relationship between the user interface object and the reference location in the three-dimensional environment.

In some embodiments, the reference location is a viewpoint of the user (e.g., as described herein with reference to shadow 7016 in FIGS. 8F-8I, shadow 7016 optionally ceases to be displayed as window 7010 is moved beyond a threshold distance $D_{th2}$ from viewpoint 7046 of user 7002; analogously, shadow 7070 of FIGS. 9A-9E optionally ceases to be displayed as user interface 7060 is moved beyond a threshold distance from the viewpoint of user 7002 in FIGS. 9A-9E). In some embodiments, the virtual shadow corresponding to the group of user interface objects ceases to be displayed when the group of user interface objects is more than a threshold distance of 0.5, 1, 2, 3, 4, 5, 10 meters, or other threshold distance from the viewpoint of the user. Ceasing to display a shadow for a user interface object (e.g., a group of user interface objects) in a three-dimensional environment if the user interface object is moved more than a threshold distance from a viewpoint of the user provides improved visual feedback about the spatial relationship between the user interface object and the viewpoint of the user.

In some embodiments, the reference location is (e.g., a respective point on) a surface in the three-dimensional environment (e.g., a surface on which the virtual shadow corresponding to the group of user interface objects is displayed) (e.g., as described herein with reference to shadow 7016 in FIG. 8J, shadow 7016 optionally ceases to be displayed as window 7010 is moved beyond a threshold height (e.g., the second threshold height) above the top surface of table 7024; analogously, shadow 7070 of FIGS. 9A-9E optionally ceases to be displayed as user interface 7060 is moved beyond a threshold height above the top surface of table 7024 in FIGS. 9A-9E). In some embodiments, the virtual shadow corresponding to the group of user interface objects ceases to be displayed when the group of user interface objects is more than a threshold distance of 0.5, 1, 2, 2.5, 3, 5 meters, or other threshold distance from the reference surface. Ceasing to display a shadow for a user interface object (e.g., a group of user interface objects) in a three-dimensional environment if the user interface object is moved more than a threshold distance from a surface corresponding to the user interface object, particularly a surface on which the shadow was displayed (e.g., below the user interface object) provides improved visual feedback about the spatial relationship between the user interface object, the corresponding surface, and the three-dimensional environment.

In some embodiments, in response to detecting the second input, as the group of user interface objects is repositioned toward the threshold distance from the reference location (e.g., while remaining within the threshold distance of the reference location), the computer system displays the virtual shadow corresponding to the group of user interface objects progressing through a plurality of intermediate states with increasing visual deemphasis of the virtual shadow (e.g., prior to ceasing to display the virtual shadow altogether when the group of user interface objects is moved to or beyond the threshold distance from the reference location). For example, as described herein with reference to shadow 7016 in FIGS. 8F-8I, shadow 7016 is optionally faded out as window 7010 is moved and approaches a threshold distance $D_{th2}$ from viewpoint 7046 of user 7002 (e.g., where the fading of shadow 7016 is gradual and begins when window 7010 reaches a closer threshold distance $D_{th1}$ from viewpoint 7046 of user 7002). In another example, as described herein with reference to shadow 7016 in FIG. 8J, shadow 7016 is optionally faded out as window 7010 is moved and approaches the threshold height (e.g., the second threshold height) above the top surface of table 7024 at which shadow 7016 ceases to be displayed (e.g., where the fading of shadow 7016 is gradual and begins when window 7010 reaches a closer first threshold height above table 7024). Analogously, shadow 7070 of FIGS. 9A-9E is optionally faded out gradually as user interface 7060 is moved and approaches a threshold distance from the viewpoint of user 7002 and/or a threshold height above the top surface of table 7024 in FIGS. 9A-9E. In some embodiments, the virtual shadow is progressively visually deemphasized by progressing a respective visual property of the virtual shadow through a plurality of intermediate values (e.g., from a non-zero opacity to 0% opacity). In ceasing to display a shadow for a user interface object (e.g., a group of user interface objects) in a three-dimensional environment if the user interface object is moved more than a threshold distance from a reference location in the three-dimensional environment, ceasing to display the shadow gradually provides improved visual feedback about the spatial relationship between the user interface object and the reference location in the three-dimensional environment while reducing the likelihood that the user will suffer from motion sickness when using the computer system by not changing the user interface too abruptly.

In some embodiments, displaying the virtual shadow corresponding to the group of user interface objects, including displaying the first virtual shadow portion corresponding to the first user interface object without displaying a virtual shadow portion corresponding to the second user interface object, is performed while the environment has a first set of lighting conditions (e.g., based on real and/or virtual lighting). In some embodiments, as the environment changes from having the first set of lighting conditions to having a second set of lighting conditions (e.g., based on real and/or virtual lighting) that is different from the first set of lighting conditions (e.g., and in the absence of changes to the group of user interface objects), the computer system continues to display the virtual shadow corresponding to the group of user interface objects, including displaying the first virtual shadow portion corresponding to the first user interface object without displaying a virtual shadow portion corresponding to the second user interface object. For example, as described herein with reference to FIGS. 9A-9B, shadow 7070 optionally maintains the same appearance even if the three-dimensional environment were to transition from being lit by one combination of light sources 7038 and 7040 to being lit by a different combination of light sources 7038 and 7040. In displaying a simplified shadow for a group of user interface objects (e.g., that make up a given user interface) in a three-dimensional environment, displaying the same shadow for the group of user interface objects regardless of what lighting conditions are present in the three-dimensional environment reduces the computational load imposed on the computer system while providing consistent improved visual feedback about the spatial relationships between the group of user interface objects and the three-dimensional environment.

In some embodiments, while the environment has the first set of lighting conditions (e.g., based on real and/or virtual lighting), the computer system: displays a third (e.g., computer-generated) user interface object that is independent of the group of user interface objects; and displays the third user interface object with a first visual effect (e.g., specular reflection and/or shadow) in accordance with the first set of lighting conditions. In some embodiments, as the environment changes from having the first set of lighting conditions to having the second set of lighting conditions (e.g., based on real and/or virtual lighting), the computer system: continues to display the third user interface object; and displays the third user interface object with a second visual effect (e.g., specular reflection and/or shadow) in accordance with the second set of lighting conditions, wherein the second visual effect is different from the first visual effect. For example, as described herein with reference to FIGS. 8A-8J, different specular reflections are displayed based on different lighting conditions in the three-dimensional environment. Changing the appearance of some aspects of a three-dimensional environment based on what lighting conditions are present in the three-dimensional environment while not changing the appearance of other aspects, such as displayed shadows, regardless of what lighting conditions are present in the three-dimensional environment provides improved visual feedback about the spatial relationships between user interface objects, the three-dimensional environment, and real and/or simulated sources of light in the three-dimensional environment while reducing the computational load imposed on the computer system.

In some embodiments, while displaying the first user interface object with a first size and displaying the first virtual shadow portion corresponding to the first user interface object with a second size that corresponds to the first size, the computer system detects an input corresponding to a request to resize the first user interface object of the group of user interface objects. In some embodiments, the input corresponds to a request to collectively resize the group of user interface objects, including resizing the first user interface object and optionally resizing and/or repositioning one or more other user interface objects of the group. In some embodiments, in response to detecting the input corresponding to the request to resize the first user interface object, the computer system: displays the first user interface object with a third size that is different from the first size; and displays the first virtual shadow portion with a fourth size that corresponds to the third size and that is different from the second size (e.g., changing a length, such as in an x- or y-direction or azimuthal direction relative to a viewpoint of the user, of the first virtual shadow portion). For example, as described herein with referenced to FIG. 9D, resizing element E1 changes the width of shadow 7070 for user interface 7060 by a corresponding amount. Changing the size (e.g., width in an x- or y-direction, or polar or azimuthal direction) of a shadow for a group of user interface objects in a three-dimensional environment in accordance with changes in the size (e.g., width in the x-, y-, polar, or azimuthal direction) of the group of user interface objects provides improved visual feedback about the spatial relationship between the group of user interface objects and the three-dimensional environment.

In some embodiments, while the first user interface object is at the first location in the environment and the second user interface object is at the second location in the environment: the group of user interface objects has a first angle relative to a vertical direction in the environment (e.g., a zero angle, in that the group of user interface objects is oriented vertically, or a first non-zero angle, in that the group of user interface objects is tilted relative to the vertical direction); and the virtual shadow corresponding to the group of user interface objects has a first thickness (e.g., width, in a z-direction or radial direction relative to a viewpoint of the user). In some embodiments, while the first user interface object is at the third location in the environment and the second user interface object is at the fourth location in the environment: the group of user interface objects has a second angle relative to the vertical direction in the environment (e.g., a non-zero angle, in that the group of user interface objects is tilted relative to the vertical direction, which is optionally a second non-zero angle that is different from the first non-zero angle); and the virtual shadow corresponding to the group of user interface objects has a second thickness (e.g., width) that is different from the first thickness. For example, while user interface 7060 is oriented vertically as in FIG. 9C, shadow 7070 for user interface 7060 has a first thickness as shown in side view 7056 (FIG. 9E), whereas, while user interface 7060 is tilted as in FIG.

9E, shadow 7070 for user interface 7060 has a second, greater thickness as shown in side view 7058. In some embodiments, a change in angle of the group of user interface objects (e.g., relative to the vertical direction) causes a change in one visual property, thickness, of the virtual shadow corresponding to the group of user interface objects without causing a change in one or more other visual properties, such as degree of blurring, length (e.g., in an x- or y-direction or azimuthal direction relative to a viewpoint of the user), and/or opacity, of the virtual shadow. Changing the size (e.g., depth in a z- or radial direction) of a shadow for a group of user interface objects in a three-dimensional environment in accordance with changes in the orientation (e.g., amount of tilt relative to a vertical direction) of the group of user interface objects provides improved visual feedback about the spatial relationship between the group of user interface objects and the three-dimensional environment.

In some embodiments, while a group of physical objects that corresponds to the group of user interface objects (e.g., has elements that are the same size and shape as the elements of the group of user interface objects for which a virtual shadow is displayed) has the first angle relative to a vertical direction in a physical environment with a respective set of lighting conditions, the group of physical objects casts a physical shadow that has the first thickness. In some embodiments, while the group of physical objects has the second angle relative to the vertical direction in the physical environment with the respective set of lighting conditions, the group of physical objects casts a physical shadow that has a third thickness; and the second thickness of the virtual shadow (for the group of user interface objects at the second angle relative to vertical in the environment visible via the display generation component) is less than the third thickness of the physical shadow (for the group of physical objects at the same second angle relative to vertical in the physical environment). For example, as described herein with reference to FIG. 9E, although the tilting of user interface 7060 (e.g., in the transition from FIG. 9C to FIG. 9E) changes the top-down thickness of user interface 7060 by a certain amount, as seen in the transition from side view 7056 to side view 7058, the thickness of shadow 7070 changes by a lesser amount. Changing the size (e.g., depth in a z- or radial direction) of a shadow for a group of user interface objects in a three-dimensional environment in accordance with changes in the orientation (e.g., amount of tilt relative to a vertical direction) of the group of user interface objects less than would be expected for an analogous physical shadow corresponding to a set of physical objects balances providing improved visual feedback about the spatial relationship between the group of user interface objects and the three-dimensional environment with reducing the likelihood that the user will suffer from motion sickness when using the computer system by not cluttering the user interface with extensive changes.

In some embodiments, the virtual shadow corresponding to the group of user interface objects is displayed on a surface in the environment (e.g., a surface below the group of user interface objects, as viewed from the viewpoint of the user); and the first input corresponding to the request to reposition the group of user interface objects in the environment is detected while the group of user interface objects is a first distance from the surface and while the virtual shadow corresponding to the group of user interface objects is displayed with a first value for a first visual property (e.g., a first size and/or a first blur radius) in accordance with the first distance. In some embodiments, in response to detecting the first input corresponding to the request to reposition the group of user interface objects in the environment, the computer system: repositions the group of user interface objects in the environment to a second distance from the surface; and while the group of user interface objects is the second distance from the surface, displays the virtual shadow corresponding to the group of user interface objects with a second value for the first visual property (e.g., a second size and/or a second blur radius) in accordance with the second distance, wherein the second value is different from the first value.

For example, as the group of user interface objects is lifted away from a surface below the group of user interface objects, the shadow corresponding to the group of user interface objects is increasingly blurred and/or feathered, whereas, as the group of user interface objects is lowered toward the surface below the group of user interface objects, the shadow corresponding to the group of user interface objects is increasingly sharpened. In some embodiments, the shadow for a group of user interface objects exhibits the behavior of shadows described herein with reference to other methods described herein, such as methods 1100 and 1200. Accordingly, shadow 7070 for user interface 7060 (FIGS. 9A-9E) optionally exhibits at least some of the behavior of shadow 7016 for window 7010 described with reference to FIG. 8J, in that shadow 7070 optionally changes in degree of blurring and/or feathering as user interface 7060 is moved relative to the top surface of table 7024 below user interface 7060 (e.g., becoming increasingly blurred and/or feathered as user interface 7060 is moved further above table 7024 or becoming increasingly sharpened as user interface 7060 is lowered closer to table 7024). Changing the value of a visual property of the shadow corresponding to a group of user interface objects displayed in a three-dimensional environment, based on a distance between the group of user interface objects and a corresponding surface (e.g., below the group of user interface objects), provides improved visual feedback about the spatial relationship between the group of user interface objects and the three-dimensional environment.

In some embodiments, aspects/operations of methods 1100, 1200, and 1400 may be interchanged, substituted, and/or added between these methods. For example, the user interface comprising a plurality of separate elements and the corresponding simplified shadow for the user interface, as described in method 1100, optionally exhibit the attention-based behavior of method 1100 and/or the movement-based behavior of method 1200. For brevity, these details are not repeated here.

FIG. 14 is a flow diagram of an exemplary method 1400 for simulating light emanating from user interface objects displayed in an environment, in accordance with some embodiments. In some embodiments, method 1400 is performed at a computer system (e.g., computer system 101 in FIG. 1) that is in communication with a display generation component (e.g., display generation component 120 in FIGS. 1, 3, and 4) (e.g., a hardware element, comprising one or more display devices, such as a display, a touchscreen, a projector, a heads-up display, a head-mounted display, or the like) and one or more input devices (e.g., one or more cameras (e.g., color sensors, infrared sensors, structured light scanners, and/or other depth-sensing cameras) that point downward at a user's hand, forward from the user's head, and/or that faces the user; eye-tracking devices; user-held and/or user-worn controllers; touch-sensitive surfaces, and/or other input hardware). In some embodiments, the method 1400 is governed by instructions that are stored in a non-transitory (or transitory) computer-readable storage medium and that are executed by one or more processors of a computer system, such as the one or more processors 202 of computer system 101 (e.g., control 110 in FIG. 1A). Some operations in method 1400 are, optionally, combined and/or the order of some operations is, optionally, changed.

While a view of an environment is visible via the display generation component (e.g., the environment being a two-dimensional or three-dimensional environment that includes one or more computer-generated portions and optionally one or more passthrough portions), the computer system detects (1402) an input corresponding to a request to display content in the environment (e.g., an input directed to play button 7080 to play content on television 7076, as described herein with reference to FIG. 10A).

In response to detecting the input (1404), the computer system displays (1406) the content in a user interface object in the environment (e.g., playing content that includes scenes A and B on television 7076, as described herein with reference to FIGS. 10B-10C and 10D-10E). In some embodiments, the user interface object is displayed in response to detecting the input. In some embodiments, the user interface object was displayed prior to detecting the input, optionally with different content, and the requested content is displayed in the user interface object in response to detecting the input. In some embodiments, the user interface object is a view or container for the content.

In response to detecting the input (1404), the computer system displays (1408), in one or more portions of the environment outside of the user interface object, a visual effect corresponding to simulated light emanating from the content (e.g., concurrently with displaying the content in the user interface object). Displaying the visual effect includes: in accordance with a determination that the environment is a first type of environment (e.g., an augmented or mixed reality environment that includes one or more passthrough portions and one or more computer-generated portions), displaying (1410) the visual effect with a first degree of fidelity to the content (e.g., a first degree of fidelity to simulated light emanating from the content into the three-dimensional environment and/or onto objects in the three-dimensional environment) (e.g., by representing colors of the content with a first level of detail, extending to a first portion of the environment outside of the user interface object, and/or having a first amount of effect on the environment outside of the user interface object) (e.g., light spill 7082 with a first degree of fidelity to the content playing on television 7076, as described herein with reference to FIGS. 10B-10C); and, in accordance with a determination that the environment is a second type of environment that is different from the first type of environment (e.g., a virtual reality environment that includes one or more computer-generated portions without one or more passthrough portions), displaying (1412) the visual effect with a second degree of fidelity to the content (e.g., a second degree of fidelity to simulated light emanating from the content into the three-dimensional environment and/or onto objects in the three-dimensional environment) (e.g., light spill 7088 with a second degree of fidelity to the content playing on television 7076, as described herein with reference to FIGS. 10D-10E). The second degree of fidelity is different from the first degree of fidelity (e.g., fidelity to the simulation of light emanating from the content, for example by representing colors of the content with a second level of detail, extending to a second portion of the environment outside of the user interface object, and/or having a second amount of effect on the environment outside of the user interface object) (e.g., as described herein with reference to the differences between FIGS. 10B-10C and FIGS. 10D-10E).

In some embodiments, the visual effect has a lower degree of fidelity to the content (or to the simulated light emanated) when the environment is less immersive (e.g., an augmented or mixed reality environment), and a higher degree of fidelity to the content when the environment is more immersive (e.g., a virtual reality environment). For example, when the environment is less immersive, the visual content optionally represents fewer samples of the content (e.g., less frequent samples and/or fewer regions or subdivisions of the content sampled), represents fewer colors or a more blended or averaged color of the content, extends to less of the surrounding environment such as by tinting the space without casting light on nearby objects, and/or affects the surrounding environment less such as with a lower visual intensity (e.g., lower opacity and/or dimmer). In contrast, when the environment is more immersive, the visual content optionally represents more samples of the content (e.g., more frequent samples and/or more regions or subdivisions of the content sampled), represents more colors or a less blended or averaged color of the content, extends to more of the surrounding environment such as by tinting the space as well as casting light on and/or bouncing light off of nearby real and/or virtual objects, and/or affects the surrounding environment more such as with a greater visual intensity (e.g., higher opacity and/or brighter).

Displaying a light spill visual effect that simulates light emanating from content displayed in a three-dimensional environment with different degrees of fidelity to the content for different types of environments provides improved visual feedback about the spatial relationship between the content and the three-dimensional environment while enabling different levels of computational burden in generating the light spill visual effect to be incurred when the computer system has different amounts of information about the geometry of the three-dimensional environment.

In some embodiments, the first type of environment includes one or more passthrough portions and one or more computer-generated portions; the second type of environment includes one or more computer-generated portions without including one or more passthrough portions (or, in some embodiments, the second type of environment includes fewer passthrough portions than the first type of environment) (e.g., the second type of environment is more immersive than the first type of environment); and the first degree of fidelity is less than the second degree of fidelity. For example, as described herein, light spill visual effect 7082 in the mixed reality three-dimensional environment of FIGS. 10B-10C with at least some passthrough portions has a lower degree of fidelity to the content playing on television 7076 than light spill visual effect 7088 in the virtual three-dimensional environment of FIGS. 10D-10E without any passthrough portions. In some embodiments, the first degree of fidelity is less than the second degree of fidelity when the first type of environment is less immersive (e.g., includes more passthrough portions and/or fewer computer-generated portions) than the second type of environment, whereas the first degree of fidelity is greater than the second degree of fidelity when the first type of environment is more immersive (e.g., includes fewer or no passthrough portions and/or more computer-generated portions) than the second type of environment. Displaying a light spill visual effect that simulates light emanating from content displayed in a three-dimensional environment with lower fidelity to the content in mixed reality environments (with some passthrough portions) than in virtual environments (without passthrough)

provides improved visual feedback about the spatial relationship between the content and the three-dimensional environment while reducing the computational burden of generating the light spill visual effect in circumstances in which the computer system has less information about the geometry of the three-dimensional environment. (e.g., unlike for a virtual environment, the computer system initially lacks information about the geometries of the passthrough portions of a mixed reality environment, and would incur additional computation burden to obtain such information).

In some embodiments, displaying the visual effect with the first degree of fidelity to the content includes displaying light extending from one or more edges of the content into the one or more portions of the environment outside of the user interface object (e.g., into space in the environment adjacent to and/or surrounding the user interface object) independently of (e.g., real and/or virtual) objects in the one or more portions of the environment (e.g., without being cast onto one or more objects, real and/or virtual, in the environment) (e.g., as described herein with reference to light spill visual effect 7082 involving displaying light extending beyond the edges of the content playing on television 7076 into the three-dimensional environment of FIGS. 10B-10C). In some embodiments, displaying the visual effect with the second degree of fidelity to the content includes displaying light cast by the content onto one or more computer-generated objects in the one or more portions of the environment outside of the user interface object (e.g., as described herein with reference to light spill visual effect 7088 involving displaying light cast by the content playing on television 7076 into the three-dimensional environment of FIGS. 10D-10E). Displaying a light spill visual effect that simulates light emanating from content displayed in a three-dimensional environment with different degrees of fidelity to the content for different types of environments, such as with a glow emanating from the content for one degree of fidelity in one type of environment or with light cast onto other objects in the environment for another degree of fidelity in another type of environment, provides improved visual feedback about the spatial relationship between the content and the three-dimensional environment while enabling different levels of computational burden in generating the light spill visual effect to be incurred when the computer system has different amounts of information about the geometry of the three-dimensional environment.

In some embodiments, displaying the light extending from the one or more edges of the content into the one or more portions of the environment based on a set of representative visual properties (e.g., color, luminance, pattern, image, and/or other visual property) sampled from a first number of portions of (e.g., the one or more edges of) the content (e.g., as described herein with reference to FIGS. 10B-10C). In some embodiments, 12, 18, 32, 45, or any other first number of samples are used. In some embodiments, the samples are taken from locations or portions of the content that are spatially distributed around the content (e.g., from edge portions as well as interior portions of the content). Displaying a light spill visual effect of a glow emanating from the content using a number of colors sampled from the content provides improved visual feedback about the spatial relationship between the content and the three-dimensional environment while reducing the computational burden of generating the light spill visual effect.

In some embodiments, the content corresponds to (e.g., is displayed in) a respective plane in the environment (e.g., a plane that includes the user interface object or at least a surface of the user interface object, such as a front surface facing the user), and the light extending from the one or more edges of the content corresponds to the respective plane (e.g., is displayed in the same plane as the content) (e.g., as described herein with reference to FIGS. 10B-10C). Displaying a light spill visual effect of a glow emanating from the content within the same plane as the content provides improved visual feedback about the spatial relationship between the content and the three-dimensional environment while reducing the computational burden of generating the light spill visual effect.

In some embodiments, displaying the visual effect with the first degree of fidelity to the content includes applying a color tint that is based on the content to one or more passthrough portions of the environment (e.g., as described herein with reference to FIGS. 10B-10C). Displaying a light spill visual effect that applies a simple color tint to one or more passthrough portions in a three-dimensional environment provides improved visual feedback about the spatial relationship between the content and the three-dimensional environment while reducing the computational burden of generating the light spill visual effect in circumstances in which the computer system has less information about the geometry of the three-dimensional environment, such as when some portions of the three-dimensional environment are passthrough portions.

In some embodiments, the computer system applies the color tint using a set of representative colors sampled from a second number of portions of the content (e.g., as described herein with reference to FIGS. 10B-10C). In some embodiments, 1, 2, 3, 8, or any other second number of samples are used. In some embodiments, where one color is used, the color is a median color of the content (e.g., a median value of a plurality of color values of the content). Applying the color tint aspect of the light spill visual effect using a limited number of colors sampled from the content provides improved visual feedback about the spatial relationship between the content and the three-dimensional environment while reducing the computational burden of generating the light spill visual effect.

In some embodiments, the computer system applies the color tint using a median color of the content (e.g., of a plurality of colors displayed in the content) (e.g., as described herein with reference to FIG. 10B and applicable by extension to FIG. 10C). Applying the color tint aspect of the light spill visual effect using a median color of the content provides improved visual feedback about the spatial relationship between the content and the three-dimensional environment while reducing the computational burden of generating the light spill visual effect.

In some embodiments, displaying the visual effect with the second degree of fidelity to the content includes displaying light cast into the one or more portions of the environment outside of the user interface object based on a three-dimensional model (e.g., mesh) of the environment (e.g., as described herein with reference to light spill 7088 of FIGS. 10D-10E). Displaying a light spill visual effect of light from content being cast onto other objects in a three-dimensional environment provides (even better) improved visual feedback about the spatial relationship between the content and the three-dimensional environment in circumstances in which the computer system has more information about, such as a three-dimensional model of, the geometry of the three-dimensional environment and would not incur significant additional computational burden in generating such a light spill visual effect.

In some embodiments, displaying the light cast into the one or more portions of the environment simulates one or more computer-generated objects reflecting the simulated light emanating from the content (e.g., as described herein with reference to FIGS. 10D-10E). Displaying a light spill visual effect of light from content being not only cast onto other objects in a three-dimensional environment but also reflected by the other objects provides (even better) improved visual feedback about the spatial relationship between the content and the three-dimensional environment in circumstances in which the computer system has more information about the geometry of the three-dimensional environment and would not incur significant additional computational burden in generating such a light spill visual effect.

In some embodiments, displaying the visual effect with the first degree of fidelity to the content is based on a set of representative visual properties (e.g., color, luminance, pattern, image, and/or other visual property) sampled from a third number of portions of the content; displaying the visual effect with the second degree of fidelity to the content, including displaying the light cast into the one or more portions of the environment outside of the user interface object based on the three-dimensional model, is based on a set of representative visual properties sampled from a fourth number of portions of the content; and the fourth number is greater than the third number. For example, as described herein with reference to FIGS. 10D-10E, the number of samples of the content that is used to generate light spill 7088, which has a higher second degree of fidelity to the content, is greater than the number of samples of the content that is used to generate light spill 7082, which has a lower first degree of fidelity to the content, as described herein with reference to FIGS. 10B-10C). Displaying a light spill visual effect, such as of light from content being cast onto other objects in a three-dimensional environment, using an increased number of samples from the content (e.g., than is used for a different light spill visual effect), causes the computer system to automatically increase the degree of fidelity of the light spill visual effect in providing visual feedback about the spatial relationship between the content and the three-dimensional environment.

In some embodiments, while displaying, in the one or more portions of the environment outside of the user interface object, the visual effect corresponding to simulated light emanating from the content, the computer system visually deemphasizes (e.g., by dimming, darkening, fading, and/or otherwise visually deemphasizing) a background of the environment (e.g., as described herein with reference to the darkened three-dimensional environments of FIGS. 10B-10C and 10D-10E). While displaying a light spill visual effect from content displayed in a three-dimensional environment, dimming other portions of the three-dimensional environment such as the background of the three-dimensional environment (whether passthrough or computer-generated) causes the computer system to automatically give visual prominence to the content being displayed, which reduces an amount of time needed for a user to view the content.

In some embodiments, while displaying, in the one or more portions of the environment outside of the user interface object, the visual effect corresponding to simulated light emanating from the content, the computer system visually deemphasizes (e.g., by dimming, darkening, fading, and/or otherwise visually deemphasizing) one or more passthrough portions of the environment (e.g., in FIGS. 10B-10C, in accordance with the darkened three-dimensional environment, passthrough box 7014' appears darker than in FIG. 10A). While displaying a light spill visual effect from content displayed in a three-dimensional environment, dimming other portions of the three-dimensional environment such as one or more passthrough portions of the three-dimensional environment causes the computer system to automatically give visual prominence to the content being displayed, which reduces an amount of time needed for a user to view the content.

In some embodiments, while displaying, in the one or more portions of the environment outside of the user interface object, the visual effect corresponding to simulated light emanating from the content, the computer system visually deemphasizes (e.g., by dimming, darkening, fading, and/or otherwise visually deemphasizing) one or more computer-generated portions of the environment other than the user interface object (e.g., in FIGS. 10B-10C, in accordance with the darkened three-dimensional environment, computer-generated objects such as table 7024 and speaker 7034 appear darker than in FIG. 10A). While displaying a light spill visual effect from content displayed in a three-dimensional environment, dimming other portions of the three-dimensional environment such as other computer-generated portions of the three-dimensional environment causes the computer system to automatically give visual prominence to the content being displayed, which reduces an amount of time needed for a user to view the content.

In some embodiments, displaying the content in the user interface object in the environment includes playing video content (e.g., the input corresponds to a request for content playback), and displaying the visual effect includes: while playing a first portion of the video content, displaying the visual effect with a first set of values for one or more visual properties (e.g., color, luminance, pattern, image, and/or other visual property) based on the first portion of the video content (e.g., displaying visual effect 7082-1 (FIG. 10B) or visual effect 7088-1 (FIG. 10D) with appearances based on the visual properties of scene A); and, while playing a second portion of the video content that is different from the first portion, displaying the visual effect with a second set of values for the one or visual properties based on the second portion of the video content, wherein the second set of values is different from the first set of values (e.g., displaying visual effect 7082-2 (FIG. 10C) or visual effect 7088-2 (FIG. 10E) with appearances based on the visual properties of scene B, where visual effect 7082-2 (FIG. 10C) has a different appearance from visual effect 7082-1 (FIG. 10B), and visual effect 7088-2 (FIG. 10E) has a different appearance from visual effect 7088-1 (FIG. 10D), based on the visual properties of scene B being different from the visual properties of scene A). For example, if the first portion of the video content is a first scene with brightly lit blue elements, such as the sky and a body of water during daytime, the visual effect is brighter, in the blue color spectrum, and/or is animated to mimic water flowing. If the second portion of the video content is a second scene with dimly lit red elements, such as a dark building interior with intermittently flickering lights, the visual effect is dimmer, in the red color spectrum, and/or flickers in sync with the lighting in the scene. Displaying a light spill visual effect that simulates light emanating from a video being played in a three-dimensional environment and that changes over time as the video content changes provides improved visual feedback about the spatial relationship between the content and the three-dimensional environment that is contemporaneously representative of the content.

In some embodiments, displaying the content in the user interface object in the environment includes playing video content (e.g., the input corresponds to a request for content playback). In some embodiments, the computer system detects an input corresponding to a request to cease (e.g., pause or stop) playing the video content; and, in response to detecting the input corresponding to the request to cease playing the video content, the computer system: ceases to play the video content; and ceases to display, in one or more portions of the environment outside of the user interface object, the visual effect corresponding to simulated light emanating from the content (and, optionally, ceasing to display the content in the user interface object in the environment). For example, following the scenario illustrated in FIG. 10C, if playback of the content on television 7076 were stopped or paused, light spill visual effect 7082 would cease to be displayed. In another example, following the scenario illustrated in FIG. 10E, if playback of the content on television 7076 were stopped or paused, light spill visual effect 7088 would cease to be displayed. Optionally, the light spill visual effect ceases to be displayed without changing other aspects of the three-dimensional environment, such as without increasing the amount of real and/or simulated light in the environment and/or without redisplaying shadows (e.g., shadow 7078 (FIG. 10A)) that had ceased to be displayed during content playback. In some embodiments, while not playing video content (e.g., prior to detecting an input corresponding to a request to play the video content and/or after detecting an input corresponding to a request to stop playing the video content), the computer system does not display the visual effect corresponding to simulated light emanating from the content (e.g., a light spill visual effect is not displayed in FIG. 10A while content is not playing). Displaying a light spill visual effect that simulates light emanating from content displayed in a three-dimensional environment while the content (e.g., video content) is playing, and not displaying the light spill visual effect while the content is not playing, provides improved visual feedback about the spatial relationship between the content and the three-dimensional environment while the content has visual prominence and is more likely to have a user's attention, and reduces the computational burden of generating the light spill visual effect at other times.

In some embodiments, displaying the visual effect with the second degree of fidelity to the content includes displaying shadows simulating one or more objects in the one or more portions of the environment outside of the user interface object blocking the simulated light emanating from the content (e.g., shadow 7094 appearing to be cast by speaker 7034 in FIGS. 10D-10E). In some embodiments, displaying the visual effect with the first degree of fidelity to the content does not include displaying shadows (e.g., simulating one or more objects in the one or more portions of the environment outside of the user interface object blocking the simulated light emanating from the content). In some embodiments, displaying the visual effect with the first degree of fidelity to the content includes displaying shadows simulating the one or more objects in the one or more portions of the environment outside of the user interface object blocking the simulated light emanating from the content, optionally to a lesser degree than when displaying the visual effect with the second degree of fidelity to the content. Displaying a light spill visual effect of light from content appearing to cast shadows past other objects in the three-dimensional environment provides (even better) improved visual feedback about the spatial relationship between the content and the three-dimensional environment in circumstances in which the computer system has more information about the geometry of the three-dimensional environment and would not incur significant additional computational burden in generating such a light spill visual effect.

In some embodiments, when the content is displayed with a first width, the computer system displays the visual effect in a first respective portion of the environment outside of the user interface object having a second width that corresponds to the first width of the content; and, when the content is displayed with a third width that is different from the first width, the computer system displays the visual effect in a second respective portion of the environment outside of the user interface object having a fourth width that corresponds to the third width of the content and that is different from the second width (e.g., as described herein with reference to FIGS. 10B-10C and 10D-10E). Displaying a light spill visual effect that simulates light emanating from content displayed in a three-dimensional environment, where the width of the light spill visual effect corresponds to and is based on the width of the content, provides improved visual feedback about the spatial relationship between the content and the three-dimensional environment.

In some embodiments, the visual effect extends from one or more edges of the content outward into the one or more portions of the environment outside of the user interface object. For example, light spill visual effect 7082 (FIGS. 10B-10C) and light spill visual effect 7088 (FIGS. 10D-10E) extend outward into the three-dimensional environment from television 7076. Light spill visual effect 7088 (FIGS. 10D-10E) also extends from television 7076 to speaker 7034 in the form of simulated reflection 7084 and to tablet 7096 in the form of simulated reflection 7086. Displaying a light spill visual effect that simulates light emanating from content displayed in a three-dimensional environment, where the light spill visual effect extends outward into the three-dimensional environment from the edges of the content, provides improved visual feedback about the spatial relationship between the content and the three-dimensional environment.

In some embodiments, while displaying the user interface object in the environment without displaying the visual effect corresponding to simulated light emanating from the content in the user interface object (e.g., when content playback is paused or stopped), the computer system displays a shadow corresponding to the user interface object. In some embodiments, while displaying the visual effect corresponding to simulated light emanating from the content in the user interface object, the computer system forgoes displaying a shadow corresponding to the user interface object. For example, as described herein with reference to FIG. 10A, shadow 7078 (which optionally has any combination of the properties and behaviors of the shadows described herein with reference to methods 1100, 1200, and 1300) for television 7076 is displayed while a light spill visual effect from content on television 7076 is not displayed, whereas, as described herein with reference to FIGS. 10B-10E, shadow 7078 for television 7076 ceases to be displayed while a light spill visual effect from content on television 7076 is displayed (e.g., light spill 7082 (FIGS. 10B-10C) or light spill 7088 (FIGS. 10D-10E)). Ceasing to display a shadow corresponding to a user interface object in a three-dimensional environment when starting to display a light spill visual effect that simulates light emanating from content displayed in the user interface object, both of which provide visual feedback about the spatial relationship between the user interface object and the three-dimensional environment, reduces the computational burden of providing some visual feedback when other visual feedback serving a similar purpose is available.

In some embodiments, while a set of lighting conditions in the environment (e.g., based on real and/or virtual lighting in the environment) meets respective criteria (e.g., the lighting in the environment has more than a threshold intensity, brightness, color temperature, and/or other criteria), the computer system displays the user interface object in the environment with a shadow corresponding to the user interface object. In some embodiments, while the set of lighting conditions in the environment (e.g., based on real and/or virtual lighting in the environment) does not meet the respective criteria (e.g., the lighting in the environment has less than the threshold intensity, brightness, color temperature, and/or other criteria), the computer system displays the user interface object in the environment without a shadow corresponding to the user interface object. For example, shadow 7078 for television 7076 is displayed while the three-dimensional environment is sufficiently lit (e.g., FIG. 10A), and a shadow is not displayed for television 7076 if the three-dimensional environment is dark (e.g., FIGS. 10B-10E). In another example, shadow 7016 for window 7010 is displayed while the three-dimensional environment is sufficiently lit (e.g., FIG. 8A), and a shadow is not displayed for window 7010 if the three-dimensional environment is dark (e.g., FIG. 8B). Displaying a shadow corresponding to a user interface object in a three-dimensional environment when the three-dimensional environment is bright, and forgoing displaying (e.g., ceasing to display) the shadow if the environment is dark, provides improved visual feedback about the spatial relationship between the user interface object and the three-dimensional environment when appropriate and otherwise reduces the computational burden of displaying the shadow.

In some embodiments, the set of lighting conditions includes physical light from a physical environment that corresponds to the environment visible via the display generation component (and that optionally includes one or more passthrough portions from the physical environment) (e.g., as described herein with reference to FIG. 8B). Conditionally displaying the shadow corresponding to the user interface object in the three-dimensional environment based on the amount of physical light in a physical environment that corresponds to the three-dimensional environment provides improved visual feedback about the spatial relationship between the user interface object, the three-dimensional environment, and the corresponding physical environment when appropriate and otherwise reduces the computational burden of displaying the shadow.

In some embodiments, the set of lighting conditions includes computer-generated lighting of the environment (e.g., as described herein with reference to FIG. 8B and FIGS. 10B and 10D). In some embodiments, the lighting in the environment ceases to meet the respective criteria as the computer system virtually dims the environment (e.g., by dimming virtual lighting and/or applying a darkening filter to physical lighting that is visible via the display generation component). Conditionally displaying the shadow corresponding to the user interface object in the three-dimensional environment based on computer-generated lighting of the three-dimensional environment provides improved visual feedback about the spatial relationship between the user interface object and the three-dimensional environment when appropriate and otherwise reduces the computational burden of displaying the shadow.

In some embodiments, aspects/operations of methods 1100, 1200, and 1300 may be interchanged, substituted, and/or added between these methods. For example, shadows described herein, which optionally exhibit the attention-based behavior of method 1100, the movement-based behavior of method 1200, and/or are simplified shadows as in method 1300, cease to be displayed while the light spill visual effects of method 1400 are displayed. For brevity, these details are not repeated here.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best use the invention and various described embodiments with various modifications as are suited to the particular use contemplated.

What is claimed is:

1. A method, comprising:
    at a computer system that is in communication with a display generation component and one or more input devices:
        while a view of a three-dimensional environment is visible via the display generation component, displaying, in the three-dimensional environment, a first computer-generated user interface object;
        detecting that a user's attention is directed to the first user interface object;
        in response to detecting that the user's attention is directed to the first user interface object, displaying a first virtual shadow for the first user interface object with a first appearance, while maintaining a pose of the first user interface object relative to the three-dimensional environment, wherein displaying the first virtual shadow for the first user interface object with the first appearance includes displaying the first virtual shadow with a first value for a first visual property;
        while continuing to display the first user interface object in the three-dimensional environment, detecting that the user's attention has ceased to be directed to the first user interface object;
        in response to detecting that the user's attention has ceased to be directed to the first user interface object, displaying the first virtual shadow for the first user interface object with a second appearance that is different from the first appearance, while maintaining the pose of the first user interface object relative to the three-dimensional environment, wherein:
            displaying the first virtual shadow for the first user interface object with the second appearance includes displaying the first virtual shadow with a second value for the first visual property; and
            the second value for the first visual property is different from the first value for the first visual property;
        displaying a second computer-generated user interface object and a second virtual shadow for the second user interface object;
        while displaying the first virtual shadow for the first user interface object with the first appearance, displaying the second virtual shadow for the second user interface object with a third appearance, including displaying the second virtual shadow with a third value for the first visual property, wherein the third value for the first visual property is different from the first value for the first visual property;

while continuing to display the second user interface object in the three-dimensional environment, detecting that the user's attention is directed to the second user interface object after ceasing to be directed to the first user interface object; and in response to detecting that the user's attention is directed to the second user interface object, displaying the second virtual shadow for the second user interface object with a fourth appearance that is different from the third appearance, while maintaining a pose of the second user interface object relative to the three-dimensional environment, wherein:

displaying the second virtual shadow for the second user interface object with the fourth appearance includes displaying the second virtual shadow with a fourth value for the first visual property; and the fourth value for the first visual property is different from the third value for the first visual property.

2. The method of claim 1, including:
in response to detecting that the user's attention is directed to the first user interface object, displaying the first virtual shadow with the first appearance while maintaining a size of the first user interface object; and
in response to detecting that the user's attention has ceased to be directed to the first user interface object, displaying the first virtual shadow with the second appearance while maintaining the size of the first user interface object.

3. The method of claim 1, wherein displaying the first virtual shadow for the first user interface object with the first appearance is performed in accordance with a determination that the user's attention has been directed to the first user interface object for at least a first threshold amount of time.

4. The method of claim 1, wherein detecting that the user's attention is directed to the first user interface object includes detecting that the user's gaze is directed to the first user interface object, and detecting that the user's attention has ceased to be directed to the first user interface object includes ceasing to detect that the user's gaze is directed to the first user interface object.

5. The method of claim 1, wherein the first visual property is visual intensity.

6. The method of claim 1, including displaying the first virtual shadow at least partially on a computer-generated surface in the three-dimensional environment.

7. The method of claim 1, including displaying the first virtual shadow at least partially on a passthrough view of a physical surface in a physical environment that corresponds to the three-dimensional environment.

8. The method of claim 7, wherein the first virtual shadow that is displayed at least partially on the passthrough view of the physical surface follows a three-dimensional model of the physical surface.

9. The method of claim 8, wherein:
the passthrough view of the physical surface has a first degree of fidelity to the physical surface;
the three-dimensional model of the physical surface has a second degree of fidelity to the physical surface; and
the second degree is less than the first degree.

10. The method of claim 1, wherein:
while the first virtual shadow is displayed with the second value for the first visual property, the first virtual shadow has a lower visual intensity than while the first virtual shadow is displayed with the first value for the first visual property; and
while the second virtual shadow is displayed with the fourth value for the first visual property, the second virtual shadow has a greater visual intensity than while the second virtual shadow is displayed with the third value for the first visual property.

11. The method of claim 1, including:
displaying a third computer-generated user interface object and a third virtual shadow for the third user interface object, including:
while the user's attention is directed to the first user interface object, displaying the third virtual shadow with a fifth value for the first visual property; and
while the user's attention is directed to the second user interface object after ceasing to be directed to the first user interface object, displaying the third virtual shadow with the fifth value for the first visual property.

12. The method of claim 1, including:
while the user's attention is not directed to the first user interface object, displaying the first user interface object with a first value for a respective visual property of the first user interface object; and
in response to detecting that the user's attention is directed to the first user interface object, displaying the first user interface object with a second value for the respective visual property of the first user interface object, while maintaining the pose of the first user interface object relative to the three-dimensional environment, wherein the second value for the respective visual property is different from the first value for the respective visual property.

13. The method of claim 1, including, in response to detecting that the user's attention has ceased to be directed to the first user interface object, progressing the first visual property of the first virtual shadow through a plurality of intermediate values between the first value for the first visual property and the second value for the first visual property.

14. The method of claim 1, including:
in response to detecting that the user's attention is directed to the first user interface object, delaying displaying the first virtual shadow for the first user interface object with the first appearance until a second threshold amount of time has passed since detecting that the user's attention is directed to the first user interface object; and
in response to detecting that the user's attention has ceased to be directed to the first user interface object, delaying displaying the first virtual shadow for the first user interface object with the second appearance until the second threshold amount of time has passed since detecting that the user's attention has ceased to be directed to the first user interface object.

15. The method of claim 1, wherein displaying the first virtual shadow for the first user interface object is performed in accordance with a determination that a viewpoint of the user is within a range of viewpoints relative to the first user interface object, and the method includes:
detecting that the viewpoint of the user has moved beyond the range of viewpoints relative to the first user interface object; and
in response to detecting that the viewpoint of the user has moved beyond the range of viewpoints relative to the first user interface object, ceasing to display the first virtual shadow for the first user interface object.

16. The method of claim 1, including displaying the first virtual shadow for the first user interface object without displaying a visual effect corresponding to simulated light emanating from content displayed in the first user interface object, and ceasing to display the first virtual shadow for the first user interface object while displaying the visual effect corresponding to simulated light emanating from the content.

17. The method of claim 16, including displaying the visual effect corresponding to simulated light emanating from the content while playback of the content is ongoing, and forgoing displaying the visual effect corresponding to simulated light emanating from the content while playback of the content is not ongoing.

18. The method of claim 1, wherein the first user interface object is a user interface of an application.

19. The method of claim 1, wherein the first user interface object is a three-dimensional object in the three-dimensional environment.

20. The method of claim 1, wherein:
displaying the first virtual shadow for the first user interface object with the first appearance includes displaying the first virtual shadow with a first value for a second visual property;
maintaining the pose of the first user interface object relative to the three-dimensional environment includes displaying the first user interface object at a first location in the three-dimensional environment and a first distance from a surface in the three-dimensional environment that corresponds to the first location; and
the method includes:
detecting an input corresponding to a request to reposition the first user interface object; and
in response to detecting the input corresponding to the request to reposition the first user interface object:
repositioning the first user interface object to a second location in the three-dimensional environment that is a second distance from a surface in the three-dimensional environment that corresponds to the second location; and
in accordance with a determination that the second distance is different from the first distance, displaying the first virtual shadow for the first user interface object with a second value for the second visual property, wherein the second value for the second visual property is different from the first value for the second visual property.

21. The method of claim 20, wherein the first visual property is opacity of the first virtual shadow, and the second visual property is size and/or degree of blurring of the first virtual shadow.

22. The method of claim 1, wherein:
the first virtual shadow comprises a shadow appearing to be cast onto a first respective portion of the three-dimensional environment by the first user interface object obstructing at least some light; and
the second virtual shadow comprises a shadow appearing to be cast onto a second respective portion of the three-dimensional environment by the second user interface object obstructing at least some light.

23. A computer system that is in communication with a display generation component and one or more input devices, the computer system comprising:
one or more processors; and
memory storing one or more programs configured to be executed by the one or more processors, the one or more programs including instructions for:
while a view of a three-dimensional environment is visible via the display generation component, displaying, in the three-dimensional environment, a first computer-generated user interface object;
detecting that a user's attention is directed to the first user interface object;
in response to detecting that the user's attention is directed to the first user interface object, displaying a first virtual shadow for the first user interface object with a first appearance, while maintaining a pose of the first user interface object relative to the three-dimensional environment, wherein displaying the first virtual shadow for the first user interface object with the first appearance includes displaying the first virtual shadow with a first value for a first visual property;
while continuing to display the first user interface object in the three-dimensional environment, detecting that the user's attention has ceased to be directed to the first user interface object;
in response to detecting that the user's attention has ceased to be directed to the first user interface object, displaying the first virtual shadow for the first user interface object with a second appearance that is different from the first appearance, while maintaining the pose of the first user interface object relative to the three-dimensional environment, wherein:
displaying the first virtual shadow for the first user interface object with the second appearance includes displaying the first virtual shadow with a second value for the first visual property; and
the second value for the first visual property is different from the first value for the first visual property;
displaying a second computer-generated user interface object and a second virtual shadow for the second user interface object;
while displaying the first virtual shadow for the first user interface object with the first appearance, displaying the second virtual shadow for the second user interface object with a third appearance, including displaying the second virtual shadow with a third value for the first visual property, wherein the third value for the first visual property is different from the first value for the first visual property;
while continuing to display the second user interface object in the three-dimensional environment, detecting that the user's attention is directed to the second user interface object after ceasing to be directed to the first user interface object; and
in response to detecting that the user's attention is directed to the second user interface object, displaying the second virtual shadow for the second user interface object with a fourth appearance that is different from the third appearance, while maintaining a pose of the second user interface object relative to the three-dimensional environment, wherein:
displaying the second virtual shadow for the second user interface object with the fourth appearance includes displaying the second virtual shadow with a fourth value for the first visual property; and
the fourth value for the first visual property is different from the third value for the first visual property.

24. The computer system of claim 23, wherein the one or more programs include instructions for:
in response to detecting that the user's attention is directed to the first user interface object, displaying the first virtual shadow with the first appearance while maintaining a size of the first user interface object; and in response to detecting that the user's attention has ceased to be directed to the first user interface object, displaying the first virtual shadow with the second appearance while maintaining the size of the first user interface object.

25. The computer system of claim 23, wherein displaying the first virtual shadow for the first user interface object with the first appearance is performed in accordance with a determination that the user's attention has been directed to the first user interface object for at least a first threshold amount of time.

26. The computer system of claim 23, wherein detecting that the user's attention is directed to the first user interface object includes detecting that the user's gaze is directed to the first user interface object, and detecting that the user's attention has ceased to be directed to the first user interface object includes ceasing to detect that the user's gaze is directed to the first user interface object.

27. The computer system of claim 23, wherein the one or more programs include instructions for displaying the first virtual shadow at least partially on a computer-generated surface in the three-dimensional environment.

28. The computer system of claim 23, wherein the one or more programs include instructions for displaying the first virtual shadow at least partially on a passthrough view of a physical surface in a physical environment that corresponds to the three-dimensional environment.

29. The computer system of claim 23, wherein:
while the first virtual shadow is displayed with the second value for the first visual property, the first virtual shadow has a lower visual intensity than while the first virtual shadow is displayed with the first value for the first visual property; and
while the second virtual shadow is displayed with the fourth value for the first visual property, the second virtual shadow has a greater visual intensity than while the second virtual shadow is displayed with the third value for the first visual property.

30. The computer system of claim 23, wherein the one or more programs include instructions for:
displaying a third computer-generated user interface object and a third virtual shadow for the third user interface object, including:
while the user's attention is directed to the first user interface object, displaying the third virtual shadow with a fifth value for the first visual property; and
while the user's attention is directed to the second user interface object after ceasing to be directed to the first user interface object, displaying the third virtual shadow with the fifth value for the first visual property.

31. The computer system of claim 23, wherein the one or more programs include instructions for:
while the user's attention is not directed to the first user interface object, displaying the first user interface object with a first value for a respective visual property of the first user interface object; and
in response to detecting that the user's attention is directed to the first user interface object, displaying the first user interface object with a second value for the respective visual property of the first user interface object, while maintaining the pose of the first user interface object relative to the three-dimensional environment, wherein the second value for the respective visual property is different from the first value for the respective visual property.

32. The computer system of claim 23, wherein the one or more programs include instructions for, in response to detecting that the user's attention has ceased to be directed to the first user interface object, progressing the first visual property of the first virtual shadow through a plurality of intermediate values between the first value for the first visual property and the second value for the first visual property.

33. The computer system of claim 23, wherein the one or more programs include instructions for:
in response to detecting that the user's attention is directed to the first user interface object, delaying displaying the first virtual shadow for the first user interface object with the first appearance until a second threshold amount of time has passed since detecting that the user's attention is directed to the first user interface object; and
in response to detecting that the user's attention has ceased to be directed to the first user interface object, delaying displaying the first virtual shadow for the first user interface object with the second appearance until the second threshold amount of time has passed since detecting that the user's attention has ceased to be directed to the first user interface object.

34. The computer system of claim 23, wherein displaying the first virtual shadow for the first user interface object is performed in accordance with a determination that a viewpoint of the user is within a range of viewpoints relative to the first user interface object, and the one or more programs include instructions for:
detecting that the viewpoint of the user has moved beyond the range of viewpoints relative to the first user interface object; and
in response to detecting that the viewpoint of the user has moved beyond the range of viewpoints relative to the first user interface object, ceasing to display the first virtual shadow for the first user interface object.

35. The computer system of claim 23, wherein the one or more programs include instructions for displaying the first virtual shadow for the first user interface object without displaying a visual effect corresponding to simulated light emanating from content displayed in the first user interface object, and ceasing to display the first virtual shadow for the first user interface object while displaying the visual effect corresponding to simulated light emanating from the content.

36. The computer system of claim 35, wherein the one or more programs include instructions for displaying the visual effect corresponding to simulated light emanating from the content while playback of the content is ongoing, and forgoing displaying the visual effect corresponding to simulated light emanating from the content while playback of the content is not ongoing.

37. The computer system of claim 23, wherein:
displaying the first virtual shadow for the first user interface object with the first appearance includes displaying the first virtual shadow with a first value for a second visual property;
maintaining the pose of the first user interface object relative to the three-dimensional environment includes displaying the first user interface object at a first location in the three-dimensional environment and a first distance from a surface in the three-dimensional environment that corresponds to the first location; and
the one or more programs include instructions for:

detecting an input corresponding to a request to reposition the first user interface object; and in response to detecting the input corresponding to the request to reposition the first user interface object:

repositioning the first user interface object to a second location in the three-dimensional environment that is a second distance from a surface in the three-dimensional environment that corresponds to the second location; and in accordance with a determination that the second distance is different from the first distance, displaying the first virtual shadow for the first user interface object with a second value for the second visual property, wherein the second value for the second visual property is different from the first value for the second visual property.

38. The computer system of claim 23, wherein:

the first virtual shadow comprises a shadow appearing to be cast onto a first respective portion of the three-dimensional environment by the first user interface object obstructing at least some light; and the second virtual shadow comprises a shadow appearing to be cast onto a second respective portion of the three-dimensional environment by the second user interface object obstructing at least some light.

39. A non-transitory computer-readable storage medium storing one or more programs configured to be executed by one or more processors of a computer system that is in communication with a display generation component and one or more input devices, the one or more programs including instructions for:

while a view of a three-dimensional environment is visible via the display generation component, displaying, in the three-dimensional environment, a first computer-generated user interface object;

detecting that a user's attention is directed to the first user interface object;

in response to detecting that the user's attention is directed to the first user interface object, displaying a first virtual shadow for the first user interface object with a first appearance, while maintaining a pose of the first user interface object relative to the three-dimensional environment, wherein displaying the first virtual shadow for the first user interface object with the first appearance includes displaying the first virtual shadow with a first value for a first visual property;

while continuing to display the first user interface object in the three-dimensional environment, detecting that the user's attention has ceased to be directed to the first user interface object;

in response to detecting that the user's attention has ceased to be directed to the first user interface object, displaying the first virtual shadow for the first user interface object with a second appearance that is different from the first appearance, while maintaining the pose of the first user interface object relative to the three-dimensional environment, wherein:

displaying the first virtual shadow for the first user interface object with the second appearance includes displaying the first virtual shadow with a second value for the first visual property; and the second value for the first visual property is different from the first value for the first visual property;

displaying a second computer-generated user interface object and a second virtual shadow for the second user interface object;

while displaying the first virtual shadow for the first user interface object with the first appearance, displaying the second virtual shadow for the second user interface object with a third appearance, including displaying the second virtual shadow with a third value for the first visual property, wherein the third value for the first visual property is different from the first value for the first visual property;

while continuing to display the second user interface object in the three-dimensional environment, detecting that the user's attention is directed to the second user interface object after ceasing to be directed to the first user interface object; and in response to detecting that the user's attention is directed to the second user interface object, displaying the second virtual shadow for the second user interface object with a fourth appearance that is different from the third appearance, while maintaining a pose of the second user interface object relative to the three-dimensional environment, wherein:

displaying the second virtual shadow for the second user interface object with the fourth appearance includes displaying the second virtual shadow with a fourth value for the first visual property; and the fourth value for the first visual property is different from the third value for the first visual property.

40. The computer-readable storage medium of claim 39, wherein the one or more programs include instructions for:

in response to detecting that the user's attention is directed to the first user interface object, displaying the first virtual shadow with the first appearance while maintaining a size of the first user interface object; and in response to detecting that the user's attention has ceased to be directed to the first user interface object, displaying the first virtual shadow with the second appearance while maintaining the size of the first user interface object.

41. The computer-readable storage medium of claim 39, wherein displaying the first virtual shadow for the first user interface object with the first appearance is performed in accordance with a determination that the user's attention has been directed to the first user interface object for at least a first threshold amount of time.

42. The computer-readable storage medium of claim 39, wherein detecting that the user's attention is directed to the first user interface object includes detecting that the user's gaze is directed to the first user interface object, and detecting that the user's attention has ceased to be directed to the first user interface object includes ceasing to detect that the user's gaze is directed to the first user interface object.

43. The computer-readable storage medium of claim 39, wherein the one or more programs include instructions for displaying the first virtual shadow at least partially on a computer-generated surface in the three-dimensional environment.

44. The computer-readable storage medium of claim 39, wherein the one or more programs include instructions for displaying the first virtual shadow at least partially on a passthrough view of a physical surface in a physical environment that corresponds to the three-dimensional environment.

45. The computer-readable storage medium of claim 39, wherein:

while the first virtual shadow is displayed with the second value for the first visual property, the first virtual shadow has a lower visual intensity than while the first virtual shadow is displayed with the first value for the first visual property; and while the second virtual shadow is displayed with the fourth value for the first visual property, the second virtual shadow has a greater visual intensity than while the second virtual shadow is displayed with the third value for the first visual property.

46. The computer-readable storage medium of claim 39, wherein the one or more programs include instructions for:

displaying a third computer-generated user interface object and a third virtual shadow for the third user interface object, including:

while the user's attention is directed to the first user interface object, displaying the third virtual shadow with a fifth value for the first visual property; and while the user's attention is directed to the second user interface object after ceasing to be directed to the first user interface object, displaying the third virtual shadow with the fifth value for the first visual property.

47. The computer-readable storage medium of claim 39, wherein the one or more programs include instructions for:

while the user's attention is not directed to the first user interface object, displaying the first user interface object with a first value for a respective visual property of the first user interface object; and in response to detecting that the user's attention is directed to the first user interface object, displaying the first user interface object with a second value for the respective visual property of the first user interface object, while maintaining the pose of the first user interface object relative to the three-dimensional environment, wherein the second value for the respective visual property is different from the first value for the respective visual property.

48. The computer-readable storage medium of claim 39, wherein the one or more programs include instructions for, in response to detecting that the user's attention has ceased to be directed to the first user interface object, progressing the first visual property of the first virtual shadow through a plurality of intermediate values between the first value for the first visual property and the second value for the first visual property.

49. The computer-readable storage medium of claim 39, wherein the one or more programs include instructions for:

in response to detecting that the user's attention is directed to the first user interface object, delaying displaying the first virtual shadow for the first user interface object with the first appearance until a second threshold amount of time has passed since detecting that the user's attention is directed to the first user interface object; and in response to detecting that the user's attention has ceased to be directed to the first user interface object, delaying displaying the first virtual shadow for the first user interface object with the second appearance until the second threshold amount of time has passed since detecting that the user's attention has ceased to be directed to the first user interface object.

50. The computer-readable storage medium of claim 39, wherein displaying the first virtual shadow for the first user interface object is performed in accordance with a determination that a viewpoint of the user is within a range of viewpoints relative to the first user interface object, and the one or more programs include instructions for:

detecting that the viewpoint of the user has moved beyond the range of viewpoints relative to the first user interface object; and in response to detecting that the viewpoint of the user has moved beyond the range of viewpoints relative to the first user interface object, ceasing to display the first virtual shadow for the first user interface object.

51. The computer-readable storage medium of claim 39, wherein the one or more programs include instructions for displaying the first virtual shadow for the first user interface object without displaying a visual effect corresponding to simulated light emanating from content displayed in the first user interface object, and ceasing to display the first virtual shadow for the first user interface object while displaying the visual effect corresponding to simulated light emanating from the content.

52. The computer-readable storage medium of claim 51, wherein the one or more programs include instructions for displaying the visual effect corresponding to simulated light emanating from the content while playback of the content is ongoing, and forgoing displaying the visual effect corresponding to simulated light emanating from the content while playback of the content is not ongoing.

53. The computer-readable storage medium of claim 39, wherein:

displaying the first virtual shadow for the first user interface object with the first appearance includes displaying the first virtual shadow with a first value for a second visual property;

maintaining the pose of the first user interface object relative to the three-dimensional environment includes displaying the first user interface object at a first location in the three-dimensional environment and a first distance from a surface in the three-dimensional environment that corresponds to the first location; and the one or more programs include instructions for:

detecting an input corresponding to a request to reposition the first user interface object; and in response to detecting the input corresponding to the request to reposition the first user interface object:

repositioning the first user interface object to a second location in the three-dimensional environment that is a second distance from a surface in the three-dimensional environment that corresponds to the second location; and in accordance with a determination that the second distance is different from the first distance, displaying the first virtual shadow for the first user interface object with a second value for the second visual property, wherein the second value for the second visual property is different from the first value for the second visual property.

54. The computer-readable storage medium of claim 39, wherein:

the first virtual shadow comprises a shadow appearing to be cast onto a first respective portion of the three-dimensional environment by the first user interface object obstructing at least some light; and the second virtual shadow comprises a shadow appearing to be cast onto a second respective portion of the three-dimensional environment by the second user interface object obstructing at least some light.

\* \* \* \* \*